United States Patent
Xiao et al.

(10) Patent No.: US 11,969,929 B2
(45) Date of Patent: Apr. 30, 2024

(54) MICROLAYER MEMBRANES, BATTERY SEPARATORS, BATTERIES, AND RELATED METHODS

(71) Applicant: CELGARD, LLC, Charlotte, NC (US)

(72) Inventors: Kang Karen Xiao, Mississauga (CA); Stefan Reinartz, Waxhaw, NC (US); Takahiko Kondo, Shiga (JP); Hisaki Ikebata, Shizuoka (JP); Eric J. Penegar, Fort Mill, SC (US); Robert Nark, Fort Mill, SC (US); Changqing Wang Adams, Fort Mill, SC (US); Masaaki Okada, Charlotte, NC (US); Brian R. Stepp, Scottsdale, AZ (US); Eric Robert White, Fort Mill, SC (US); Allen M. Donn, Rock Hill, SC (US); Katharine Chemelewski, Campbell, CA (US)

(73) Assignee: Celgard, LLC, Charlotte, NC (US)

( * ) Notice: Subject to any disclaimer, the term of this patent is extended or adjusted under 35 U.S.C. 154(b) by 798 days.

(21) Appl. No.: 17/054,190

(22) PCT Filed: May 10, 2019

(86) PCT No.: PCT/US2019/031683
§ 371 (c)(1),
(2) Date: Nov. 10, 2020

(87) PCT Pub. No.: WO2019/217791
PCT Pub. Date: Nov. 14, 2019

(65) Prior Publication Data
US 2021/0194095 A1    Jun. 24, 2021

Related U.S. Application Data

(60) Provisional application No. 62/669,629, filed on May 10, 2018.

(51) Int. Cl.
*B29C 48/21* (2019.01)
*B01D 67/00* (2006.01)
(Continued)

(52) U.S. Cl.
CPC .......... *B29C 48/21* (2019.02); *B01D 67/0079* (2013.01); *B01D 69/02* (2013.01);
(Continued)

(58) Field of Classification Search
CPC ... B32B 27/302; B32B 27/304; B32B 27/308; B32B 27/32; B32B 27/36; B32B 5/022;
(Continued)

(56) References Cited

U.S. PATENT DOCUMENTS 4,873,037 A * 10/1989 Chau .................. B29C 48/49
                                              264/141
4,943,475 A *  7/1990 Baker ..................... A62D 5/00
                                              428/315.7
(Continued)

FOREIGN PATENT DOCUMENTS

EP       3312905        4/2018
WO    WO2017083633     5/2017

OTHER PUBLICATIONS

EP Search Report received Jan. 7, 2022, from counterpart EP Application No. 19799973.3.

*Primary Examiner* — Chester T Barry
(74) *Attorney, Agent, or Firm* — Hammer & Associates, P.C.

(57) ABSTRACT

Described herein is a multilayer microporous film or membrane that may exhibit improved properties, including improved dielectric break down and strength, compared to prior monolayer or tri-layer microporous membranes of the same thickness. The preferred multilayer microporous membrane comprises microlayers and one or more lamination
(Continued)

interfaces or barriers. Also disclosed is a battery separator or battery comprising one or more of the multilayer microporous films or membranes. The inventive battery and battery separator is preferably safer and more robust than batteries and battery separators using prior monolayer and tri-layer microporous membranes. Also, described herein is a method for making the multilayer microporous separators, membranes or films described herein.

38 Claims, 65 Drawing Sheets

(51) Int. Cl.
| | | |
|---|---|---|
| *B01D 69/02* | (2006.01) | |
| *B29C 48/08* | (2019.01) | |
| *D06M 23/00* | (2006.01) | |
| *H01M 50/406* | (2021.01) | |
| *H01M 50/417* | (2021.01) | |
| *H01M 50/426* | (2021.01) | |
| *H01M 50/429* | (2021.01) | |
| *H01M 50/434* | (2021.01) | |
| *H01M 50/451* | (2021.01) | |
| *H01M 50/454* | (2021.01) | |
| *H01M 50/457* | (2021.01) | |
| *H01M 50/489* | (2021.01) | |
| *H01M 50/491* | (2021.01) | |
| *B29K 105/16* | (2006.01) | |
| *B29L 31/00* | (2006.01) | |

(52) U.S. Cl.
CPC ........... *B29C 48/08* (2019.02); *D06M 23/005* (2013.01); *H01M 50/406* (2021.01); *H01M 50/417* (2021.01); *H01M 50/426* (2021.01); *H01M 50/429* (2021.01); *H01M 50/434* (2021.01); *H01M 50/451* (2021.01); *H01M 50/454* (2021.01); *H01M 50/457* (2021.01); *H01M 50/489* (2021.01); *H01M 50/491* (2021.01); *B01D 2323/218* (2022.08); *B01D 2325/04* (2013.01); *B01D 2325/22* (2013.01); *B01D 2325/24* (2013.01); *B29K 2105/16* (2013.01); *B29L 2031/755* (2013.01)

(58) Field of Classification Search
CPC ......... B32B 27/08; B32B 27/12; B32B 27/18; B32B 27/283; H01M 50/44; H01M 50/4295; H01M 50/42; H01M 50/431; H01M 50/443; H01M 50/449; H01M 50/463; H01M 50/406; H01M 50/417; H01M 50/426; H01M 50/429; H01M 50/434; H01M 50/451; H01M 50/454; H01M 50/457; H01M 50/489; H01M 50/491; G01N 3/567; B29C 48/21; B29C 48/08; B01D 67/0079; B01D 69/02; D06M 23/005
See application file for complete search history.

(56) References Cited

U.S. PATENT DOCUMENTS

| | | |
|---|---|---|
| 7,662,510 B2 | 2/2010 | Zhang |
| 9,293,750 B2 | 3/2016 | Yang et al. |
| 2006/0196830 A1* | 9/2006 | Sale ..................... B32B 27/08 210/639 |
| 2008/0269366 A1 | 10/2008 | Shaffer et al. |
| 2014/0093687 A1 | 4/2014 | Humiston et al. |
| 2015/0064568 A1 | 3/2015 | Yushin et al. |
| 2017/0025658 A1* | 1/2017 | Shi ........................ C23C 14/20 |
| 2018/0006330 A1 | 1/2018 | Zhu et al. |
| 2020/0030754 A1* | 1/2020 | Kubota ................. B01D 69/02 |

* cited by examiner

MD Cross-Section at 2,500X

MD Cross-Section at 15,000X

MD Cross-Section of Example 1 at 5,000x

Surface of Example 1 at 3,000x

Surface of Example 1 at 10,000x

Surface of Example 1 at 30,000x

MULTILAYER TECHNOLOGY EXEMPLARY EMBODIMENTS

Components

Structure
Micro/Nano layer
↓
Sub-membrane
↓
Membrane
↓
Separator membrane
(Coating, NW, ..)

Thickness of one layer
Micro-layer 1 – 10um
Nano-layer <1um

Process
Dry (Cast, Blown)
 pre-lami
 post-lami
 newest die tech.
TDC
Coating

WET

Equipment
nano layer -
circular die

Material
PP, PE
 PP copolymer/elastomer
 PE copolymer/elastomer
 SEPS, SEBS

Filler
Scavenger
Additive
 slip, antistatic, adhesion,
 crosslinked, antioxidant,
 color,

PVDF, EVOH, PMP

Performance

Separator performance
DB, PS, MixP,
Impact strength, Modulus
Multiple pore size
Adhesion Battery performance
Safety (NPT)
Cycle
Durability Application Application
EC cell, Battery, Capacitor

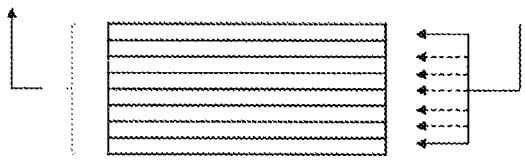

Fig. 15

PP Layers of Tri-Layer Products
Comparative Example 1
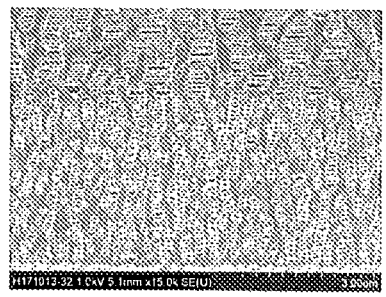
Comparative Example 4
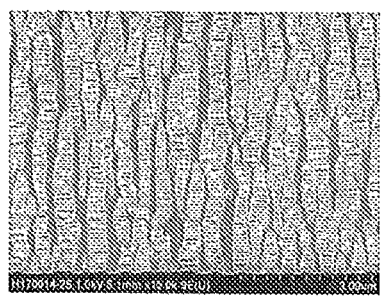
Comparative Example 5
Fig. 18

PE Layers of Multilayer Products
Example 6
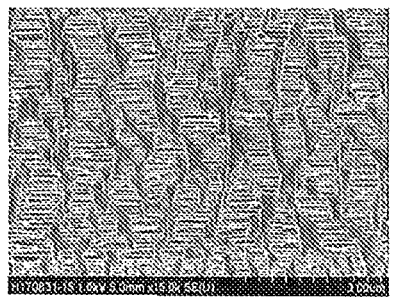
Example 4
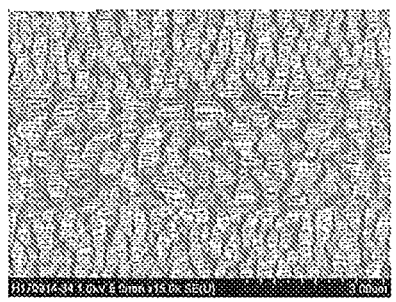
Example 1
Example 2
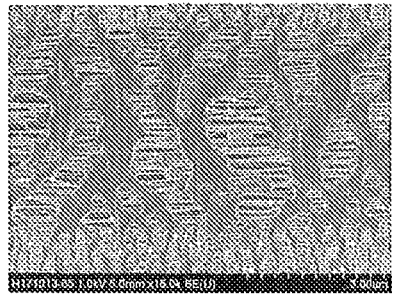
Fig. 19

PE Layers of Tri-Layer Products
Comparative Example 1
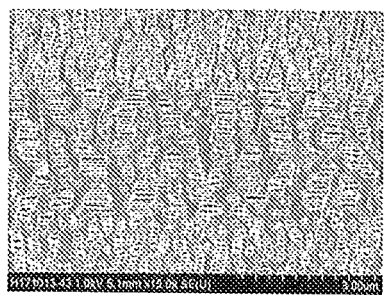
Comparative Example 4
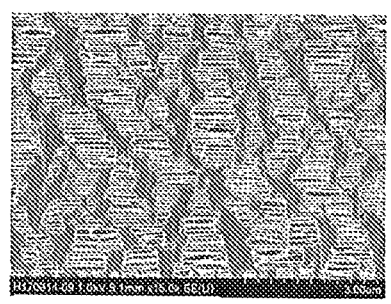
Comparative Example 5
Fig. 20

Side-by-Side Comparison of PP layers of Tri-Layer Product and Multilayer Products Side-by-Side Comparison of PE layers of Tri-Layer Product and Multilayer Products Side-by-Side Comparison of Tri-Layer Product and Multilayer Products Coefficient and Boundary Parameter (PE)

Exemplary Co-extruded Tri-layer

A coextruded 2 layer PP precursor is proposed with the following structure:

Homopolymer PP + additive(s) to modify surface COF
Homopolymer PP + copolymer PP

Fig. 29

A coextruded 3 layer PP precursor is proposed with the following structure:

Homopolymer PP + additive(s) to modify surface COF
Homopolymer PP + copolymer PP
Hompolymer PP + additive(s) to modify surface COF

Fig. 30

A coextruded 3 layer PP precursor is proposed with the following structure:

Homopolymer PP + additive(s) to modify surface COF
Homopolymer PP + copolymer PP
Hompolymer PP + additive(s) to enhance coating adhesion

Fig. 31

A coextruded 4 layer PP precursor is proposed with the following structure:

Homopolymer PP + additive(s) to modify surface COF
Homopolymer PP + copolymer PP
Homopolymer PP + copolymer PP
Hompolymer PP + additive(s) to modify surface COF Another proposed 3 layer co-extruded sublayer or structure for a battery or textile application can be the following:

A coextruded 2 layer PP membrane, separator, base film, sublayer, or precursor is proposed with the following structure:

Homopolymer PP + additive(s) to modify surface COF (to reduce the COF)
Homopolymer PP + copolymer PP (to reduce the shutdown temp)

Fig. 34

A coextruded 3 layer PP membrane, separator, base film, sublayer, or precursor is proposed with the following structure:

Homopolymer PP + additive(s) to modify surface COF (to reduce or increase the COF)
Homopolymer PP + copolymer PP (to reduce or increase the shutdown temperature)
Hompolymer PP + additive(s) to modify surface COF (to reduce or increase the COF)

Fig. 35

A coextruded 3 layer PP membrane, separator, base film, sublayer, or precursor is proposed with the following structure:

Homopolymer PP + additive(s) to modify the surface COF
Homopolymer PP + copolymer PP to modify the shutdown temperature
Hompolymer PP + additive(s) to modify the coating adhesion

Fig. 36

A coextruded 4 layer PP membrane, separator, base film, sublayer, or precursor is proposed with the following structure:

Homopolymer PP + additive(s) to modify the surface COF
Homopolymer PP + copolymer PP(s) to modify shutdown performance
Homopolymer PP + copolymer PP(s) to modify shutdown performance or the strength
Homopolymer PP + additive(s) to modify the surface COF, strength, or the coating adhesion

Fig. 37

A multilayer product example having the following sublayers laminated together:

The sublayer of any of Fig. 44 to 48

-------------------------------------------------

A PP or PE sublayer

Fig. 38

A multilayer product example having the following sublayers laminated together (an optional coating can be added to one or both sides):

The sublayer of any of Figs. 44 to 48

-----------------------------------------------------------

A PP and/or PE sublayer

-----------------------------------------------------------

A PP and/or PE sublayer, or the sublayer of any of Figs. 44 to 48

Fig. 39

Peak Analysis

| Sample | | | Peak temp. | FWHW | Aria |
|---|---|---|---|---|---|
| Comparative Example 6 | Regular | Tandelta_PE | -120.8 | 20.6 | 2.1 |
| Example 39 | Multi-layer | Tandelta_PE | -120.6 | 23.9 | 3.5 |
| Example 2 | Multi-layer | Tandelta_PE | -118.8 | 22.1 | 2.1 |
| Example 1 | Multi-layer | Tandelta_PE | -121.0 | 22.4 | 2.6 |
| Comparative Example 6 | Regular | Tandelta_PP | 4.3 | 20.9 | 2.8 |
| Example 39 | Multi-layer | Tandelta_PP | 1.7 | 19.0 | 2.6 |
| Example 2 | Multi-layer | Tandelta_PP | 4.3 | 22.5 | 3.3 |
| Example 1 | Multi-layer | Tandelta_PP | 2.9 | 20.2 | 3.4 |
| Comparative Example 6 | Regular | Loss_PP | 2.4 | 24.9 | 5.3 |
| Example 39 | Multi-layer | Loss_PP | -0.1 | 24.8 | 4.9 |
| Example 2 | Multi-layer | Loss_PP | 2.3 | 26.9 | 6.6 |
| Example 1 | Multi-layer | Loss_PP | 0.9 | 24.0 | 7.0 |

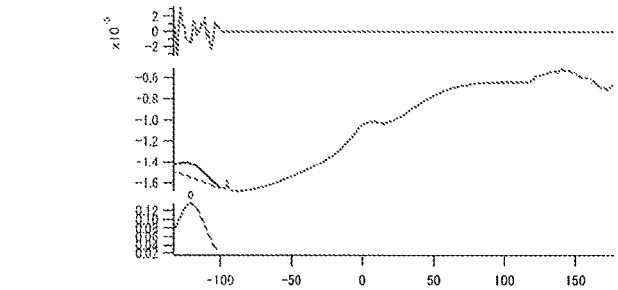

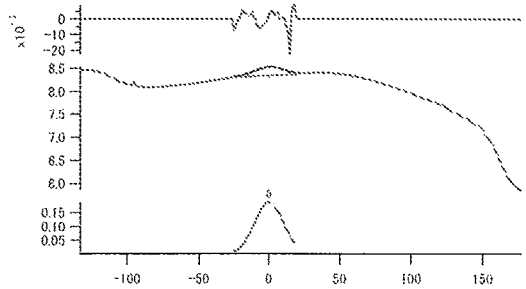

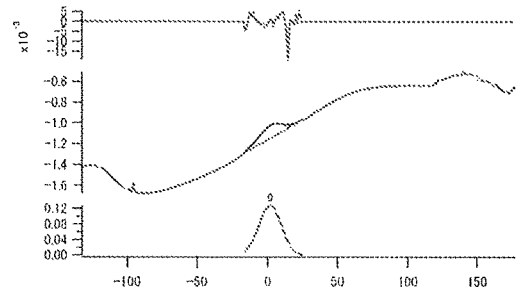

Fig. 44

Example 1

Example 2

Example 39

Compressibility Data

| | Comparative Sample 3 | Comparative Sample 4 | Comparative Sample 5 | Example 46 | Example 5 | Example 6 |
|---|---|---|---|---|---|---|
| Thickness (microns) | 14.7 | 15.9 | 12 | 14.9 | 12.7 | 16.6 |
| Basis Weight (mg/cm³) | 0.76 | 0.75 | | 0.75 | 0.69 | 0.79 |
| AQ porosity (%) | 41.17 | 45.43 | 39 | 44.2 | 40.18 | 45.33 |
| Aquapore Porosity (%) | 42.88 | 47.65 | 39 | | 40.42 | 45.96 |
| Calculated tortuosity | 1.733 | 1.575 | | | 1.695 | 1.633 |
| JIS Gurley (s/100cc) | 201 | 174 | 264 | 172 | 241 | 198 |
| Recovery (%) | 7.17 | 8.79 | 7.05 | 4.68 | 10.57 | 9.83 |
| Max Compression (%) | -18.56 | -26.73 | -18.66 | -15.50 | -17.05 | -24.83 |
| Final Compression (%) | -11.39 | -17.94 | -11.60 | -10.82 | -6.48 | -15.01 |

Fig. 50

Elongation at Break Data

| SAMPLE | Elongation at Break (MD) | Elongation at Break (TD) |
|---|---|---|
| Example 1 | 41.7% | 836.2% |
| Comparative Example 9 | 49.6% | 587.1% |

Fig. 51

High Temperature Shrinkage Data

| Sample | Shrinkage @ 120°C |
|---|---|
| EXAMPLE 1 | 6-8% |
| Comparative Example 9 | 14-17% |

Fig. 52

| | | | Comparative Example 10 | Example 49 | Example 50 | Example 51 |
|---|---|---|---|---|---|---|
| Actual blend | | | No additive | 5%Maleic anhydride modified HDPE | 10%Maleic anhydride modified Homo-PP | 10%Maleic anhydride modified co-PP |
| Date | | | | | | |
| Location | | | DE1/PSSO | DE1/PSSO | DE1/PSSO | DE1/PSSO |
| MA Additive % | | | 0 | 5 | 10 | 10 |
| Ply # | | | 2 | 2 | 2 | 2 |
| Thickness, mil | | AVG | 0.623 | 0.631 | 0.631 | 0.616 |
| | | RANGE | 0.113 | 0.115 | 0.134 | 0.091 |
| Birefringence | | | 148/3 | 145/5 | 134/2 | 130/5 |
| Stretch Condition # | | | 3 4 | 1 | 1 | 3 |
| R&D | Gurley, s | | 197 | 220 | 215 | 353 |
| | Gurley STDEV, s | | 9 | 14 | 16 | 51 |
| | Adhesion | | good | good | sticky but peelable | sticky but peelable |
| QC | Thick, um | | 13 13.65 | 13.6 | 14.07 | 13.14 |
| | BW, mg/cm2 | | 0.62 0.651 | 0.6407 | 0.6975 | 0.6562 |
| | PS, gf | | 240 278 | 251 | 246 | 222 |
| | PS/BW, gf/(mg/cm2) | | 387.1 427.0 | 391.8 | 352.7 | 338.3 |
| | PS/Thick, gf/um | | 18.5 20.4 | 18.5 | 17.5 | 16.9 |
| | ER, ohm-cm2 | | 0.62 0.64 | 0.93 | 0.9 | 1.49 |
| | 105C1hr MD shrinkage, % | | 24.12 25.6 | 10.15 | 10 | 18.26 |
| | Tensile MD | Strength, kgf/cm2 | 1571 1413 | 1456 | 1295 | 1512 |
| | | Elong. % | 55 41 | 57 | 73 | 62 |
| | Tensile TD | Strength, kgf/cm2 | 170 165 | 166 | 138 | 162 |
| | | Elong. % | 687 679 | 699 | 438 | 586 |

| | Example 50 best |
|---|---|
| Adhesion | best, sticky but peelable |
| Thick, um | 14.19 |
| BW, mg/cm2 | 0.6665 |
| PS, gf | 242 |
| PS/BW | 363.1 |
| PS/Thick | 17.1 |
| ER | 0.99 |
| 105C1hr MD shrinkage | 23.06 |
| MD Strength | 1264 |
| MD Elong | 56 |
| TD Strength | 143 |
| TD Elong | 408 |

Fig. 61

| | | | Comparative Example 10 | Example 50 | Example 51 | Example 52 |
|---|---|---|---|---|---|---|
| Actual blend | | | No additive | 10% maleic anhydride modified Homo-PP | 10% maleic anhydride modified co-PP | 15% maleic anhydride Modified Homo-PP |
| Location | | | | | | |
| | Stretch Condition # | | 3 | 3 | 3 | 1 |
| R&D | Gurley, s | | 197 | 202 | 353 | 174 |
| | Adhesion | | good | best; sticky but peelable | sticky but peelable | sticky but peelable |
| QC | Thick, um | | 13 | 14.19 | 13.14 | 13.9 |
| | BW, mg/cm2 | | 0.62 | 0.6865 | 0.6362 | 0.6613 |
| | PS, gf | | 240 | 242 | 222 | 223 |
| | PS/BW, gf/(mg/cm2) | | 387.1 | 363.1 | 353.3 | 337.2 |
| | PS/Thick, gf/um | | 18.5 | 17.1 | 18.9 | 16.0 |
| | ER, ohm-cm2 | | 0.62 | 0.99 | 1.49 | 0.65 |
| | 105C1hr MD shrinkage, % | | 24.12 | 23.06 | 18.26 | 11.3 |
| | Tensile | MD Strength, kgf/cm2 | 1571 | 1264 | 1512 | 1311 |
| | | MD Elong, % | 55 | 56 | 62 | 45 |
| | | TD Strength, kgf/cm2 | 170 | 143 | 162 | 132 |
| | | TD Elong, % | 687 | 408 | 586 | 340 |
| | AP Pore size, um | | 0.0381 | 0.0403 | 0.0376 | 0.0476 |
| | Porosity by AP, % | | 46.35 | 44.98 | 39.42 | 44.75 |
| SAL | Mix-P, Kgf | | 649 | 706 | 718 | 706 |
| | Mix-P/thick, kgf/um | | 50 | 50 | 55 | 51 |
| | DB Avg, V | | 1650 | 1773 | 1878 | 1632 |
| | DB STDEV, V | | 212 | 194 | 221 | 149 |
| | DB min, V | | 1010 | 1150 | 1140 | 1250 |

Fig. 62

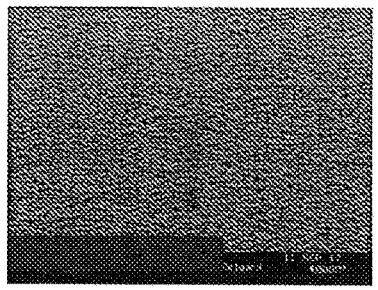
Control-no additive-
Comparative Example 10
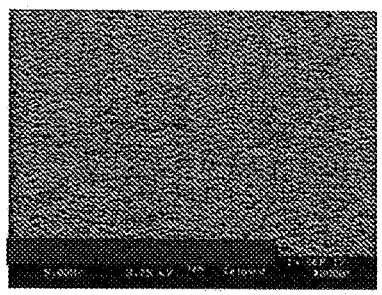
10% maleic anhydride modified Homo-PP-Example 50
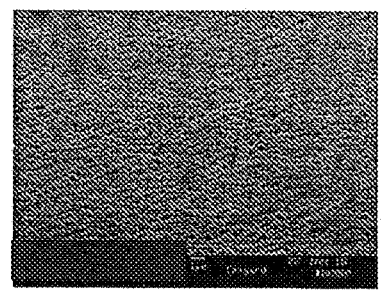
15% maleic anhydride modified Homo-PP-Example 52
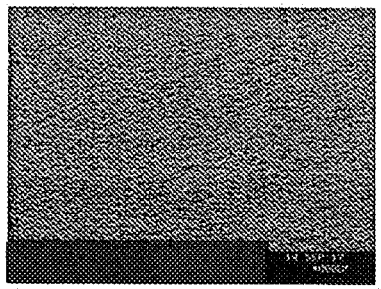
10% maleic anhydride modified co-PP-Example 51
Fig. 63

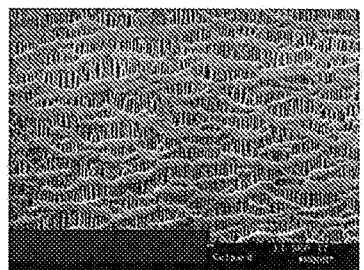
Control-no additive-
Comparative Example
10
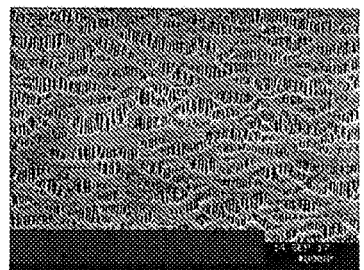
10% Maleic Anhydride
modified Homo-PP-
Example 50
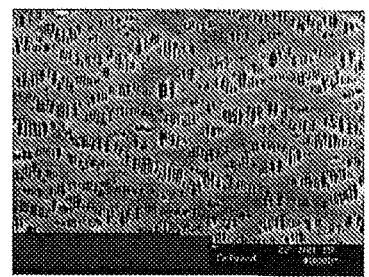
15% Maleic Anhydride
Modified Homo-PP-
Example 52
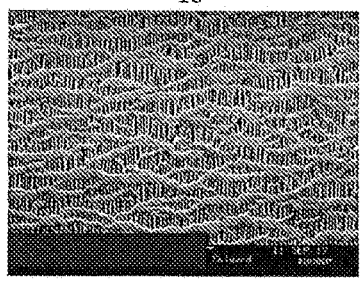
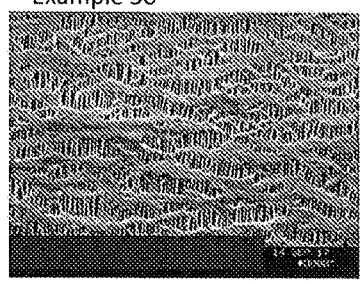
Fig. 64

| Actual blend | | | Comparative Example 10 | | | | Example 50 | | Example 53 | Example 54 | Example 55 |
|---|---|---|---|---|---|---|---|---|---|---|---|
| Location | | | Control- no additive | | | | 10%Maleic Anhydride Modified Homo-PP | | 5% styrene-ethylene-propylene-styrene copolymer | 10% maleic anhydride modified homo-PP and 5% styrene-ethylene-propylene-styrene copolymer | 10% maleic anhydride modified homo-PP+5% propylene-ethylene elastomer |
| | Stretch Condition # | | 1 | 2 | 3 | 4 | 1 | 3 | 1 | 1 | 1 |
| | PSSO Stretch Conditions Control = J.Nada Cond. 2 | | | | | | | | | | |
| R&D | Gurley, s | | 197 | 203 | 197 | 215 | 215 | 207 | 300 | 237 | 184 |
| | Adhesion | | good | good | good | good | sticky but peelable | best, sticky but peelable | sticky but peelable | sticky but peelable | sticky but peelable |
| | Thick, um | | 13 | 13.9 | 13 | 13.65 | 14.07 | 14.19 | 11.83 | 12.85 | 13.8 |
| | BW, mg/cm2 | | 0.64 | 0.67 | 0.62 | 0.651 | 0.6975 | 0.6665 | 0.6706 | 0.6976 | 0.662 |
| | PS., gf | | 241 | 241 | 240 | 278 | 246 | 242 | 267 | 275 | 195 |
| | PS/BW, gf/(mg/cm2) | | 377 | 360 | 387.1 | 427.0 | 352.7 | 363.1 | 398.2 | 394.2 | 294.6 |
| | PS/Thick, gf/um | | 18.5 | 17.3 | 18.5 | 20.4 | 17.5 | 17.1 | 22.6 | 21.4 | 14.1 |
| | ER, ohm-cm2 | | 0.8 | 0.84 | 0.62 | 0.64 | 0.9 | 0.99 | 1.63 | 1.05 | 0.8 |
| | 105C1hr MD shrinkage, % | | 14.2 | 15.8 | 24.12 | 25.6 | 10 | 23.06 | 7.8 | 8.4 | 13.3 |
| QC | Tensile | MD Strength, kgf/cm2 | 1589 | 1544 | 1571 | 1413 | 1295 | 1264 | 1821 | 1574 | 1335 |
| | | MD Elong, % | 47 | 42 | 55 | 41 | 73 | 56 | 48 | 50 | 44 |
| | | TD Strength, kgf/cm2 | 167 | 144 | 170 | 165 | 138 | 143 | 141 | 128 | 146 |
| | | TD Elong, % | 545 | 633 | 687 | 679 | 438 | 408 | 488 | 399 | 596 |
| | AP Pore size, um | | 0.043 | 0.039 | 0.0381 | | | 0.0405 | 0.0476 | 0.0469 | 0.0468 |
| | Porosity by AP, % | | 45.7 | 44.2 | 46.35 | | | 44.98 | 40.13 | 40.44 | 44.65 |
| | Mix-P, Kgf | | Not tested | Not tested | 649 | | | 706 | 679 | 670 | 651 |
| | Mix-P/thick, kgf/um | | Not tested | Not tested | 50 | | | 50 | 57 | 52 | 47 |
| SAL | DB Avg, V | | 1.47 | 1.74 | 1650 | | | 1773 | 1772 | 1781 | 1734 |
| | DB STDEV, V | | n/a | n/a | 212 | | | 194 | 107 | 97 | 144 |
| | DB min, V | | n/a | n/a | 1010 | | | 1150 | 1470 | 1530 | 1240 |

Fig. 65

Discernible interface

PP/PP/PP/PP/PP/PP collapsed bubble structure with discernible interface

PP/PP/PE/PE/PP/PP 10 micron collapsed bubble structure

| Feature | Example 2 | Example G |
|---|---|---|
| Thickness (μm) | 9.7 | 10.0 |
| Basis Weight (mg/cm²) | | 0.54 |
| JIS Gurley (s/100 cc) | 200 | 209 |
| % Shrinkage 105 °C (1) (MD) | 2.0 | 2.2 |
| MD Tensile (kg/cm²) | 2035 | 1786 |
| MD Elongation (%) | 42 | 57 |
| TD Tensile (kg/cm²) | 136 | 140 |
| TD Elongation (%) | 515 | 611 |
| Puncture Strength (gf) | 200 | 220 |
| HP Average (V) | 1313 | 1357 |
| HP Min (V) | 925 | 700 |
| HP Std Dev (V) | 147 | 203 |
| Mp Penetration Average (Å) | 507 | 506 |
| AC Porosity (%) | 39.3 | 37.9 |
| AC PS Area 1st (μm) | 0.0410 | 0.0308 |
| AC PS Area 2nd (μm) | --- | 0.0723 |
| AC Surface Area (m²/g) | 81.4 | 75.2 |
| Shutdown T (μm) (°C) | 160.8 | 134.3 |

Fig. 68

| Properties | Comparative Example 11 |
|---|---|
| Thickness (um) | 10 |
| JIS Gurley (seconds) | 230 |
| Puncture Strength (g) | 200 |
| MD Tensile (kgf/cm$^2$) | 1750 |
| TD Tensile (kgf/cm$^2$) | 150 |
| TD Elongation | 850 |
| Shrinkage at 105°C (%) | <5% |
| Porosity | 42% |
| PP Pore size | 0.030 |
| PE Pore Size | 0.068 |

Fig. 70

MICROLAYER MEMBRANES, BATTERY SEPARATORS, BATTERIES, AND RELATED METHODS

CROSS-REFERENCE TO RELATED APPLICATIONS

This application is a 371 application which claims priority to PCT/US2019/031683, filed May 10, 2019, which claims priority to U.S. Provisional Application No. 62/669,629, filed May 10, 2018, hereby fully incorporated by reference herein.

FIELD OF THE INVENTION

In accordance with at least selected embodiments, the application, disclosure or invention relates to novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same, and/or methods for testing, quantifying, characterizing, and/or analyzing such membranes, separator membranes, separators, battery separators, and the like. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate novel or improved structures, performance, utilization, such as improved shutdown, improved strength, improved dielectric breakdown strength, improved elongation, improved puncture strength, improved high speed puncture strength, lower Gurley, reduced crystallization, and/or reduced tendency to split, and combinations thereof.

BACKGROUND OF THE INVENTION

Known methods of making microporous bi-layered or tri-layered membranes, such as for use as battery separator membranes, include laminating or adhering two or more monolayer precursors together or coextruding more than one layer of membrane at the same time using a coextrusion die. Such methods are described in, for example, U.S. Pat. No. 5,952,120, U.S. 2014/0079980, U.S. Pat. Nos. 5,223,032, 5,240,655, and U.S. 2005/031943.

The aforementioned methods may not fully optimize a balance of strength and/or performance properties for use in applications such as certain primary and/or secondary batteries, such as lithium ion rechargeable batteries. This is especially true as the battery separator requirements are becoming more demanding as customers want thinner and stronger battery separators. For example, a microporous trilayer membrane formed by coextruding the three layers may have reduced strength. Separators formed by laminating monolayers also may eventually not satisfy the ever-increasing demands.

Hence, there is a need for a new and improved multi-layered microporous membranes, base films, or battery separators having various improvements over prior membranes, base films, or battery separators.

SUMMARY OF THE INVENTION

In accordance with at least selected embodiments, the application, disclosure or invention may address the above needs, issues or problems and/or may provide novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same, and/or methods for testing, quantifying, characterizing, and/or analyzing such membranes, separator membranes, separators, battery separators, and the like. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, random copolymer, PP and/or PE copolymers, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate novel or improved structures, performance, utilization, such as improved shutdown, improved strength, improved dielectric breakdown strength, improved elongation, improved puncture strength, improved high speed puncture strength, lower Gurley, reduced crystallization, and/or reduced tendency to split, and combinations thereof.

The microporous multilayer battery separators described herein, in some embodiments, exhibit improved safety, strength, and durability compared to prior bi-layer, tri-layer, or multi-layer battery separators.

These properties of the microporous multilayer battery separators described herein are a result of, at least in part, the method by which they are made. This method, in some embodiments, comprises at least coextruding two or more polymer mixtures to form a first coextruded bi-layer, tri-layer, or multi-layer film, coextruding two or more other polymer mixtures to form a second coextruded bi-layer, tri-layer, or multi-layer film, and coextruding two or more further polymer mixtures to form a third coextruded bi-layer, tri-layer, or multi-layer film. Co-extrusion typically involves use of a co-extrusion die with one or more extruders feeding the die (typically one extruder per layer of the bi-layer, tri-layer, or multi-layer film). The polymer mixtures used to form each layer of the first, second, and third bi-layer, tri-layer, or multi-layer layer film may be the same or different. The mixtures may only include one polymer, or more than one polymer, e.g., polymer blends. Also, more than three bi-layer, tri-layer, or multi-layer films may be formed. After the first, second, and third bi-layer, tri-layer, or multi-layer film is formed, the films are laminated together with two of the films formed on opposite surfaces of one of the films to form the possibly preferred microporous battery separators described herein.

The microporous multilayer battery separators described herein may be used in lithium ion batteries, including secondary lithium batteries, resulting in batteries with improved safety and durability.

The battery separators herein may be described in several different ways.

In one aspect, a multilayer microporous membrane or film having or exhibiting at least one of following: (a) having at least one additive in at least one layer of the multilayer microporous membrane or film; (b) having or exhibiting increased or improved elasticity at or above 150° C. compared to a tri-layer microporous membrane having the same thickness, Gurley, porosity, and/or resin make-up as the multilayer microporous membrane or film; (c) having or exhibiting increased or improved compressibility compared to a tri-layer microporous membrane having the same thickness, Gurley, porosity, and/or resin make-up as the multilayer microporous membrane or film; (d) having or exhibiting increased or improved elongation at break (TD) compared to a tri-layer microporous membrane having the same thickness, Gurley, porosity, and/or resin make-up as the multilayer microporous membrane or film; (e) having or exhibiting reduced high temperature shrinkage at 150° C. compared to a tri-layer microporous membrane having the same thickness, Gurley, porosity, and/or resin make-up as the multilayer microporous membrane or film; (f) having or exhibiting reduced high temperature shrinkage at 120° C. compared to a tri-layer microporous membrane having the same thickness, Gurley, porosity, and/or resin make-up as the multilayer microporous membrane or film; (g) having at least one layer that comprises a polymer blend; (h) having a non-woven or woven attached to one or both sides of the multilayer microporous membrane or film; (i) and combinations thereof.

In some embodiments, the microporous membrane or film has at least one additive in at least one layer thereof. In some embodiments, the at least one additive is present in one or both outermost layers of the multilayer microporous membrane or film. Sometimes, the at least one additive is present in one of the outermost layers of the multilayer microporous membrane or film. Sometimes the additive is present in both of the outermost layers of the multilayer microporous membrane or film. Sometimes, the additive is present in at least one interior layer of the multilayer microporous membrane or film. Sometimes, the additive is present in at least one of the two exterior layers and at least one interior layer of the multilayer microporous film or membrane. In some preferred embodiments, each layer of the multilayer microporous membrane or film has a different compositions than each layer it is adjacent to. In some embodiments, the multilayer microporous membrane may be coated on one or both sides thereof.

The additive may comprise a polymeric additive. For example, the additive may comprise a functionalized polymer such as a maleic anhydride modified polymer. Examples of a maleic anhydride modified polymer include a maleic anhydride modified homo-polymer polypropylene, copolymer polypropylene, high-density polypropylene, or low-density polypropylene. Other examples of a maleic anhydride modified polymer include a maleic anhydride modified homo-polymer polyethylene, copolymer polyethylene, high-density polyethylene, or low-density polyethylene. In other embodiments, the additive may comprise an ionomer. For example, it may comprise a Li-, Na-, or Zn-based ionomer. In other embodiments, the additive may comprise a cellulose nanoparticle. Sometimes, the additive may comprise inorganic particles with a narrow particle size distribution. For example, the inorganic particles may be selected from at least one of $SiO_2$ particles, $TiO_2$ particles, or mixtures thereof. In other embodiments, the additive may comprise a lubricating agent.

The lubricating agent or lubricant described herein is not so limited. As understood by one of ordinary skill in the art, a lubricant is a compound that acts to reduce the frictional force between a variety of different surfaces, including the following: polymer:polymer; polymer:metal; polymer; organic material; and polymer:inorganic material. Specific examples of lubricating agents or lubricants as described herein are compounds comprising siloxy functional groups, including siloxanes and polysiloxanes, and fatty acid salts, including metal stearates. Compounds comprising two or more, three or more, four or more, five or more, six or more, seven or more, eight or more, nine or more, or ten or more siloxy groups may be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, e.g., —CH3 or C2H5. Polysiloxanes are a polymerized siloxanes, usually having a higher molecular weight. In some preferred embodiments described herein, the polysiloxanes may be high molecular weight, or even more preferred in some cases, ultra-high molecular weight polysiloxanes. In some embodiments, high and ultra-high molecular weight polysiloxanes may have weight average molecular weights ranging from 500,000 to 1,000,000.

The fatty acid salts described herein are also not so limited and may be any fatty acid salt that acts as a lubricant (and preferably do not harm battery function). The fatty acid of the fatty acid salt may be a fatty acid having between 12 to 22 carbon atoms. For example, the metal fatty acid may be selected from the group consisting of: Lauric acid, myristic acid, palmitic acid, stearic acid, oleic acid, linoleic acid, linolenic acid, palmitoleic acid, behenic acid, erucic acid, and arachidic acid. The metal is not so limited, but in preferred embodiments is an alkaline or alkaline earth metal, such as Li, Be, Na, Mg, K, Ca, Rb, Sr, Cs, Ba, Fr, and Ra. In some preferred embodiments, the metal is Li, Be, Na, Mg, K, or Ca.

In some preferred embodiments, the fatty acid salt is lithium stearate, sodium stearate, lithium oleate, sodium oleate, sodium palmitate, lithium palmitate, potassium stearate, or potassium oleate.

In some preferred embodiments described herein, the lubricant, including the fatty acid salts described herein, has a melting point of 200° C. (or 200 deg C.) or above, 210° C. or above, 220° C. or above, 230° C. or above, or 240° C. or above. A fatty acid salt such as lithium stearate (melting point of 220° C.) or sodium stearate (melting point 245 to 255° C.) has such a melting point. A fatty acid salt such as calcium stearate (melting point 155° C.) does not. The inventors of this application have found that calcium stearate may be less ideal, from a processing standpoint, especially at high add levels, than other fatty acid metal salts, e.g., metal stearates, having higher melting points. Particularly, it has been found that calcium stearate could not be added in amounts above 800 ppm without what has been termed a "snowing effect" where wax separates and gets everywhere during a hot extrusion process. Without wishing to be bound by any particular theory, using a fatty acid metal salt with a melting point above the hot extrusion temperatures is believed to solve this "snowing" problem. Fatty acid salts having higher melting points than calcium stearate, particularly those with melting points above 200° C., may be incorporated in amounts above 1% or 1,000 ppm, without "snowing." Amounts of 1% or above have been found to be important for achieving desired properties such as improved wettability and pin removal improvement. Amounts from 1,000 to 10,000 ppm, from 1,000 to 9,000 ppm, from 1,000 to 8,000 ppm, from 1,000 to 7,000 ppm, from 1,000 to 6,000 ppm, from 1,000 to 5,000 ppm, from 1,000 ppm to 4,000 ppm, from 1,000 to 3,000 ppm, or from 1,000 to 2,000 ppm are particularly preferable for this purpose in some embodiments.

In some other preferred embodiments, the fatty acid salts described herein may be water-soluble. Water-soluble herein means that the lubricant, e.g., the fatty acid salt, has a solubility equal to or greater than that of lithium stearate in water, i.e., the metal fatty acid has the same solubility or is more soluble than lithium stearate in water. The lubricating agent may be amphiphilic. The lubricating agent may also be a fatty acid salt, e.g., a fatty acid salt selected from lithium stearate and sodium stearate. In some embodiments, the lubricating agent is a compound comprising one or more siloxy functional groups, including siloxane and polysiloxane. In some embodiments, the lubricating agent may be an ultra-high molecular weight polysiloxane. In some embodiments, the additive may comprise at least one of a nucleating agent, a cavitation promoter, a fluoropolymer (e.g., PVDF), a cross-linker, an x-ray detectable material (e.g., barium sulfate), a lithium halide (e.g., lithium iodide), a polymer processing agent, a high temperature melt index (HTMI) polymer (e.g., PMP, PMMA, PET, PVDF, Aramid, syndiotactic polystyrene, and combinations thereof), an electrolyte additive (e.g., at least one selected from the group consisting of a SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver) and combinations thereof.

In some embodiments, the multilayer membrane or film has or exhibits increased or improved elasticity compared to a tri-layer microporous membrane having the same thickness, Gurley, porosity, and/or resin make-up as the multilayer microporous membrane or film. In some embodiments, tan(delta) (or Tandelta) of the membrane or film, when measured according to dynamic mechanical analysis, is greater than −0.6 at 150° C. In some embodiments, tan (delta) of the membrane or film, when measured according to dynamic mechanical analysis, is between −1.0 and −0.6 at a temperature between 175° C. and 200° C. In some embodiments, tan(delta) is between −0.9 and −0.6 at a temperature between 175° C. and 200° C. In some embodiments, tan (delta) is between −0.8 and −0.6 at a temperature between 175° C. and 200° C. In some embodiments, tan(delta) is between −0.7 and −0.6 at a temperature between 175° C. and 200° C. In some embodiments, tan(delta) of the membrane or film, when measured according to dynamic mechanical analysis, is above −1.2 at temperatures at or above 200° C. In some embodiments, tan(delta) is above −1.0 at temperatures at or above 200° C. In some embodiments, tan(delta) is above −0.8 at temperatures at or above 200° C.

In another embodiment, the microporous membrane or film has or exhibits increased or improved compressibility compared to a tri-layer microporous membrane having the same thickness, Gurley, porosity, and/or resin make-up as the multilayer microporous membrane or film. In some embodiments, recovery (%), when measured according to the compression recovery method, is greater than 9%, greater than 9.5%, greater than 10.0%, greater than 10.1%, greater than 10.2%, greater than 10.3%, greater than 10.4%, or greater than 10.5%.

In another embodiment, the microporous membrane or film has or exhibits increased or improved elongation at break (TD) compared to a tri-layer microporous membrane having the same thickness, Gurley, porosity, and/or resin make-up as the multilayer microporous membrane or film. In some embodiments, the elongation at break (TD) is more than 30% higher, more than 35% higher, more than 40% higher, more than 41% higher, more than 42% higher, or more than 45% higher compared to a tri-layer microporous membrane having the same thickness, Gurley, porosity, and/or resin make-up as the multilayer microporous membrane or film.

In another embodiment, the microporous membrane or film has a high temperature shrinkage at 120° C. that is 30 to 75% lower, 35 to 70% lower, 35 to 65% lower, or 40 to 60% lower compared to a tri-layer microporous membrane having the same thickness, Gurley, porosity, and/or resin make-up as the multilayer microporous membrane or film.

In another embodiment, at least one layer of the microporous membrane or film comprises a polymer blend. The at least one layer may be an exterior layer in some embodiments or an interior layer in some embodiments. In some embodiments, at least one exterior and at least one interior layer may comprise a polymer blend. The blend may be of at least two different polyolefins, at least two different polyethylenes, or at least two different polypropylenes in some embodiments. In some embodiments, the blend may be of at least one polyethylene and at least one polypropylene. In some embodiments, the polymer blend may comprise a polyolefin and a non-polyolefin.

In another embodiment, the microporous membrane or film may have a non-woven or woven attached to one or both sides of the membrane or film.

In some embodiments, the total thickness of the membrane or film is less than 30 microns, less than 25 microns, less than 20 microns, less than 15 microns, or less than 10 microns. The microporous membrane or film, in some embodiments, may comprise at least three layers that are all micro-layers (thickness of 1-10 microns), all nano-layers (thickness of less than 1 micron), or a combination of nano-layers and micro-layers, at least four layers that are all micro-layers (thickness of 1-10 microns), all nano-layers (thickness of less than 1 micron), or a combination of nano-layers and micro-layers, at least five layers that are all micro-layers (thickness of 1-10 microns), all nano-layers (thickness of less than 1 micron), or a combination of nano-layers and micro-layers, or at least six layers that are all micro-layers (thickness of 1-10 microns), all nano-layers (thickness of less than 1 micron), or a combination of nano-layers and micro-layers.

In another aspect, a multilayer microporous film is disclosed. The multilayer microporous film comprises two or more layers and polyethylene in one or more of the layers, wherein when this region is tested according Machine Learning Test described herein, the following is satisfied:

$$W^T x' \geq -2.0 \text{ or } W^T x' \geq -1.0.$$

In some embodiments, the following is satisfied:

$$W^T x' \geq 0.0 \text{ or } W^T x' \geq 2.0.$$

In another aspect, a multilayer microporous film is disclosed. The multilayer microporous film comprises a region, which comprises two or more layers and polypropylene in one or more of the layers, wherein when this region is tested according to the Machine Learning Test described herein, the following is satisfied:

$$W^T x' \geq -1.5 \text{ or } W^T x' \geq -1.0.$$

In some embodiments, the following is satisfied:

$$W^T x' \geq 0.5 \text{ or } W^T x' \geq 1.5.$$

In another aspect, a multilayer microporous film comprising: (1) two outermost sub-membranes comprising three or more nano-layers (thickness less than 1 micron) or micro-layers (thickness between 1 and 10 microns); and (2) at least one inner sub-membrane comprising three or more nano-layers (thickness less than 1 micron) or micro-layers (thickness between 1 and 10 microns) that comprise, consist of, or consist essentially of polypropylene is disclosed. In some embodiments, in at least one or in both of the outermost sub-membranes, the outermost micro-layer or nano-layer comprises, consists of, or consists essentially of polyethylene. In some embodiments, in at least one or in both of the outermost sub-membranes, the innermost micro-layer or nano-layer comprises, consists of, or consists essentially of a polyethylene blend. In some embodiments, in at least one outermost sub-membrane, the outermost microlayer or nano-layer comprises, consists of, or consists essentially of polyethylene and the innermost micro-layer or nano-layer comprises, consists of, or consists essentially of a polyethylene blend. In some embodiments, in both outermost sub-membranes, the outermost microlayer or nano-layer comprises, consists of, or consists essentially of polyethylene and the innermost micro-layer or nano-layer comprises, consists of, or consists essentially of a polyethylene blend. In some embodiments, the at least one inner sub-membrane is in direct contact with at least one of the outermost sub-membranes, e.g., one of the outermost sub-membranes whose innermost micro-layer or nano-layer comprises, consists of, or consists essentially of a polyethylene blend. In some embodiments, the film or membrane comprises another inner sub-membrane comprising at least three nano-layers or micro-layers, wherein at least one or both of the outermost micro-layers or nano-layers of the another inner sub-membrane comprises, consists of, or consists essentially of a polyethylene blend. In some embodiments, the nano-layers or micro-layers of the outermost sub-membranes are thinner than the nano-layers or micro-layers of the innermost sub-membrane. In some embodiments, they are 2 to 5 times thinner, 3 to 5 times thinner, or 4 to 5 times thinner. In some embodiments, the film or membrane comprises 10 to 35% or 15 to 25% polyethylene based on the total weight of the membrane or film. One embodiment as described in the foregoing paragraph is shown in FIG. 64.

In another aspect, a multilayer microporous membrane or film comprising: (1) two outermost sub-membranes comprising at least three nano-layers (less than 1 micron thick) or micro-layers (1 to 10 microns thick) (or two outermost nano-layers or micro-layers and at least on inner nano-layer or micro-layer), wherein the two outermost nano-layers or micro-layers of the outermost sub-membranes are thinner than at least one inner nano-layer or micro-layer of the outermost sub-membranes; and (2) at least one inner sub-membrane comprising at least three nano-layers or micro-layers (or two outermost nano-layers or micro-layers and at least one inner nano-layer or micro-layer), wherein the two outermost nano-layers or micro-layers of the at least one inner sub-membrane are thinner than at least one inner nano-layer or micro-layer of the at least one inner sub-membrane is disclosed. In some embodiments, the two outermost nano-layers or micro-layers of the outermost sub-membranes are 10 to 95%, 50 to 90%, 60 to 90%, 70 to 90%, or 80 to 90% thinner than the at least one inner nano-layer or micro-layer of the outermost sub-membranes. In some embodiments, the two outermost nano-layers or micro-layers of the at least one inner sub-membrane are 10 to 95%, 50 to 90%, 60 to 90%, 70 to 90%, or 80 to 90% thinner than the at least one inner nano-layer or micro-layer of the at least one inner sub-membrane. In some embodiments, the outermost nano-layers or micro-layers of the outermost sub-membranes comprise, consist of, or consist essentially of polyethylene. In some embodiments, the outermost nano-layers or micro-layers of the at least one inner sub-membrane comprise, consist of, or consist essentially of polyethylene. In some embodiments, at least one inner nano-layer or micro-layer of the outermost sub-membranes comprise, consist of, or consist essentially of polypropylene. In some embodiments, the polypropylene is a high molecular weight polypropylene. In some embodiments, the multilayer microporous membrane or film described herein comprises 10 to 35 wt. % polyethylene based on the total weight of the membrane or film. In some embodiments, the outer sub-membranes and the at least one inner sub-membrane are each separately formed by co-extrusion. After separately forming the sub-membranes by co-extrusion, each of the sub-membranes may be laminated to at least one other sub-membrane to form the multi-layer microporous membrane or film. One embodiment as described in the foregoing paragraph is shown in FIG. 54.

In another aspect, a multilayer microporous film comprising: (1) two outermost sub-membranes comprising two outermost nano-layers (less than 1 micron thickness) or micro-layers (between 1 and 10 micron thickness) and at least one inner nano-layer or micro-layer, wherein the outermost nano-layers or micro-layers of the two outermost sub-membranes comprise, consist of, or consist essentially of polyethylene and the at least one inner nano-layer or micro-layer of the two outermost sub-membranes comprises, consists of, or consists essentially of polypropylene, including a high molecular weight polypropylene; and at least one inner sub-membrane comprising two outermost nano-layers or micro-layers and at least one inner nano-layer or micro-layer, wherein the two outermost nano-layers or micro-layers of the at least one inner sub-membrane comprise, consist of, or consist essentially of polyethylene, and the at least one inner nano-layer or micro-layer of the at least one inner sub-membrane comprises, consists of, or consists essentially of polypropylene, including a high molecular weight polypropylene is disclosed. In some embodiments, the outermost sub-membranes at the at least one inner sub-membrane comprise two or more, three or more, four or more, or five or more nano-layers or micro-layers. In some embodiments, all of the inner nano-layers or micro-layers comprise, consist of, or consist essentially of polypropylene, including a high molecular weight polypropylene. In some embodiments, the multilayer microporous film or layer comprises 10 to 35 wt. % or 15 to 25 wt. % polyethylene based on the total weight of the membrane of film. In some embodiments, the sub-membranes are formed by co-extrusion, and in some embodiments, after formation of the sub-membranes by co-extrusion, each sub-membrane is laminated to at least one other sub-membrane to form the microporous membrane or film. One embodiment as described in the foregoing paragraph is shown in FIG. 55.

In another aspect, a multilayer microporous membrane or film comprising: (1) two outermost sub-membranes comprising two or more nano-layers (less than 1 micron thick) or micro-layers (1 to 10 microns thick), wherein an outermost nano-layer or micro-layer of the outermost sub-membranes that is also an outermost nano-layer or micro-layer of the multilayer microporous membrane or film comprises polysiloxane; and (2) at least one inner sub-membrane comprising two or more nano-layers or micro-layers. In some embodiments, the amount of polysiloxane or siloxane is in an amount of 1 to 10 wt. % or 1 to 3 wt. % based on the total weight of the nano-layer or micro-layer of the outermost sub-membrane that the polysiloxane or siloxane is present in. In some embodiments, there are two inner sub-membranes and the inner and outermost sub-membranes each have three or more micro-layers or nano-layers. These are 12 or more micro-layer or nano-layer embodiments. In some 12 or more micro-layer or nano-layer embodiments, an outermost nano-layer or micro-layer of each inner sub-membrane may be in contact with one another and comprise, consist of, or consist essentially of the same resin. In some embodiments they may have identical compositions. In some 12 or more micro-layer or nano-layer embodiments, an outermost nano-layer or micro-layer of each inner sub-membrane is in contact with an outermost nano-layer or micro-layer of an outermost sub-membrane, and the outer most nano-layer or micro-layer of each inner sub-membrane comprises, consists of, or consists essentially of the same resin as the outermost nano-layer or micro-layer of an outermost sub-membrane that it is in contact with. In some embodiments, they have the same composition. In some embodiments, there is one inner sub-membrane and the inner sub-membrane and the outermost sub-membranes each have six or more micro-layers or nano-layers. These are 18 or more micro-layer or nano-layer embodiments. In some 18 or more micro-layer or nano-layer embodiments, both outermost micro-layers or nano-layers of the outermost sub-membranes comprise siloxane or polysiloxane or siloxane. In some 18 or more micro-layer or nano-layer embodiments, siloxane or polysiloxane are present in an amount from 1 to 10 wt. % or 1 to 3 we. % based on the total weight of the micro-layer or nano-layer that the siloxane or polysiloxane is contained in. In some 18 or more micro-layer or nano-layer embodiments, the outermost micro-layers or nano-layers of the outermost sub-membranes also comprise polypropylene in addition to siloxane or polysiloxane. In some 18 or more micro-layer or nano-layer embodiments, the outermost micro-layers or nano-layers of the inner submembrane comprise, consist of, or consist essentially of polypropylene. In some 18 or more micro-layer or nano-layer embodiments, the inner micro-layers or nano-layers of the inner sub-membrane comprise, consist of, or consist essentially of at least one of polypropylene, a polypropylene blend, polyethylene, or a polyethylene blend. In some 18 or more micro-layer or nano-layer embodiments, the inner micro-layers or nano-layers of the inner sub-membrane include a micro-layer or nano-layer of PP, a micro-layer or nano-layer of a PE blend, a micro-layer or nano-layer of a PE blend, and a micro-layer or nano-layer of PP in that order. In some 18 or more micro-layer or nano-layer embodiments, the inner micro-layers or nano-layers of the outermost sub-membranes comprise, consist of, or consist essentially of at least one of polypropylene, a polypropylene blend, polyethylene, or a polyethylene blend. In some 18 or more micro-layer or nano-layer embodiments, the inner micro-layers or nano-layers of the outermost sub-membranes include a micro-layer or nano-layer of PP, a micro-layer or nano-layer of a PE blend, a micro-layer or nano-layer of a PE blend, and a micro-layer or nano-layer of PP in that order. In some embodiments, there are three or more inner sub-membranes and each of the inner and outermost sub-membranes comprise three or more micro-layers or nano-layers. These are 15 or more micro-layer or nano-layer embodiments. In some embodiments, the inner and outer-most sub-membranes have only three micro-layers or nano-layers. These are 15 micro-layer or nano-layer embodiments. In these 15 micro-layer or nano-layer embodiments, the inner sub-membranes may each comprise, consist of, or consist essentially of polyethylene. In some embodiments, the micro-layers or nano-layers of the two inner sub-membranes each consist of or consist essentially of polyethylene. In some 15 micro-layer or nano-layer embodiments, the nano-layers or micro-layers of one of the inner sub-membranes each comprise, consist of, or consist essentially of polypropylene. In some 15 micro-layer or nano-layer embodiments, the one inner sub-membranes with nano-layers or micro-layers comprising, consisting of, or consisting essentially of polypropylene comprises a nano-layer or micro-layer comprising, consisting of, or consisting essentially of a polypropylene blend, a nano-layer or micro-layer comprising, consisting of, or consisting essentially of a polypropylene, and a nano-layer or micro-layer comprising, consisting of, or consisting essentially of a polypropylene blend, in that order. In some 15 micro-layer or nano-layer embodiments, the two inner sub-membranes with nano-layers or micro-layers comprising, consisting of, or consisting essentially of polyethylene and the one inner sub-membrane with nano-layers or micro-layers comprising, consisting of, or consisting essentially of polypropylene are provided in the following order: sub-membrane with nano-layers or micro-layers comprising, consisting of, or consisting essentially of polyethylene; sub-membrane with nano-layers or micro-layers comprising, consisting of, or consisting essentially of polypropylene; sub-membrane with nano-layers or micro-layers comprising, consisting of, or consisting essentially of polyethylene. In some 15 or more micro-layer or nano-layer embodiments, the nano-layers or micro-layers of the outermost sub-membranes each individually comprise, consist of, or consist essentially of polypropylene only, a blend of polypropylene and another resin, or a blend of polypropylene and polysiloxane. In some 15 or more micro-layer or nano-layer embodiments, the outermost sub-membranes comprise, consist or consist essentially of a nano-layer or micro-layer consisting of a blend of polypropylene and polysiloxane, a nano-layer or micro-layer consisting or polypropylene, and a nano-layer or micro-layer consisting of a blend of polypropylene and another resin in that order. In some embodiments, the membrane or film comprising polysiloxane or siloxane comprises 10 to 30 wt. % or 15 to 25 wt. % polyethylene based on the total weight of the membrane or film.

In some embodiments, the membrane or film herein comprising polysiloxane or siloxane has micro-layers or nano-layers all having the same thickness or having different thicknesses. In some embodiments, the membrane or film herein comprising polysiloxane or siloxane is made by forming each sub-membrane using co-extrusion. In some embodiments, each co-extruded sub-membranes is then laminated to at least one other co-extruded sub-membrane to form the membrane or film. One embodiment as described in the foregoing paragraph is shown in FIGS. 56-59.

In another aspect, a multilayer microporous membrane or film comprising: (1) two outermost sub-membranes comprising six or more nano-layers (having a thickness less than 1 micron) or micro-layers (having a thickness between 1 and 10 microns); and (2) at least one inner sub-membrane comprising six or more nano-layers or micro-layers. In some embodiments, there is one inner sub-membrane and the inner sub-membrane and the two outermost sub-membranes each comprise six micro-layers or nano-layers. This is an 18-layer embodiment. In some 18-layer embodiments, the outermost micro-layers or nano-layers of the outermost sub-membranes comprise, consist of, or consist essentially of polypropylene. In some 18-layer embodiments, the outermost micro-layers or nano-layers of the inner sub-membrane comprises, consist of, or consists essentially of a blend of polypropylene and another resin. In some 18-layer embodiments, middle two micro-layers or nano-layers of the two outermost sub-membranes and the inner sub-membrane comprise, consist of, or consist essentially of polyethylene. In some embodiments the middle two micro-layers or nano-layers of the two outermost sub-membranes are in direct contact with each other and on either side of the two middle micro-layers or nano-layers of the two outermost sub-membranes is one micro-layer or nano-layer comprising, consisting of, or consisting essentially of a blend comprising polypropylene and another resin. In some 18-layer embodiments, the middle two micro-layers or nano-layers of the inner sub-membrane are in direct contact with each other and on either side of the two middle micro-layers or nano-layers of the inner sub-membrane is one micro-layer or nano-layer comprising, consisting of, or consisting essentially of a polypropylene. In some embodiments it is a polypropylene blend, e.g., with polypropylene and a propylene-ethylene elastomer. In some embodiments, all the micro-layers or nano-layers have the same thickness and in some embodiments they do not. In some embodiments, the multilayer membrane or film is formed by co-extruding each of the sub-membranes, and in some embodiments, laminating each sub-membrane to at least one other sub-membrane. In some embodiments, the multilayer microporous membrane comprises 10 to 35 wt. %, preferably 15 to 25 wt. %, of polyethylene based on the total weight of the membrane or film. One embodiment as described in the foregoing paragraph is shown in FIG. 60.

In another aspect, a battery separator comprising, consisting of, or consisting essentially of any multilayer microporous membrane described herein. In some embodiments, the membrane or film is coated on one or two sides thereof. In some embodiments, the coating is a ceramic coating comprising, consisting of, or consisting essentially of inorganic or organic particles and a polymeric binder.

In another aspect, a battery comprising the battery separator described herein is described.

In another aspect, a vehicle or device comprising the battery described herein is described.

In yet another aspect, a textile comprising, consisting of, or consisting essentially of at least one multilayer microporous membrane or film described herein.

In still another aspect, a textile comprising, consisting of, or consisting essentially of at least one multilayer microporous membrane or film described herein and a non-woven or woven is described. In some embodiments, the non-woven or woven is attached to the multilayer microporous membrane or film.

In another aspect, a method for forming the multilayer microporous membrane or film is described herein. The method comprises at least the steps of coextruding at least two layers and laminating the at least two coextruded layers to one other layer, or in some embodiments to two other layers, to form the multilayer microporous membrane. In some embodiments, at least two, three, four, five, six, seven, eight, nine, or ten layers are coextruded. In some embodiments, the at least one other layer or at least one of the at least two other layers are coextruded layers. In some embodiments, at least one of the other layers are monoextruded layers. In embodiments where the at least two coextruded layers are laminated to two other layers, sometimes, one of the two other layers is laminated on a first side of the at least two coextruded layers and the second of the two other layers is laminated on a side of the at least two coextruded layers that is opposite to the first side. At least one of the two other layers may be a coextruded layer. In some embodiments, both of the two other layers are coextruded layers. In some embodiments, at least one of the at least two coextruded layers and the other layers comprise a polyolefin or polyolefin blend. For example, they may comprise a polyethylene or a polyethylene blend or a polypropylene or a polypropylene blend. In some embodiments, at least one of the at least two coextruded layers comprise polyethylene and at least one or both of the other layers comprise polypropylene or a polyethylene blend. In some embodiments, at least one of the at least two coextruded layers comprise polyethylene and at least one or both of the other layers comprise polypropylene or a polypropylene blend. In some embodiments, each of the two other layers comprises polyethylene or a polyethylene blend. In some embodiments, each of the two other layers comprise polypropylene or a polypropylene blend. In some embodiments, one or both of the two other layers are coextruded layers that were coextruded with 2 or more, 3 or more, 4 or more, 5 or more, 6 or more, 7 or more, 8 or more, or 9 or more other layers. When the layers are coextruded with 9 other layers, the total number of coextruded layers is 10.

In another aspect, a method for manufacturing a multilayer microporous membrane comprising at least one additive in at least one layer thereof is disclosed. In some embodiments, the method comprises a step of co-extruding a polymer mixture comprising an additive with at least one other polymer mixture to form a co-extruded precursor film. In other embodiments, the method comprises a step of mono-extruding a polymer mixture comprising an additive to form a mono-extruded precursor film and another step of laminating the mono-extruded precursor film to at least one other film. Lamination may involve the application of at least one of heat, pressure, or a combination thereof. In the method where a co-extruded precursor film is formed, and additional step of laminating the co-extruded precursor film to at least one other film may also be included.

In another aspect, a multilayer microporous membrane is described herein that exhibits an increase in puncture average (g) when tested at a high puncture speed over 25 mm/min compared to the puncture average (g) at 25 mm/min. In some embodiments, the high puncture speed may be 100 mm/min. The puncture average (g) at 100 mm/min may be 20 g higher, 30 g higher, 40 g higher, or 50 g higher than puncture average (g) measured at 25 mm/min. In some embodiments, the multilayer membrane described herein has an average puncture above 250 g at 25 mm/min, above 275 g at 25 mm/min, above 300 g at 25 mm/min, above 325 g at 25 mm/min, or above 350 g at 25 mm/min. In some embodiments, the thickness of the multilayer microporous membrane may be from 14 to 30 microns.

In another aspect, a multilayer microporous membrane formed by a collapsed bubble method is disclosed. The microporous membrane formed by the collapsed bubble method has a thickness less than 14 microns and a puncture strength greater than 200 g. In some embodiments, the thickness is from 6 to 12 microns, and sometimes the thickness is about 10 microns. In some embodiments, the puncture strength is 210 g or more, 220 g or more, 230 g or more, or 240 g or more The microporous membrane formed by a collapsed bubble method may have a structure formed by collapsing a bubble that comprises co-extruded PP/PP/PE, PP/PE/PE, PP/PP, PE/PE, PE/PP, PE/PP/PP, or PP/PE/PP/PE. The microporous membrane may comprise a discernible interface, when a cross-section SEM is taken, formed when the bubble collapses.

In some embodiments, the microporous membrane has a low Gurley, such as a Gurley less than 250, less than 225, less than 200, less than 190, less than 180 or less than 175 (s/100 cc).

In some embodiments, the microporous membrane comprises a polyethylene having a melt flow rate from 0.1 to 10 g/min. The microporous membrane may have at least one layer that comprises polyethylene and has a thickness of at least 1.75 microns. In some embodiments, the layer that comprises polyethylene has a thickness of at least 2 microns. In some embodiments, the layer that comprises polyethylene has a thickness of less than 1.75 microns.

In some embodiments, the membrane comprises polypropylene having a melt flow rate from 0.01 to 10 g/10 min, from 0.1 to 5 g/10 min, or from 0.01 to 2.5 g/10 min when measured according to ASTM D1238-13 and/or ISO 1133-1:2011.

BRIEF DESCRIPTION OF FIGURES

FIG. 16 shows that numerous different embodiments are possible in one 9 microlayer membrane and that variation in the sublayers and individual microlayers are possible and possibly desired. For example, one may want to add some PE in the outer most PP microlayers to increase adhesion, wettability, lamination bond strength, and/or the like.

FIG. 14 shows that numerous different embodiments are possible and that variation in the use of PP or PE sublayers are possible and possibly desired. For example, one may want to add some PE in the outer or center sublayers to increase adhesion, wettability, lamination bond strength, or to provide a center shutdown function, and/or the like.

FIG. 15 lists many non-limiting exemplary embodiments, features, advantages, or structures of the inventive Multilayer products and concepts.

FIG. 16 is a cross-section SEM at 10,000× showing the PP/PE/PP sublayers of the 9 microlayer (each sublayer has 3 microlayers) about 14 um membrane with an about 3.11 um thick center PE sublayer (with each PE microlayer of only about 1.037 um thick each). The present invention can be used to create multi-microlayer structures from polyolefin resins with superior performance to other PO membranes, with 2 um or less each thick microlayers, with 1.5 or less um each thick microlayers, with 1.3 or less um each thick microlayers, with 1.15 or less um each thick microlayers, with 1.05 or less um each thick microlayers, and/or the like.

FIG. 18 includes SEM images of polypropylene layers of more conventional tri-layer products described herein.

FIG. 19 includes SEM images of polyethylene layers of multilayer products according to some embodiments described herein.

FIG. 20 includes SEM images of polyethylene layers of more conventional tri-layer products described herein.

FIGS. 27 to 39 are respective schematic representations of certain coextruded multilayer precursors, membranes or separators according to some additional embodiments described herein.

FIG. 44 shows peak analysis for multilayer microporous membranes according to some embodiments described herein and for a tri-layer microporous membrane.

FIG. 50 is a table including compressibility data for multi-layer and tri-layer microporous membranes according to some embodiments described herein.

FIG. 51 is a table including elongation at break data for a multi-layer and a tri-layer embodiment described herein.

FIG. 52 is a table including high temperature shrinkage data at 120° C. for a multi-layer and a tri-layer embodiment described herein.

FIG. 61 is a table including data for a control sample comprising no polymeric additive and samples comprising varying amounts and types of functionalized polymer according to some embodiments described herein.

FIG. 62 is a table including data for a control sample comprising no polymeric additive and samples comprising varying amounts and types of functionalized polymer according to some embodiments described herein.

FIG. 63 includes SEM images (5,000×) for a control samples comprising no polymeric additive and samples comprising varying amounts and types of functionalized polymer according to some embodiments described herein.

FIG. 64 includes SEM images (20,000× sides A & B) for a control samples comprising no polymeric additive and samples comprising varying amounts and types of functionalized polymer according to some embodiments described herein.

FIG. 65 is a table including data for control samples comprising no additive and for samples comprising varying amounts and types of additives according to some embodiments described herein.

FIG. 68 is a Table including data collected for some embodiments described herein.

FIG. 70 is a Table including data collected for some embodiments described herein.

DETAILED DESCRIPTION OF THE INVENTION

Figure 1:
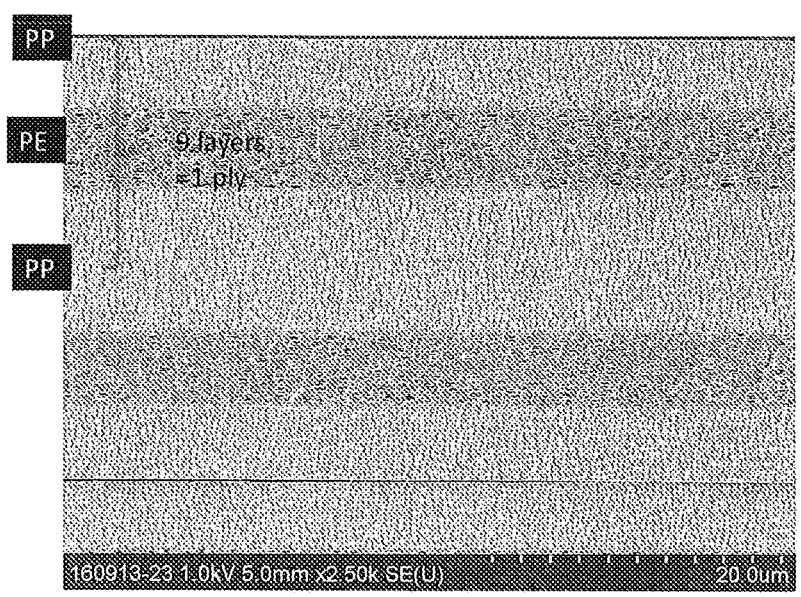
FIG. 1 is a partial cross-section Scanning Electron Micrograph (SEM) of an exemplary inventive laminated 3 layer or triple trilayer microporous membrane tri-layer/tri-layer/tri-layer (with 9 coextruded microlayers per each trilayer layer, and with 3 microlayers per each PP or PE sub-layer of each trilayer layer) at a magnification of 2,500× (at least the outer PP layers of each layer are microporous).
Figure 2:
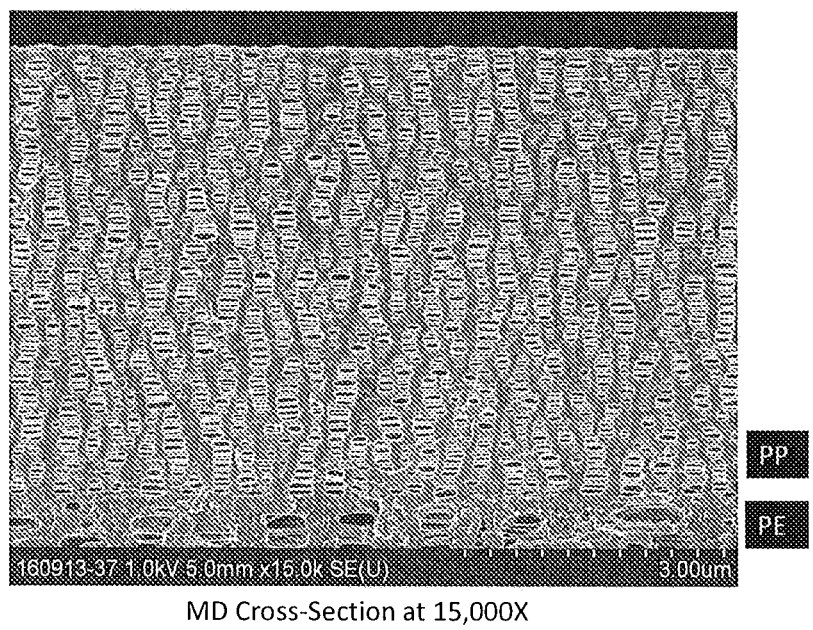
FIG. 2 is a partial cross-section Scanning Electron Micrograph (SEM) of a portion of the polypropylene surface sub-layer (3 microlayers of PP) of the surface trilayer component or sub-membrane of the composite laminated membrane of FIG. 1 at a magnification of 15,000× (the PP sublayer is enlarged and is actually 3 co-extruded PP microlayers with difficult to discern interfaces).
Figure 3:
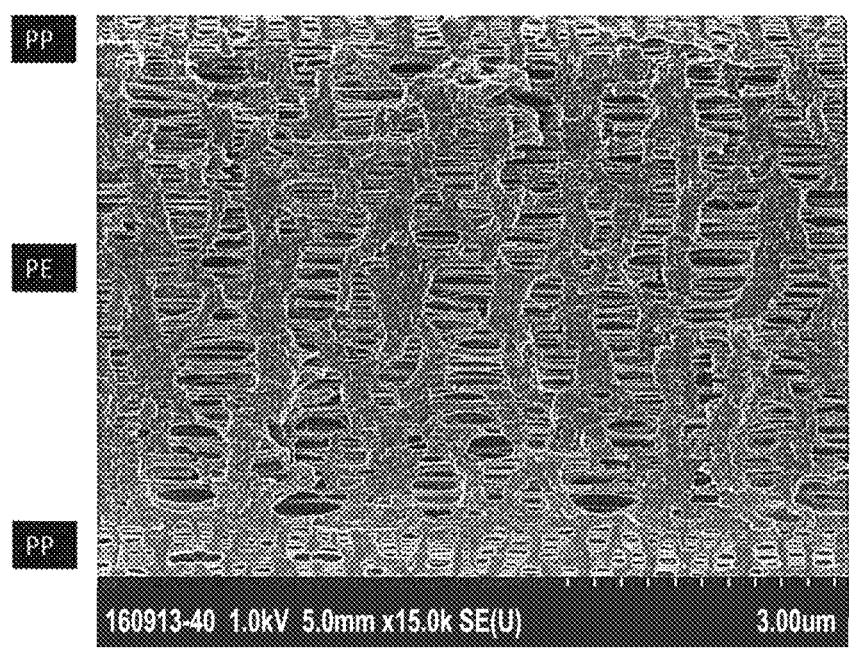
FIG. 3 is a partial cross-section Scanning Electron Micrograph (SEM) of the polyethylene sub-layer (3 microlayers of PE) of one of the 9 microlayer trilayer layers of the 3 layer membrane of FIG. 1 at a magnification of 15,000× (the PE sublayer is enlarged).

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Described herein is the following: a microporous multi-layer film or membrane; a battery separator comprising at least one of the microporous multilayer film or membrane; a battery, particularly a lithium-ion battery, comprising at least one of the battery separators described herein, a device comprising the batteries described herein, and a method for making the microporous multilayer film or membrane.

The multilayer microporous film or membrane exhibits improved properties, particularly when compared to past tri-layer and multilayer microporous films having the same thickness, Gurley, and/or porosity. Improved properties of the films or membranes include, but are not limited to, improved puncture strength (gf) compared to prior tri-layer and multi-layer products, improved mixed penetration average (N) compared to prior tri-layer and multi-layer products, improved elongation ($kgf/cm^2$) compared to prior tri-layer and multi-layer products, faster shutdown speed ($ohm-cm^2$) compared to prior tri-layer and multi-layer products, higher average dielectric breakdown (DB) values (V) compared to prior tri-layer and multi-layer products, lower DB standard deviation (V) compared to prior tri-layer and multi-layer products, higher minimum DB values (V) compared to prior tri-layer and multi-layer products, passage of industry nail penetration tests that were not passed by prior tri-layer and multi-layer microporous films, improved cycle life, can contain at least one additive in at least one layer thereof, have improved elasticity above 150° C., have improved compressibility, have improved elongation at break (TD), have improved high temperature shrinkage at 150° C., have improved high temperature shrinkage at 120° C., can have at least one polymer blend in at least one layer thereof, and can have a non-woven or woven attached to one or both sides thereof compared to past tri-layer and multi-layer products. It was also found that the multilayer microporous films herein have a unique structure. The unique structure of these films explains many of the improved properties observed.

Battery Separator

The battery separator herein comprises, consists of, or consists essentially of a (i.e., one or more) multilayer microporous membranes or multilayer microporous films, and optionally a coating layer on one or both sides of the film. The film itself, i.e., without a coating or any other additional components, exhibits the improved properties described above. The performance of the films may be further enhanced by the addition of coatings or other additional components.

(1) Multilayer Microporous Film or Membrane

In some embodiments, the multilayer membrane or multilayer microporous film comprises 4 or more, 5 or more, 6 or more, 7 or more, 8 or more, 9 or more 11 or more, 12 or more, 13 or more, 14 or more, 15 or more, 15 or more, 16 or more 17 or more, 18 or more, 19 or more, 20 or more, 21 or more, 22 or more, 23 or more, 24 or more, 25 or more, 26 or more, 27 or more, 28 or more, 29 or more, 30 or more, 40 or more, 50 or more, 60 or more, 70 or more, 80 or more, 90 or more, or 100 or more layers. What is meant by the term "layer" includes a mono-extruded layer having a thickness from 2 to 20 microns. As understood by those skilled in the art, a mono-extruded layer is a layer that was extruded by itself, not with any other layers. Also, the layers of a co-extruded bi-layer, tri-layer, or multi-layer film are each considered to be a "layer" for purposes of determining whether a given battery separator is a multilayer battery separator. The number of layers in coextruded bi-layer will be two, the number of layers in a co-extruded tri-layer will be three, and the number of layers in a co-extruded multi-layer film will be two or more, preferably three or more, or four or more. The exact number of layers in a bi-layer, tri-layer, or multi-layer co-extruded film is dictated by the die design and not necessarily the materials that are co-extruded to form the co-extruded film. For example, a co-extruded bi-, tri-, or multi-layer film may be formed using the same material to form each of the two, three, or four or more layers, and these layers will still be considered to be separate layers even though each is made of the same material. The exact number, again, will be dictated by the die design. The layers of the co-extruded bi-, tri-, or multi-layer films each have a thickness of 0.01 to 20 microns, preferably 0.1 to 5 microns, most preferably 0.1 to 3 microns, 0.1 to 2 microns, 0.1 to 1 microns, 0.01 to 0.9 microns, 0.01 to 0.8 microns, 0.01 to 0.7 microns, 0.01 to 0.6 microns, 0.01 to 0.5 microns, 0.01 to 0.4 microns, 0.01 to 0.3 microns, or 0.01 to 0.2 microns. These layers are microlayers.

In some embodiments, the multilayer microporous film or multilayer microporous membrane disclosed herein comprises two or more, or preferably three or more co-extruded layers. Co-extruded layers are layers formed by a co-extrusion process. The at least two, or preferably at least three consecutive coextruded layers may be formed by the same or separate co-extrusion processes. For example, the at least two or at least three consecutive layers may be formed by the same co-extrusion process or two or more layers may be coextruded by one process, two or layers may be coextruded by a separate process, and the two or more layers formed by the one process may be laminated to the two or more layers formed by the separate process so that combined there are four or more consecutive coextruded layers. In some preferred embodiments, the two or more, or preferably three or more co-coextruded layers are formed by the same co-extrusion process. For example, two or more, or preferably three or more, four or more, five or more, six or more, seven or more, eight or more, nine or more, ten or more, fifteen or more, twenty or more, twenty-five or more, thirty or more, thirty-five or more, forty or more, forty-five or more, fifty or more, fifty-five or more or sixty or more co-extruded layers may be formed by the same co-extrusion process. In further preferred embodiments, the extrusion process is performed by extruding two or more polymer mixtures, that may be the same or different, with or without a solvent. The preferred co-extrusion process is a dry process, e.g., Celgard® dry process, which does not use a solvent.

In some embodiments, the multilayer microporous film or multilayer membrane described herein is made by forming a coextruded bi-layer (two coextruded layer), tri-layer (three coextruded layers), or multi-layer (two or more, preferably three or more or four or more co-extruded layers) film and then laminating the bi-layer, tri-layer, or multi-layer film to at least one, but preferably sometimes two other films. The at least one, but preferably sometimes two, other films may be a non-woven or woven film, mono-extruded films, or a co-extruded films. In preferred embodiments, the other films are co-extruded films having the same number of co-extruded layers as the co-extruded bi-layer, tri-layer, or multi-layer films. For example, if a co-extruded tri-layer film is formed, the other layers are also co-extruded tri-layers.

Lamination of the bi-layer, tri-layer, or multilayer co-extruded film with at least one other mono-extruded monolayer film or a bi-layer, tri-layer, or multi-layer film may involve use of heat, pressure, or preferably heat and pressure.

In some embodiments, co-extrusion and lamination steps may be part of a bubble or blown film extrusion method. In such a method, two or more polymers, which may be the same or different, are co-extruded to form the bubble, and lamination occurs when the bubble is collapsed on itself. Collapsing devices include roller collapsing devices (including spreader rollers, nip rollers, and segmented rollers) and air collapsing devices.

The polymers or co-polymers that may be used in the instant battery separator are those that are extrudable. Such polymers are typically referred to as thermoplastic polymers.

In some embodiments, one or more of the layers of the multilayer microporous film or multilayer membrane comprises a polymer or co-polymer or a polymer or co-polymer blend, preferably a polyolefin or polyolefin blend. A polyolefin blend, as understood by one of ordinary skill in the art, may include a mixture of two or more different kinds of polyolefin, e.g., polyethylene and polypropylene, a blend of two or more of the same kind of polyolefin, wherein each polyolefin has a different property, e.g., a or ultra-high molecular weight polyolefin and a low or ultra-low molecular weight polyolefin, or a mixture of a polyolefin and another type of polymer or co-polymer or any additive.

Polyolefins include, but are not limited to: polyethylene, polypropylene, polybutylene, polymethylpentene, copolymers thereof, and blends thereof. In some embodiments, the polyolefin can be an ultra-low molecular weight, a low-molecular weight, a medium molecular weight, a high molecular weight, or an ultra-high molecular weight polyolefin, e.g., a medium or a high weight polyethylene (PE) or polypropylene (PP). For example, an ultra-high molecular weight polyolefin may have a molecular weight of 450,000 (450 k) or above, e.g. 500 k or above, 650 k or above, 700 k or above, 800 k or above, 1 million or above, 2 million or above, 3 million or above, 4 million or above, 5 million or above, 6 million or above, etc. A high-molecular weight polyolefin may have a molecular weight in the range of 250 k to 450 k, e.g., 250 k to 400 k, 250 k to 350 k, or 250 k to 300 k. A medium molecular weight polyolefin may have a molecular weight from 150 to 250 k, e.g., 100 k, 125 k, 130K, 140 k, 150 k to 225 k, 150 k to 200 k, 150 k to 200 k, etc. A low molecular weight polyolefin may have a molecular weight in the range of 100 k to 150 k, e.g., 100 k to 125 k. An ultra-low molecular weight polyolefin may have a molecular weight less than 100 k. The foregoing values are weight average molecular weights. In some embodiments, a higher molecular weight polyolefin may be used to increase strength or other properties of the microporous multilayer membranes or batteries comprising the same as described herein. In some embodiments, a lower molecular weight polymer, e.g., a medium, low, or ultra-low molecular weight polymer may be beneficial. For example, without wishing to be bound by any particular theory, it is believed that the crystallization behavior of lower molecular weight polyolefins may result in a microporous multilayer film having smaller pores resulting from at least an MD stretching process that forms the pores.

Exemplary thermoplastic polymers, blends, mixtures or copolymers other than polyolefin polymers, blends, or mixtures may include, but are not limited to: polyacetals (or polyoxymethylenes), polyamides, polyesters, polysulfides, polyvinyl alcohols, polyvinyl esters, and polyvinylidenes (and may include PVDF, PVDF:HFP, PTFE, PEO, PVA, PAN, or the like). Polyamides (nylons) include, but are not limited to: polyamide 6, polyamide 66, Nylon 10, 10, polyphthalamide (PPA), co-polymers thereof, and blends thereof. Polyesters include, but are not limited to: polyester terephthalate, polybutyl terephthalate, copolymers thereof, and blends thereof. Polysulfides include, but are not limited to, polyphenyl sulfide, copolymers thereof, and blends thereof. Polyvinyl alcohols include, but are not limited to: ethylene-vinyl alcohol, copolymers thereof, and blends thereof. Polyvinyl esters include, but are not limited to, polyvinyl acetate, ethylene vinyl acetate, copolymers thereof, and blends thereof. Polyvinylidenes include, but are not limited to: fluorinated polyvinylidenes (e.g., polyvinylidene chloride, polyvinylidene fluoride), copolymers thereof, and blends thereof. Various materials may be added to the polymers. These materials are added to modify or enhance the performance or properties of an individual layer or the overall separator. Such materials include, but are not limited to: Materials to lower the melting temperature of the polymer may be added. Typically, the multi-layered separator includes a layer designed to close its pores at a predetermined temperature to block the flow of ions between the electrodes of the battery. This function is commonly referred to as shutdown.

In some embodiments, each layer of the multilayer microporous film or multilayer membrane comprises, consists of, or consists essentially of a different polymer or co-polymer or polymer or co-polymer blend. In some embodiments each layer comprises, consists of, or consists essentially of the same polymer or co-polymer or polymer or co-polymer blend. In some embodiments, alternating layers of the multilayer microporous film or the multilayer membrane comprise, consist of, or consist essentially of the same polymer or co-polymer or polymer or co-polymer blend. In other embodiments, some of the layers of the multilayer membrane or microporous multilayer film comprise, consist of, or consist essentially of the same polymer or polymer blend and some do not.

Although it may be preferred that each of the layers or microlayers comprise, consist of, or consist essentially of polyolefin (PO) such as PP or PE or PE+PP blends, mixtures, co-polymers, or the like, it is contemplated that other polymers (PY), additives, agents, materials, fillers, and/or particles (M), and/or the like may be added or used and may form layers or microlayers such as PP+PY, PE+PY, PP+M, PE+M, PP+PE+PY, PE+PP+M, PP+PY+M, PE+PY+M, PP+PE+PY+M, or blends, mixtures, co-polymers, and/or the like thereof.

Also, identical, similar, distinct, or different PP or PE or PE+PP polymers, homopolymers, copolymers, molecular weights, blends, mixtures, co-polymers, or the like may be used. For example, identical, similar, distinct, or different molecular weight PP, PE, and/or PP+PE polymers, homopolymers, co-polymers, multi-polymers, blends, mixtures, and/or the like may be used in each layer. As such, constructions may include various combinations and subcombinations of PP, PE, PP+PE, PP1, PP2, PP3, PE1, PE2, PE3, PP1+PP2, PE1+PE2, PP1+PP2+PP3, PE1+PE2+PE3, PP1+PP2+PE, PP+PE1+PE2, PP1/PP2, PP1/PP2/PP1, PE1/PE2, PE1/PE2/PP1, PE1/PE2/PE3, PP1+PE/PP2, or other combinations or constructions.

In some embodiments, one or more additives may be added to the outermost layers of the multilayer microporous film or the multilayer membrane to improve the properties thereof or the properties of the battery separator or battery comprising the same. The outermost layer may comprise PE, PP, or PE+PP in addition to the additive. For example, to improve pin removal (i.e., lower the coefficient of friction of the film or membrane), additives such as lithium stearate, calcium stearate, PE beads, siloxane, and polysiloxanes may be added.

In addition, particular polymers, co-polymer or polymer or co-polymer blends may be used in the outermost layers of the multilayer microporous film or the multilayer membrane to improve the properties thereof or the properties of the battery separator or battery comprising the same. For example, adding an ultra-high molecular weight polymer or co-polymer in the outermost layer may improve puncture strength.

In further embodiments additives to improve oxidation resistance may be added to the outermost layers of the multilayer microporous film or membranes. The additive may be an organic or inorganic additive or a polymeric or non-polymeric additive.

In some embodiments, the outermost layers of the multilayer film or membrane may comprise, consist of, or consist essentially of polyethylene, polypropylene, or a mixture thereof.

In some embodiments, the microporous multilayer film or membrane may comprise three or more distinct regions or sub-membrane areas. In a preferred embodiment, one or more of the regions or sub-membrane areas may comprise, consist of, or consist essentially of two or more layers, which may or may not be co-extruded layers. In some preferred embodiments, the two or more layers are co-extruded layers. In some embodiments, there is a lamination barrier between region or sub-membrane area and an adjacent region or sub-membrane area. A lamination barrier is formed when two surfaces, e.g., two surfaces of different films or layer are laminated together using heat, pressure, but preferably heat and pressure. In some embodiments, the sub-membrane areas have the following non-limiting constructions: PP, PE, PP/PP, PP/PE, PE/PP, PE/PE, PP/PP/PP, PP/PP/PE, PP/PE/PE. PP/PE/PP, PE/PP/PE, PE/PE/PP, PP/PP/PP/PP, PP/PE/PE/PP, PE/PP/PP/PE, PP/PE/PP/PP, PE/PE/PP/PP, PE/PP/PE/PP, PP/PE/PE/PE/PP, PE/PP/PP/PP/PE, PE/PP/PE/PP/PP, PE/PE/PP/PP/PE/PE, PP/PE/PP/PE/PP, PP/PE/PP/PE/PP, PE/PE/PP/PP/PE/PE, PE/PE/PP/PP/PE/PP, PP/PE/PP/PE, PP/PP/PP/PE/PP/PP, PE/PE/PP/PP/PE/PE, PP/PE/PP/PE/PP/PE/PP, PE/PP/PE/PP/PE/PE/PP/PE, PP/PE/PP/PE/PP/PE/PE, PP/PE/PE/PP/PP/PE/PE, PE/PP/PP/PE/PP/PP/PE, PE/PP/PP/PP/PE/PE, PP/PE/PP/PP/PP/PE, PP/PP/PE/PE/PP/PP/PEPE/PP/PP, PP/PP/PP/PP/PE/PE/PE/PE, PP/PP/PP/PP/PE/PP/PP/PP, PE/PE/PE/PP/PE/PE/PE, PP/PE/PP/PE/PP/PE/PP/ PE/PP, PE/PP/PE/PP/PE/PP/PE/PE, PE/PE/PE/PE/ PP/PP/PP/PP, PP/PP/PP/PP/PP/PE/PE/PE/PE, PP/PP/PP/ PP/PP/PE/PE/PE/PE, PE/PE/PE/PE/PP/PP/PP/ PP, PP/PE/PP/PE/PP/PE/PP/PE, PE/PP/PE/PP/PE/ PP/PE/PE/PP/PP, PE/PE/PP/PP/PP/PP/PP/PE, PP/PE/PE/PE/PP/PE/PE/PE/PP, PP/PP/PE/PP/ PP/PE/PE/PE/PE/PP/PE/PE/PE/PP/PE/PE, PP/PP/PE/PP/PP, PE/PE/PP/PP/PP/PP/PP/PE, PP/PP/PP/PE/PE/PP/PP/PP/PE, PE/PE/PE/PP/PE/ PE/PE/PP/PP. Herein PE denotes a layer or microlayer, e.g., a co-extruded layer or microlayer, of the regions or sub-membrane areas that comprises, consists of, or consists essentially of PE. Herein PP denotes a layer or microlayer, e.g., a co-extruded layer or microlayer, of the regions or sub-membrane areas that comprises, consists of, or consists essentially of PP. The PE or PP of the different layers or microlayers may be the same or different. Similar variations including up to 50 layers or microlayers, particularly co-extruded layers or microlayers, per region or sub-membrane area may be formed with the appropriate extrusion die.

In one preferred embodiment, the coextruded precursor may have a structure (PP1/PP2/PP3) (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), etc. PP1 is made of a homopolymer PP and an additive to modify the surface coefficient of friction, including any anti-slip or anti-block additives like polysiloxane or siloxane. PP2 may be made of the same or a different PP homopolymer than PP1 and a copolymer of PP. the PP copolymer may be any propylene-ethylene or ethylene-propylene random copolymer, block copolymer, or elastomer. PP3 may be made of the same or a different homopolymer PP than PP1 and PP2 and also includes an additive to modify surface coefficient of friction, which may be the same or different from that used in PP1.

In other preferred embodiment, the coextruded precursor may have a structure (PP1/PP2/PP3) (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), etc. PP1 may be any polypropylene blend. PP2 may be made of any PP block co-polymer, including those described herein. PP3 may be made of the same or a different PP-block co-polymer than that used in PP2.

The regions or sub-membrane areas may be arranged in any order to form the microporous multilayer membrane or the microporous multilayer film. For example, the microporous multilayer membrane or the microporous multilayer film may have the following non-limiting constructions: (PP/PP)(PE/PE)/(PP/PP); (PE/PE)(PP/PP)(PE/PE); (PP/PE)(PP/PE)(PP/PE); (PP/PE)(PE/PP)(PE/PP); (PP/PP/PP)(PE/PE/PE)(PP/PP/PP); (PE/PE/PE)(PP/PP/PP)(PE/PE/PE); (PP/PE/PP)(PE/PP/PE)(PP/PE/PP); (PP/PP/PE)(PE/PE/PP) (PE/PP/PP); (PE/PE/PP)(PP/PP/PP)(PP/PE/PE); (PE/PP/ PE)/(P P/PE/PP)(PE/PP/PE); (PP/PE/PP)(PE/PP/PE)(PP/ PE/PP); (PP/PE/PP)(PP/PE/PP)(PP/PE/PP); (PP/PP/PP)(PP/ PP/PP)(PP/PP/PP); (PE/PE/PE)(PE/PE/PE)(PE/PE/PE); (PE/PE/PE)(PP/PP)(PE/PE/PE); (PP/PP/PP)(PE)(PP/PP/PP); (PE/PE/PE)(PP/PP)(PE/PE/PE); (PP/PP/PP)(PE/PE)(PP/ PP/PP); (PE/PP/PE)(PP)(PE/PP/PE); (PP/PE/PP)(PE)(PP/ PP/PP); (PE/PP/PE)(PP/PP)(PE/PP/PE); (PP/PE/PP)(PE/ PE)(PP/PE/PP); (PP/PP/PP/PP)(PE)(PP/PP/PP/PP); (PE/ PE/PE/PE)(PP)(PE/PE/PE/PE); (PP/PP/PP/PP)(PE)(PP/ PP/PP/PP); (PE/PE/PE/PE)(PP/PP)(PE/PE/PE/ PE); (PP/PP/PP/PP)(PE/PE/PE/PE)(PP/PP/PP/ PP); (PE/PE/PE/PE/PE)(PP/PP/PP/PP)(PE/PE/PE/ PE/PE); (PP/PE/PP/PP/PE)(PP/PE/PP/PE/PP/ PE/PE); (PP/PE/PP/PP/PE)(PP/PE/PP/PE/PP/ PE/PP); (PE/PP/PE/PP/PE)(PP/PE/PP/PE/PP)(PE/PP/PE/ PP/PE). Variations of the foregoing may be used to form microporous multilayer films or multilayer membranes having up to 10, 20, 30, 40, 50, 60, 70, 80, 90, 100, 110, 120, 130, 140, 150, 160, 170, 180, 190, or 200 layers or microlayers.

The thickness of the microporous multilayer films or multilayer membranes is not so limited, but is preferably less than 50 microns, less than 40 microns, less than 30 microns, less than 25 microns, less than 20 microns, less than 19 microns, less than 18 microns, less than 17 microns, less than 16 microns, less than 15 microns, less than 14 microns, less than 13 microns, less than 12 microns, less than 11 microns, less than 10 microns, less than 9 microns, less than 8 microns, less than 7 microns, less than 6 microns, or less than 5 microns. This is the thickness of the multilayer films or membranes before any coating or treatment is applied thereto.

Microporous as used herein means that the average pore size of the film, membrane, or coating is 2 microns or less, preferably 1 micron or less, 0.9 microns or less, 0.8 microns or less, 0.7 microns or less, 0.6 microns or less, 0.5 microns or less, 0.4 microns or less, 0.3 microns or less, 0.2 microns or less, and preferably 0.1 microns or less, 0.09 microns or less, 0.08 microns or less, 0.07 microns or less, 0.06 microns or less, 0.05 microns or less, 0.04 microns or less, 0.03 microns or less, 0.02 microns or less, or 0.01 microns or less. In preferred embodiments, pores may be formed, for example, by performing a stretching process on a precursor film, e.g., as is done in the Celgard® dry process.

In some preferred embodiments, where the multilayer microporous film or membrane comprises submembranes or regions comprising, consisting of, or consisting essentially of PE are microporous and have an average pore size between 0.03 and 0.1, preferably between 0.05 to 0.09, 0.05 to 0.08, 0.05 to 0.07, or 0.05 to 0.06.

In other preferred embodiments, wherein the multilayer microporous film or membrane comprises submembranes or regions comprising, consisting of, or consisting essentially of PP are microporous and have an average pore size between 0.02 to 0.06, preferably 0.03 to 0.05, and more preferably 0.04 to 0.05 or 0.03 to 0.04.

In some other preferred embodiments where the wherein the multilayer microporous film or membrane comprises submembranes or regions comprising, consisting of, or consisting essentially of PP a comprises submembranes or regions comprising, consisting of, or consisting essentially of PE, the average pore size of the PP submembranes or regions is smaller than that of the PE submembranes or regions.

The Gurley of the microporous multilayer film or membrane is not so limited and it may have any Gurley that makes it acceptable for use as a battery separator. In some embodiments, the microporous multilayer film or membrane described herein has a JIS Gurley (s/100 cc) of 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, or 350 or more.

The porosity of the microporous multilayer film is not so limited. For example, any porosity that could form an acceptable battery separator is acceptable. In some embodiments, the porosity of the film or membrane may be from 10 to 60%, from 20 to 60%, from 30 to 60%, or from 40 to 60%.

The microporous multilayer film or membrane may have a puncture strength, uncoated, of 290 gf or more, 300 gf or more, 310 gf or more, 320 gf or more, 330 gf or more, 340 gf or more, 350 gf or more, or as high as 400 gf or more.

In some embodiments, the multilayer microporous membrane described herein may comprise one or more additives in at least one layer of the multilayer microporous membrane. In some embodiments, at least one layer of the multilayer microporous membranes comprises more than one, e.g., two, three, four, five, or more, additives. Additives may be present in one or both of the outermost layers of the multilayer microporous membrane, in one or more inner layers, in all of the inner layers, or in all of the inner and both of the outermost layers. In some embodiments, additives may be present in one or more outermost layers and in one or more innermost layers. In such embodiments, over time, the additive may be released from the outermost layer or layers and the additive supply of the outermost layer or layers may be replenished by migration of the additive in the inner layers to the outermost layers. In some embodiments, each layer of the multilayer microporous membrane may comprise a different additive or combination of additives than an adjacent layer of the or each layer of the multilayer microporous membrane.

In some embodiments, the additive is, comprises, consists of, or consists essentially of a functionalized polymer. As understood by one of ordinary skill in the art, a functionalized polymer is a polymer with functional groups coming off of the polymeric backbone. Exemplary functional groups include: In some embodiments, the functionalized polymer is a maleic anhydride functionalized polymer. In some embodiments the maleic anhydride modified polymer is a maleic anhydride homo-polymer polypropylene, copolymer polypropylene, high density polypropylene, low-density polypropylene, ultra-high density polypropylene, ultra-low density polypropylene, homo-polymer polyethylene, copolymer polyethylene, high density polyethylene, low-density polyethylene, ultra-high density polyethylene, ultra-low density polyethylene, In some embodiments, the additive comprises, consists of, or consists essentially of an ionomer. An ionomer, as understood by one of ordinary skill in the art is a copolymer containing both ion-containing and non-ionic repeating groups. Sometimes the ion-containing repeating groups may make up less than 25%, less than 20%, or less than 15% of the ionomer. In some embodiments, the ionomer may be a Li-based, Na-based, or Zn-based ionomer.

In some embodiments, the additives comprises cellulose nanofiber.

In some embodiments, the additive comprises inorganic particles having a narrow size distribution. For example, the difference between D10 and D90 in a distribution is less than 100 nanometers, less than 90 nanometers, less than 80 nanometers, less than 70 nanometers, less than 60 nanometers, less than 50 nanometers, less than 40 nanometers, less than 30 nanometers, less than 20 nanometers, or less than 10 nanometers. In some embodiments, the inorganic particles are selected from at least one of $SiO_2$, $TiO_2$, or combinations thereof.

In some embodiments, the additive may comprise, consists of, or consist essentially of a lubricating agent. The lubricating agent or lubricant described herein is not so limited. As understood by one of ordinary skill in the art, a lubricant is a compound that acts to reduce the frictional force between a variety of different surfaces, including the following: polymer:polymer; polymer:metal; polymer; organic material; and polymer:inorganic material. Specific examples of lubricating agents or lubricants as described herein are compounds comprising siloxy functional groups, including siloxanes and polysiloxanes, and fatty acid salts, including metal stearates. Compounds comprising two or more, three or more, four or more, five or more, six or more, seven or more, eight or more, nine or more, or ten or more siloxy groups may be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, e.g., —CH3 or C2H5. Polysiloxanes are a polymerized siloxanes, usually having a higher molecular weight. In some preferred embodiments described herein, the polysiloxanes may be high molecular weight, or even more preferred in some cases, ultra-high molecular weight polysiloxanes. In some embodiments, high and ultra-high molecular weight polysiloxanes may have weight average molecular weights ranging from 500,000 to 1,000,000.

The fatty acid salts described herein are also not so limited and may be any fatty acid salt that acts as a lubricant. The fatty acid of the fatty acid salt may be a fatty acid having between 12 to 22 carbon atoms. For example, the metal fatty acid may be selected from the group consisting of: Lauric acid, myristic acid, palmitic acid, stearic acid, oleic acid, linoleic acid, linolenic acid, palmitoleic acid, behenic acid, erucic acid, and arachidic acid. The metal is not so limited, but in preferred embodiments is an alkaline or alkaline earth metal, such as Li, Be, Na, Mg, K, Ca, Rb, Sr, Cs, Ba, Fr, and Ra. In some preferred embodiments, the metal is Li, Be, Na, Mg, K, or Ca.

In some preferred embodiments, the fatty acid salt is lithium stearate, sodium stearate, lithium oleate, sodium oleate, sodium palmitate, lithium palmitate, potassium stearate, or potassium oleate.

In some preferred embodiments described herein, the lubricant, including the fatty acid salts described herein, has a melting point of 200° C. or above, 210° C. or above, 220° C. or above, 230° C. or above, or 240° C. or above. A fatty acid salt such as lithium stearate (melting point of 220° C.) or sodium stearate (melting point 245 to 255° C.) has such a melting point. A fatty acid salt such as calcium stearate (melting point 155° C.) does not. The inventors of this application have found that calcium stearate is less ideal, from a processing standpoint, than other fatty acid metal salts, e.g., metal stearates, having higher melting points. Particularly, it has been found that calcium stearate could not be added in amounts above 800 ppm without what has been termed a "snowing effect" where wax separates and gets everywhere during a hot extrusion process. Without wishing to be bound by any particular theory, using a fatty acid metal salt with a melting point above the hot extrusion temperatures is believed to solve this "snowing" problem. Fatty acid salts having higher melting points than calcium stearate, particularly those with melting points above 200° C., may be incorporated in amounts above 1% or 1,000 ppm, without "snowing." Amounts of 1% or above have been found to be important for achieving desired properties such as improved wettability and pin removal improvement.

In some embodiments, the additive may comprise, consist of, or consist essentially of one or more nucleating agents. As understood by one of ordinary skill in the art, nucleating agents are, in some embodiments, materials, preferably inorganic materials, that assist in, increase, or enhance crystallization of polymers, including semi-crystalline polymers.

In some embodiments, the additive may comprise, consist of, or consist essentially of cavitation promoters. Cavitation promoters, as understood by those skilled in the art, are materials that form, assist in formation of, increase formation of, or enhance the formation of bubbles or voids in the polymer.

In some embodiments, the additive may comprise, consist of, or consist essentially of a fluoropolymer. The fluoropolymer is not so limited and in some embodiments is PVDF.

In some embodiments, the additive may comprise, consist of, or consist essentially of a cross-linker.

In some embodiments, the additive may comprise, consist of, or consist essentially of an x-ray detectable material. The x-ray detectable material is not so limited and may be any material, for example, those disclosed in U.S. Pat. No. 7,662,510, which is incorporated by reference herein in its entirety. Suitable amounts of the x-ray detectable material or element are also disclosed in the '510 patent, but in some embodiments, up to 50 weight %, up to 40 weight %, up to 30 weight %, up to 20 weight %, up to 10 weight %, up to 5 weight %, or up to 1 weight % based on the total weight of the microporous membrane or film may be used. In some preferred embodiments, the additive is barium sulfate.

In some embodiments, the additive may comprise, consist of, or consist essentially of a lithium halide. The lithium halide may be lithium chloride, lithium fluoride, lithium bromide, or lithium iodide. In some preferred embodiments, the lithium halide may be lithium iodide, which is both ionically conductive and electrically insulative. A material that is both ionically conductive and electrically insulative is particularly preferred for use as part of a battery separator.

In some embodiments, the additive may comprise, consist of, or consist essentially of a polymer processing agent. As understood by those skilled in the art, polymer processing agents or additives are added to improve processing efficiency and quality of polymeric compounds. In some embodiments, the polymer processing agent may be antioxidants, stabilizers, lubricants, processing aids, nucleating agents, colorants, antistatic agents, plasticizers, or fillers.

In some embodiments, the additive may comprise, consist of, or consist essentially of a high temperature melt index (HTMI) polymer. The HTMI polymer is not so limited and may be at least one selected from the group consisting of PMP, PMMA, PET, PVDF, Aramid, syndiotactic polystyrene, and combinations thereof.

In some embodiments, the additive may comprise, consist of, of consist essentially of an electrolyte additive. [1]Electrolyte additives as described herein are not so limited as long as the electrolyte is consistent with the stated goals herein. The electrolyte additive may be any additive typically added by battery makers, particularly lithium battery makers to improve battery performance. Electrolyte additives must also be capable of being combined, e.g., miscible, with the polymers used for the polymeric microporous film or compatible with the coating slurry. Miscibility of the additives may also be assisted or improved by coating or partially coating the additives. For example, exemplary electrolyte additives are disclosed in *A Review of Electrolyte Additives for Lithium-Ion Batteries*, J. of Power Sources, vol. 162, issue 2, 2006 pp. 1379-1394, which is incorporated by reference herein in its entirety. In some preferred embodiments, the electrolyte additive is at least one selected from the group consisting of a SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver. In some embodiments the additive may have more than one property, e.g., it may be a wetting agent and a viscosity improver. Exemplary SEI improving agents include VEC (vinyl ethylene carbonate), VC (vinylene carbonate), FEC (fluoroethylene carbonate), LiBOB (Lithium bis(oxalato) borate). Exemplary cathode protection agents include N,N'-dicyclohexylcarbodiimide, N,N-diethylamino trimethylsilane, LiBOB. Exemplary flame-retardant additives include TTFP (tris(2,2,2-trifluoroethyl) phosphate), fluorinated propylene carbonates, MFE (methyl nonafluorobuyl ether). Exemplary $LiPF_6$ salt stabilizers include LiF, TTFP (tris(2,2,2-trifluoroethyl) phosphite), 1-methyl-2-pyrroidinone, fluorinated carbamate, hexamethyl-phosphoramide. Exemplary overcharge protectors include xylene, cyclohexylbenzene, biphenyl, 2, 2-diphenylpropane, phenyl-tert-butyl carbonate. Exemplary Li deposition improvers include $AlI_3$, $SnI_2$, cetyltrimethylammonium chlorides, perfluoropolyethers, tetraalkylammonium chlorides with a long alkyl chain. Exemplary ionic salvation enhancer include 12-crown-4, TPFPB (tris(pentafluorophenyl)). Exemplary Al corrosion inhibitors include LiBOB, LiODFB, e.g., borate salts. Exemplary wetting agents and viscosity dilutersinclude cyclohexane and P205.

In some preferred embodiments, the electrolyte additive is air stable or resistant to oxidation. A battery separator comprising the electrolyte additive disclosed herein may have a shelf life of weeks to months, e.g. one week to 11 months. This means, for example, that in one week, two weeks, three weeks, four weeks, 2 months, 3 months, 4 months, 5 months, 6 months, 7 months, 8 months, 9 months, 10 months, or 11 months, the separator will retain its ability to release the electrolyte additive into the electrolyte of a lithium ion battery when the battery separator is used in a lithium ion battery. For example, it will retain 70%, 80%, 90%, 95%, or 100% of its original ability to release electrolyte into the electrolyte of a lithium ion battery. Once the battery separator is incorporated into the battery, it is no longer exposed to air, and therefore, will no longer be affected to any significant degree by oxidation. This shelf life is measured without the addition of a coating that will prevent or slow oxidation although a coating may be added to the separator to prevent oxidation and extend the shelf life of the battery separator.

In some embodiments, the additive may comprise, consist of, or consist essentially of an energy dissipative non-miscible additive. Non-miscible means that the additive is not miscible with the polymer used to form the layer of the multilayer microporous membrane or film that contains the additive.

In some embodiments, the membrane or film has or exhibits increased or improved elasticity at or above 150° C. compared to a tri-layer microporous membrane having the same thickness, Gurley, porosity, and/or resin make-up as the multilayer microporous membrane or film. In some embodiments, increased or improved elasticity may be measured using dynamic mechanical analysis as described herein. In some embodiments, tan (delta) of the multilayer membrane or film described herein, when measured according to dynamic mechanical analysis, is greater than −0.6 at 150° C. In some embodiments, tan(delta) of the multilayer membrane or film described herein, when measured according to dynamic mechanical analysis, is between −1.0 and −0.6 at a temperature between 175° C. and 200° C. In some embodiments, tan(delta) of the multilayer membrane or film described herein, when measured according to dynamic mechanical analysis, is between −0.9 and −0.6, −0.8 and −0.6, or −0.7 and −0.6 at a temperature between 175° C. and 200° C. In some embodiments, tan(delta) of the multilayer microporous membrane or film described herein is above −1.2, above −1.1, above −1.0, above −0.9, or above −0.8 at a temperature at or above 200° C.

In some embodiments, the membrane or film described herein has or exhibits increased or improved compressibility compared to a tri-layer microporous membrane having the same thickness, Gurley, porosity, and/or resin make-up as the multilayer microporous membrane or film. In some embodiments, the recovery (%), when measured according to the compression recovery method described herein, is greater than 9%, greater than 9.1%, greater than 9.2%, greater than 9.3%, greater than 9.4%, greater than 9.5%, greater than 9.6%, greater than 9.7%, greater than 9.8%, greater than 9.9%, greater than 10.0%, greater than 10.1%, greater than 10.2%, greater than 10.3%, greater than 10.4%, or greater than 10.5%. Sometimes, recovery may be as high as 15% or 20%.

In some embodiments, the multilayer microporous membrane of film described herein exhibits increased or improved elongation at break (TD) compared to a tri-layer microporous membrane or film having the same thickness, Gurley, porosity, and/or resin make-up as the multilayer microporous membrane or film. In some embodiments, the elongation at break is more than 30% higher, more than 31% higher, more than 32% higher, more than 33% higher, more than 34% higher, more than 35% higher, more than 36% higher, more than 37% higher, more than 38% higher, more than 39% higher, more than 40% higher, more than 41% higher, more than 42% higher, more than 43% higher, more than 44% higher, more than 45% higher, more than 46% higher, more than 47% higher, more than 48% higher, more than 49% higher, more than 50% higher, more than 51% higher, more than 52% higher, more than 53% higher, more than 54% higher, more than 55%, more than 56% higher, more than 57% higher, more than 58% higher, more than 59% higher, or more than 60% higher compared to a tri-layer microporous membrane or film having the same thickness, Gurley, porosity, and/or resin make-up as the multilayer microporous membrane or film.

In some embodiments, the multilayer microporous membrane or film described herein has or exhibits reduced high temperature shrinkage at 120° C. compared to a tri-layer microporous membrane having the same thickness, Gurley, porosity, and/or resin make-up as the multilayer microporous membrane or film. In some embodiments, the membrane or film described herein has a high temperature shrinkage at 120° C. that is 30 to 75% lower, 30 to 74% lower, 30 to 73%, lower, 30 to 72% lower, 30 to 71% lower, 30 to 70% lower, 30 to 69% lower, 30 to 68% lower, 30 to 67% lower, 30 to 66% lower, 30 to 65% lower, 30 to 64% lower, 30 to 63% lower, 30 to 62% lower, 30 to 61% lower, 30 to 60% lower, 30 to 59% lower, 30 to 58% lower, 30 to 57% lower, 30 to 56% lower, 30 to 55% lower, 30 to 54% lower, 30 to 53% lower, 30 to 52% lower, 30 to 51% lower, 30 to 50% lower, 30 to 49% lower, 30 to 48% lower, 30 to 47% lower, 30 to 46% lower, 30 to 45% lower, 30 to 44% lower, 30 to 43% lower, 30 to 42% lower, 30 to 41% lower, 30 to 40% lower, 30 to 39% lower, 30 to 38% lower, 30 to 37% lower, 30 to 36% lower, 30 to 35% lower, 30 to 34%, 30 to 33% lower, 30 to 32% lower, or 30 to 31% lower compared to a tri-layer microporous membrane having the same thickness, Gurley, porosity, and/or resin make-up as the multilayer microporous membrane or film.

In some embodiments, at least one layer of the multilayer membrane or film described herein comprises a polymeric additive. The polymeric additive is added in an amount less than the main polymer that the film is made up of. For example, in some embodiments, the main polymer may be a polyolefin. This is another way of saying that at least one layer of the multilayer membrane or film described herein comprises or is made up of a polymeric blend. In some embodiments, the layer may comprise or me made up of a polymeric or polymer blend and one or more of the other additives described herein.

In some embodiments, the layer comprising the polymer blend is an exterior layer. In some embodiments, both exterior or outermost layers comprise a polymer blend. In some embodiments, an interior layer comprises a polymer blend. In sometimes at least one interior and at least one exterior layer comprises a polymer blend, and in some embodiments, all of the exterior or outermost and all of the interior layers comprise a polymer blend.

In some embodiments, the polymer blend comprises, consists of, or consists essentially of at least two different polyolefins, e.g., at least two different polyethylenes, at least two different polypropylenes, or a combination of at least one polyethylene and one polypropylene. In some embodiments, the polymer blend comprises, consists of, or consists essentially of a polyolefin and a non-polyolefin, i.e., a polymer that is not a polyolefin.

In some embodiments, each layer of the multilayer film or membrane has a different compositions than the layers adjacent to them. For example, one layer may comprise a polymer blend of two different polyolefins, and one adjacent layer may comprise a polymer blend of a polyolefin and a non-polyolefin, and the other adjacent may not comprise a polymer blend.

In some embodiments, the multilayer membrane or film has a non-woven or woven attached to one or both sides thereof.

In some embodiments, the multilayer microporous membrane or film comprises a region that comprises two or more layers and polyethylene in at least one of the layers. When this region is tested according to the Machine Learning Test described herein, the following is satisfied:

$$w^T x' \geq -2.0,\ w^T x' \geq -1.0,\ w^T x' \geq 0.0\ \text{or}\ w^T x' \geq 2.0.$$

In some embodiments, the multilayer microporous membrane or film comprises a region that comprises two or more layers and polypropylene in at least one of the layers. When this region is tested according to the Machine Learning Test described herein, the following is satisfied:

$$w^T x' \geq -1.5,\ w^T x' \geq -1.0,\ w^T x' \geq 0.5\ w^T x' \geq 1.5.$$

Regarding the structural features of the microporous multilayer films and membranes described herein, in some embodiments, the tortuosity of the films are above 1.6, above 1.7, 1.8, above 1.9, above 2.0, above 2.1, or above 2.2. Without wishing to be bound by any particular theory, it is believed that the observed tortuosity values, particularly the values above 2.0, 2.1, or 2.2, may be a cause for the increased puncture strength and mix penetration average values disclosed herein. A more tortuous film is also believed to be safer when used as a battery separator for a lithium ion battery.

The MacMullin number of the microporous multilayer films or membranes described herein is above 5.0, above 5.5, above 6.0, above 6.5, above 7.0, above 7.5, above 8.0, above 8.5, above 9.0, above 9.5, above 10.0, or above 10.5.

In some embodiments, the electrical resistance of the microporous multilayer films or membranes is above 0.9, above 1.0, above, 1.1, above 1.2, above 1.3, above 1.4, above 1.5, above 1.6, or above 1.7

The crystallinity of the microporous multilayer films described herein were found to be different from that of prior multilayer and tri-layer films. For example, in some embodiments where the microporous multilayer film comprises the following: (1) a first region comprising two or more layers; (2) a second region comprising two or more layers that is on a first side of the first region; and (3) a third region comprising two or more layers that is on a side of the first region opposite the first side, at least one of the first, second or third regions comprises PE and has a lower crystallinity, when measured by DSC, than a PE-containing layer of a trilayer microporous film, where the tri-layer microporous film has the same thickness as the multilayer microporous film. For example, the crystallinity may be 1 to 20% lower, 1 to 19%, 1 to 18%, 1 to 17%, 1 to 16%, 1 to 15% lower, 1 to 14%, 1 to 13%, 1 to 12%, 1 to 11%, 1 to 10% 1 to 9%, 1 to 8%, 1 to 7%, 1 to 6% 1 to 5%, 1 to 4%, 1 to 3%, or 1 to 2% lower than a PE-containing layer of a trilayer microporous film, where the tri-layer microporous film has the same thickness as the multilayer microporous film.

Another structural difference between the multilayer microporous films described herein and the prior tri-layer and multilayer films may be seen using a scanning electron microscope. For example, see FIGS. 17-23. As shown, for example, in FIGS. 17-23, the multilayer microporous film or membrane may comprise at least a first region comprising two or more layers and a second layer comprising at least one layer. The first region may comprise mostly discontinuous amorphous regions when viewed in the z-direction of the film using SEM. What is meant by the term "mostly" is that most, but not necessarily all, of the amorphous regions in the first layer are discontinuous. This can mean that at least 50%, more than 50%, more than 60%, more than 70%, more than 80%, more than 90%, more than 95%, more than 99%, or 100% of the amorphous regions in the first layer are continuous. "Discontinuous amorphous regions" means that, when a sample of the first layer is analyzed, for example by SEM, the path of the amorphous region is interrupted or broken by a crystalline (lamellae) region along the total thickness direction of the first layer. Discontinuous means that the amorphous region path is interrupted or broken by a crystalline (lamellae) region along the total thickness direction of the first layer. The amorphous region path does not go around the crystalline (lamellae) region. Instead, the crystalline (lamellae) region completely disrupts the path of the amorphous region along the total thickness of the first layer. The path of the amorphous region may be linear or circuitous. One example of the difference between discontinuous amorphous regions and continuous amorphous regions is seen by comparing the SEM of the polyethylene layer of COM EX 4 with the SEM of the polyethylene layer Example 6 in FIG. 22. Discontinuous may also mean that the amorphous regions are non-columnar, non-vertically continuous, or not pillar-like along the thickness of the layer. In some preferred embodiments, the first region with the mostly discontinuous amorphous regions may comprise, consist of, or consist essentially of polypropylene in some or all of the layers in that region. In some other embodiments, the second region comprises two or more layers, and the amorphous areas of that region of the film or membrane have a maximum width of 0.85 microns, 0.8 microns, 0.75 microns, 0.70 microns, 0.65 microns, or 0.6 microns. For example, this is seen by comparing COM EX 4 with Example 6 in FIG. 30 In some preferred embodiments, the second region may comprise, consist of, or consist essentially of polyethylene in some or all of the layers in that region.

In some embodiments, the multilayer microporous membrane described herein is one that exhibits increased puncture average (g) when tested at a high puncture speed, which is a puncture speed over 25 mm/min, compared to the puncture average (g) of that same membrane at a puncture speed of 25 mm/min. Puncture average is obtained by taking two puncture strength measurements at a given speed and averaging those results. In some embodiments, the higher puncture speed is 100 mm/min and the puncture average (g) at that speed is at least 20 g, 30 g, 40 g, or 50 g higher than the puncture average (g) at 25 mm/min. The puncture average (g) for the multilayer microporous membranes described herein may be 250 g or higher, 275 g or higher, 300 g or higher, 325 g or higher, or 350 g or higher at a puncture speed of 25 mm/min. In some embodiments, the thickness of the multilayer membrane exhibiting increased puncture average (g) when tested at a high puncture speed is from 14 to 30 microns.

(a) Collapsed Bubble Multilayer Microporous Membrane

The multilayer microporous membrane that is formed by a collapsed bubble method is not so limited. In preferred embodiments, the multilayer microporous membrane formed by a collapsed bubble method is thin. For example, it may have a thickness of less than 14 microns, less than 13 microns, less than 12 microns, less than 11 microns, less than 10 microns, less than 9 microns, less than 8 microns, less than 7 microns, less than 6 microns, less than 5 microns, less than 4 microns, less than 3 microns, or less than 2 microns. In some preferred embodiments, the thickness is between 6 and 12 microns. In some preferred embodiments, the thickness is about 10 microns or from 9 to 11 microns.

In addition to being thin, the microporous membrane formed by a collapsed bubble method has a puncture strength greater than or equal to 200 g, 210 g, 220 g, 230 g, or 240 g. In some embodiments, the multilayer microporous membrane formed by a collapsed bubble method may have a Gurley less than 250, less than 225, less than 200, less than 190, less than 180, or less than 175.

The structure of the microporous membrane is not so limited, but the microporous membrane formed by a collapsed bubble (or multi-slot die) may have a structure formed by collapsing a bubble or that otherwise comprises co-extruded PP/PP/PP, PE/PE/PE, PP/PP/PE, PP/PE/PE, PP/PP, PE/PE, PE/PP, PE/PP/PP, PP/PE/PP, PP/PE/PE/PP, PE/PP/PP/PE, PP/PE/PP/PE, etc. For example, the final layer or microlayer or nanolayer structure may be as follows: PP/PE/PE/PP, PP/PP/PP/PP, PE/PE/PE/PE, PE/PP/PP/PE, PP/PP/PE/PE/PP/PP, PP/PE/PE/PE/PE/PP, PP/PE/PE/PE/PE/PP, PE/PP/PP/PP/PE, PP/PE/PP/PE/PP/PP, PE/PE/PP/PP/PE/PE, PP/PE/PP/PE/PP/PE/PP, PP/PP/PP/PE/PP/PP/PP/PP, PP/PP/PE/PE/PE/PP/PP, etc. For example, a structure formed by collapsing a bubble that comprises co-extruded PP/PE/PE may form a layer or microlayer or nanolayer structure PP/PE/PE/PE/PE/PP, PP/PP/PE/PE/PP/PP/PP or PP/PE/PE/PE/PE/PP or PP/PP/PP/PE/PE/PE/PP/PP or PP/PE/PE/PE/PE/PE/PE/PP, etc. Where there are more than one PP layers or PE layers in the co-extruded bubble, the PP layers may be the same or different and the PE layers may be the same or different (for example, PP/PP1/PE/PE2/PE2/PE/PP1/PP.

Figure 66:
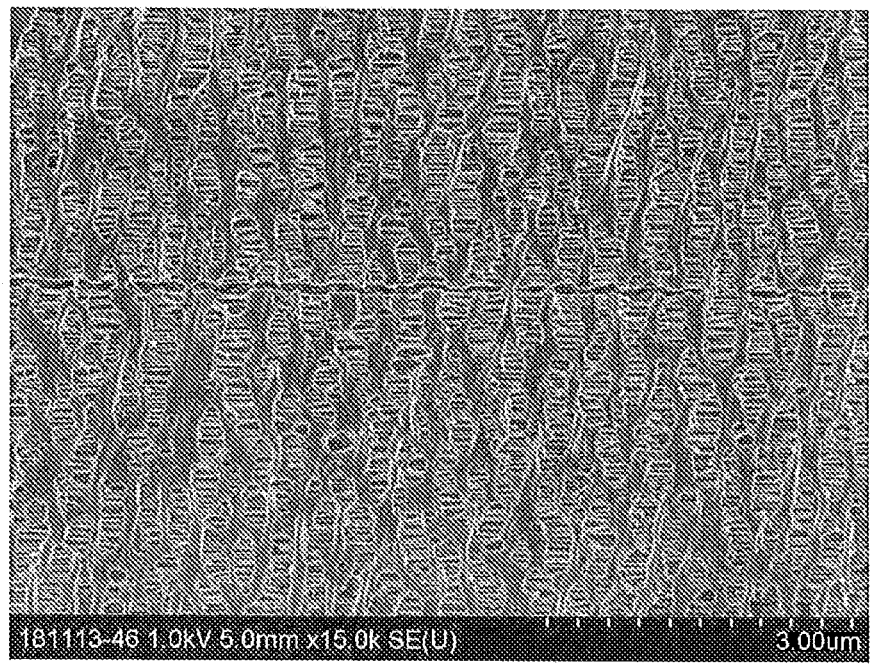
FIG. 66 is an SEM of a collapsed bubble microporous membrane according to some embodiments described herein.
Figure 67:
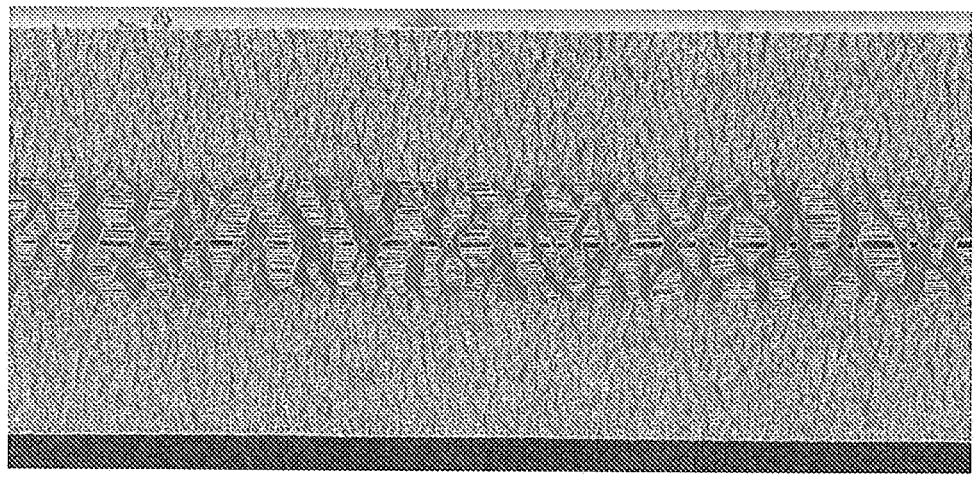
FIG. 67 is an SEM of a collapsed bubble microporous membrane according to some embodiments described herein.

The microporous membrane may comprise a discernible lamination or bond interface that is formed when the bubble collapses (is collapsed and bonded or laminated) may be seen when a cross-section SEM of the membrane is taken. Without wishing to be bound by any particular theory, it is believed that the discernible interface results due to some misalignment that results in the collapsing step. An example of a discernible interface is shown in FIGS. 66 and 67.

In some embodiments, the multilayer microporous membrane formed by a collapsed bubble method comprises a polyethylene having a melt flow rate from 0.1 to 10 g/min. The microporous membrane may have at least one layer that comprises polyethylene and has a thickness of at least 1.75 microns. In some embodiments, the layer that comprises polyethylene has a thickness of at least 2 microns. In some embodiments, the layer that comprises polyethylene has a thickness of less than 1.75 microns. It is believed that a thickness of at least 2 microns or at least 1.75 microns may be required for shutdown function. However, if polyethylene that results in smaller pores is used, thinner polyethylene-containing layers may be sufficient.

In some embodiments, the membrane comprises polypropylene having a melt flow rate from 0.01 to 10 g/10 min, from 0.1 to 5 g/10 min, or from 0.01 to 2.5 g/10 min when measured according to ASTM D1238-13 and/or ISO 1133-1:2011.

(2) Optional Coating

In some embodiments, one or more coating layers may be applied to one or two sides of the microporous membrane or film to form a battery separator. In some embodiments, one or more of the coatings may be a ceramic coating comprising, consisting of, or consisting essentially of a polymeric binder and organic and/or inorganic particles. In some embodiments, only a ceramic coating is applied to one or both sides of the microporous membrane or film. In other embodiments, a different coating may be applied to the microporous membrane or film before or after the application of the ceramic coating. The different additional coating may be applied to one or both sides of the membrane or film also. In some embodiments, the different polymeric coating layer may comprise, consist of, or consist essentially of at least one of polyvinylidene difluoride (PVdF) or polycarbonate (PC).

In some embodiments, the thickness of the coating layer is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 μm, less than 2 μm, or less than 1 μm.

The coating method is not so limited, and the coating layer described herein may be coated onto a porous substrate by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 700 or less, sometimes 600 or less, 500 or less, 400 or less, 300 or less, 200 or less, or 100 or less.

One or more layers, treatments, materials, or coatings (CT) and/or nets, meshes, mats, wovens, or non-wovens (NW) may be added on one or both sides, or within the multilayer film or membrane (M) described herein, which may include but not limited to CT/M, CT/M/CT, NW/M, NW/M/NW, CT/M/NW, CT/NW/M/NW/CT, CT/M/NW/CT, etc.

Composite, Vehicle, or Device

A composite comprising a battery separator as described hereinabove and one or more electrodes, e.g., an anode, a cathode, or an anode and a cathode, provided in direct contact therewith. The type of electrodes are not so limited. For example, the electrodes can be those suitable for use in a lithium ion secondary battery.

A suitable anode can have an energy capacity greater than or equal to 372 mAh/g, preferably ≥700 mAh/g, and most preferably ≥1000 mAH/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode is not made solely from intercalation compounds containing lithium or insertion compounds containing lithium.

A suitable cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_5O_{13}$, $V_2O_5$, and $CuCl_2$. Suitable polymers include, for example polyacetylene, polypyrrole, polyaniline, and polythiopene.

Any separator described hereinabove may be incorporated to any vehicle, e.g. an e-vehicle, or device, e.g., a cell phone or laptop, that completely or partially battery powered.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

Textile

In some embodiments, a textile comprising, consisting of, or consisting essentially of the multilayer microporous membrane or film described herein is described. In some preferred embodiments, the textile comprises the multilayer microporous membrane or film described herein and a non-woven or woven material. The non-woven may be a staple non-woven, a melt-blown non-woven, a spunlaid non-woven, a flashspun non-woven, an air-laid non-woven, or a non-woven made by any other process. In some preferred embodiments, the non-woven or woven is attached to the multilayer microporous membrane or film. In some embodiments, a textile comprises, consists of, or consists essentially of a woven or non-woven, multilayer microporous membrane or film as described herein, and another woven or non-woven in that order. In some embodiments, the textile comprises, consists of, or consists essentially a multilayer microporous membrane or film as described herein, a non-woven or woven, and multilayer microporous membrane or film as described herein, in that order.

Method

The method for forming the multilayer microporous film or membrane described herein is not so limited and may be a dry process, preferably the CELGARD® dry-stretch process, a dry process such as BNOPP, or a wet process, which utilize a solvent or oil.

The method for forming the multilayer microporous films or membranes described herein comprise at least the following steps: (1) coextruding two or more polymer mixtures, which may be the same or different, to form a co-extruded film as described hereinabove having two or more layers or microlayers; (2) laminating the co-extruded film to at least one other mono-extruded film, co-extruded film, or a nonwoven.

In some preferred embodiments, the co-extruded film is laminated to with two other co-extruded films having two or more microlayers; and (3) optionally one or more additional steps.

(1) Co-Extrusion Step

Figure 4:
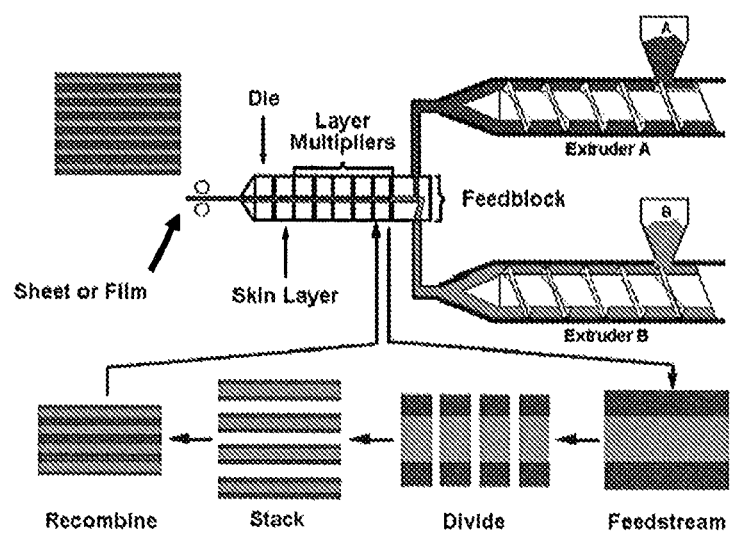
FIG. 4 is a schematic diagram of how microlayers may be created in the feedblock by layer multiplication in a co-extrusion process.
Figure 5:
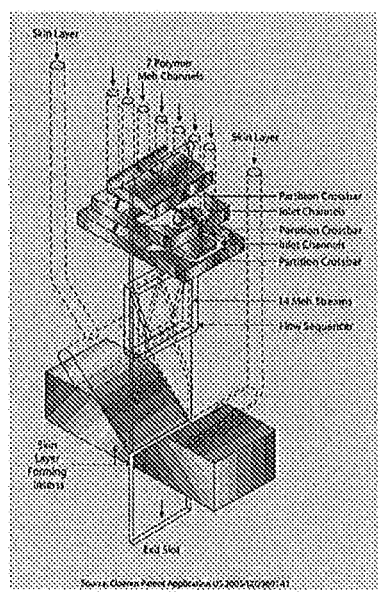
FIG. 5 is a schematic diagram of how microlayers may be created by layer splitting in a co-extrusion process.
Figure 6:
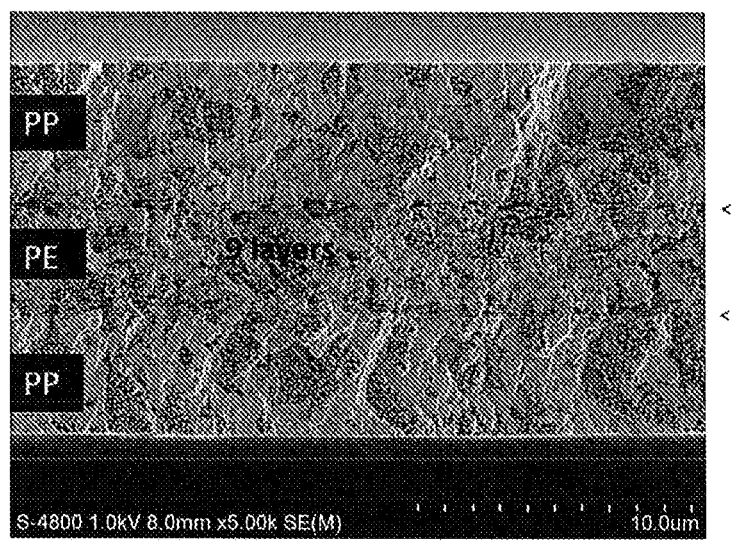
FIG. 6 is a cross-section Scanning Electron Micrograph (SEM) of an exemplary inventive 3 layer or trilayer (9 microlayers total, with 3 triple microlayer sub-layers laminated together) PP/PE/PP microporous membrane at a magnification of 5,000× (at least the outer PP sub-layers are microporous).
Figure 7:
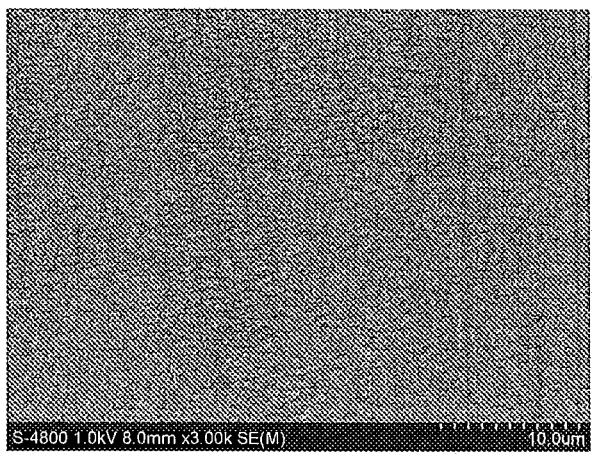
FIG. 7 is a surface Scanning Electron Micrograph (SEM) of a surface of the polypropylene surface sub-layer (surface PP microlayer) of the 9 microlayer, 3 layer membrane of FIG. 9 at a magnification of 3,000×. This 9 microlayer membrane could be used as one layer of a 3 layer (9 sublayer, 27 microlayer) membrane such as shown in FIG. 1.
Figure 8:
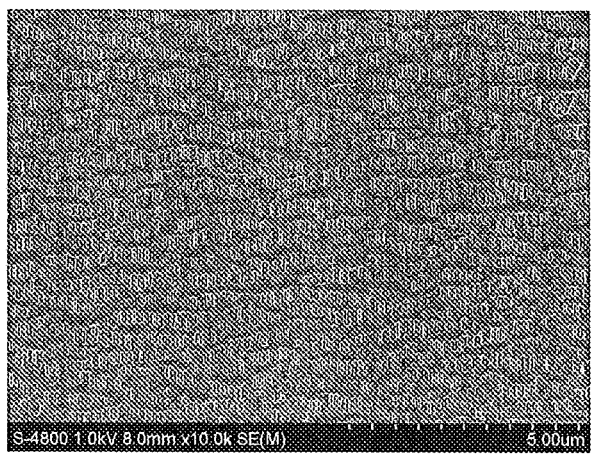
FIG. 8 is a surface Scanning Electron Micrograph (SEM) of a portion of the surface of the polypropylene surface sub-layer (surface PP microlayer) of the 9 microlayer layer, 3 layer membrane of FIG. 9 at a magnification of 10,000×.
Figure 9:
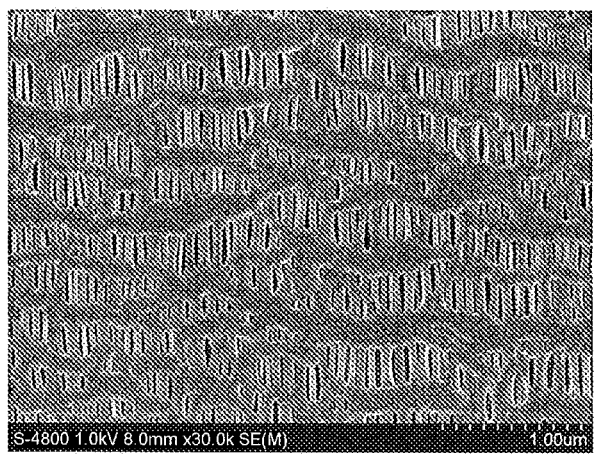
FIG. 9 is a surface Scanning Electron Micrograph (SEM) of a portion of the surface of the polypropylene surface sub-layer (surface PP microlayer) of the 9 microlayer, 3 layer membrane of FIG. 9 at a magnification of 30,000×.
Figure 10:
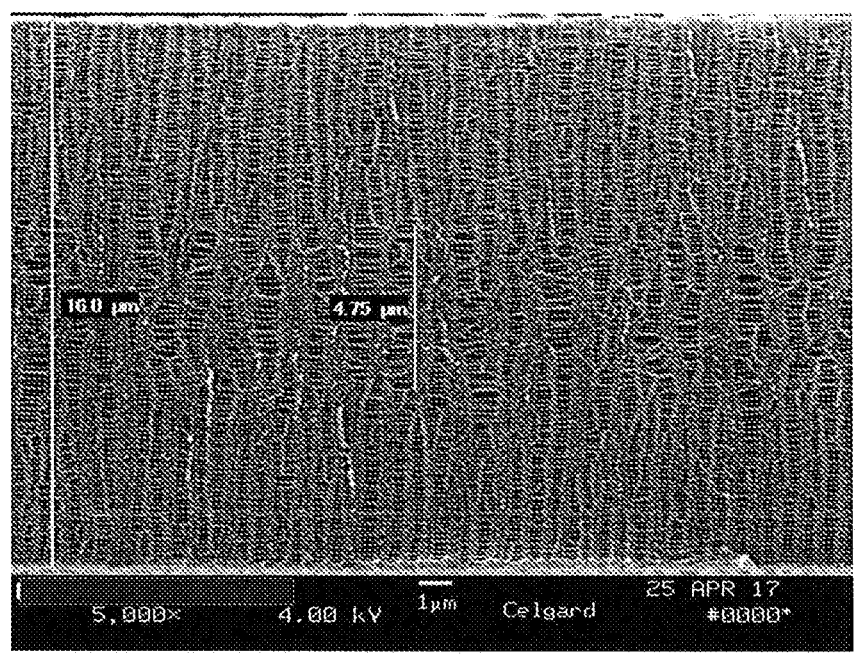
FIG. 10 is a cross-section Scanning Electron Micrograph (SEM) of an example inventive 3 "microlayer" co-extruded sublayer (PO1/PO2/PO1) microporous membrane at a magnification of 5,000× (at least the outer P01 microlayers are microporous) with microlayer P02 made of a different resin or resin blend than microlayers P01 to more clearly show the interfaces (interface zones) of the adjacent co-extruded microlayers. It is believed that the multiple co-extruded microlayer interfaces and the laminated interfaces between adjacent sublayers provide the unique characteristics, properties and/or performance of the inventive Multilayer structure. The example sublayer of FIG. 13 was made of 3 layers of PP with the center PP layer of a different PP resin than the outer two layers and had to be run with a thicker precursor due to the lower viscosity of the center PP layer (typically the microlayers would be less than 4 um, preferably less than 3 um, and more preferably less than 2 um each).
Figure 11:
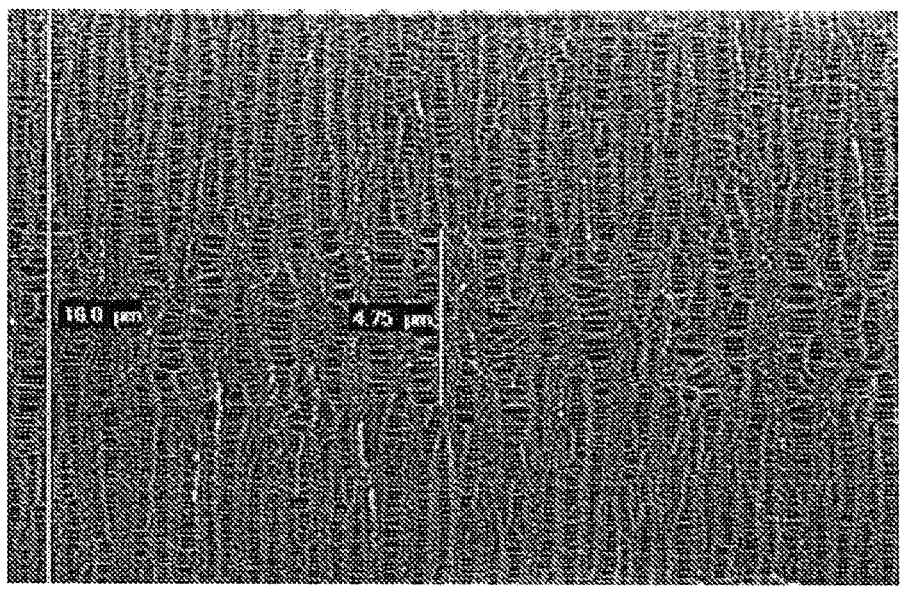
FIG. 11 is a markup of a portion of the SEM of FIG. 13 showing the interface zones with red and green horizontal lines.
Figure 12:
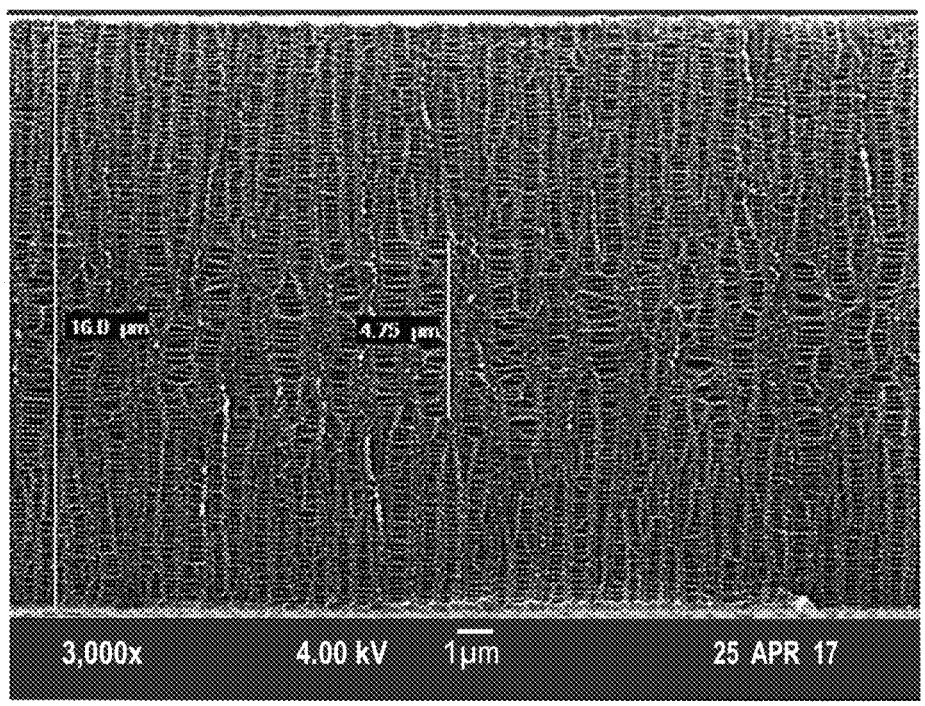
FIG. 12 is an enlarged version of FIG. 13 showing the unique pore structures and membrane structures.
Figure 13:
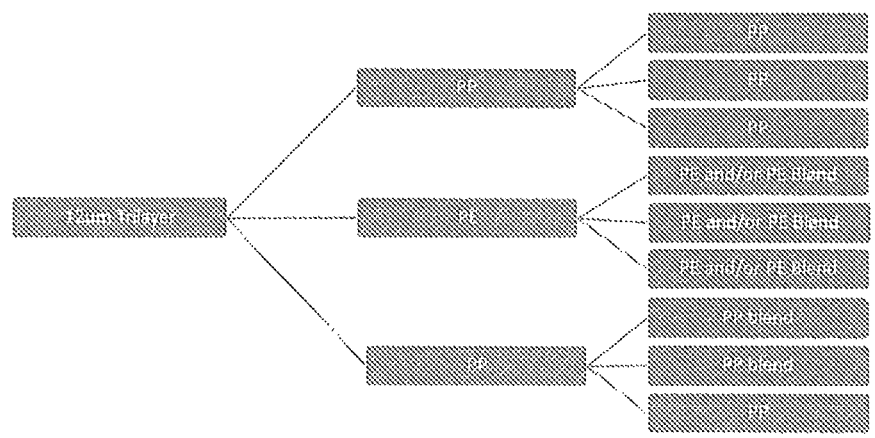
FIG. 13 is a schematic representation of an exemplary 12 um trilayer in accordance with at least one embodiment of the present invention (PP/PE/PP sublayers or microlayers laminated together, each of the sublayers differ, the top PP sublayer has 3 co-extruded PP microlayers, the center PE sublayer has 3 PE microlayers that can be the same or different than each other, and the bottom PP sublayer has 2 PP blend microlayers and a PP microlayer).
Figure 14:
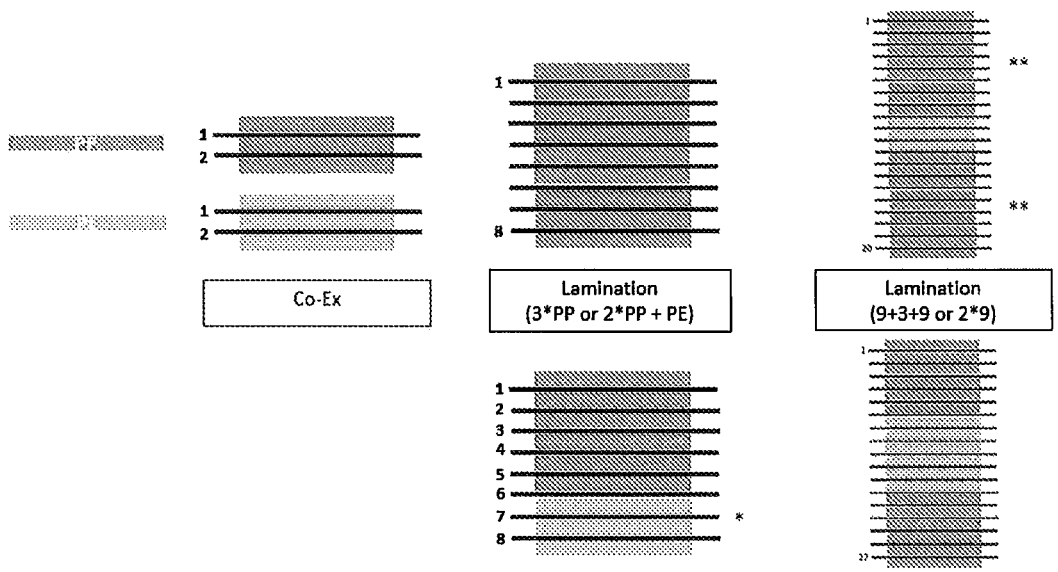
FIG. 14 is a schematic representation of exemplary 3, 9, 18, or 21 microlayer embodiments or examples in accordance with the present invention (the blue represents PP microlayers, the yellow represents PE microlayers, and the numbered black lines indicate interfaces).
Figure 16:
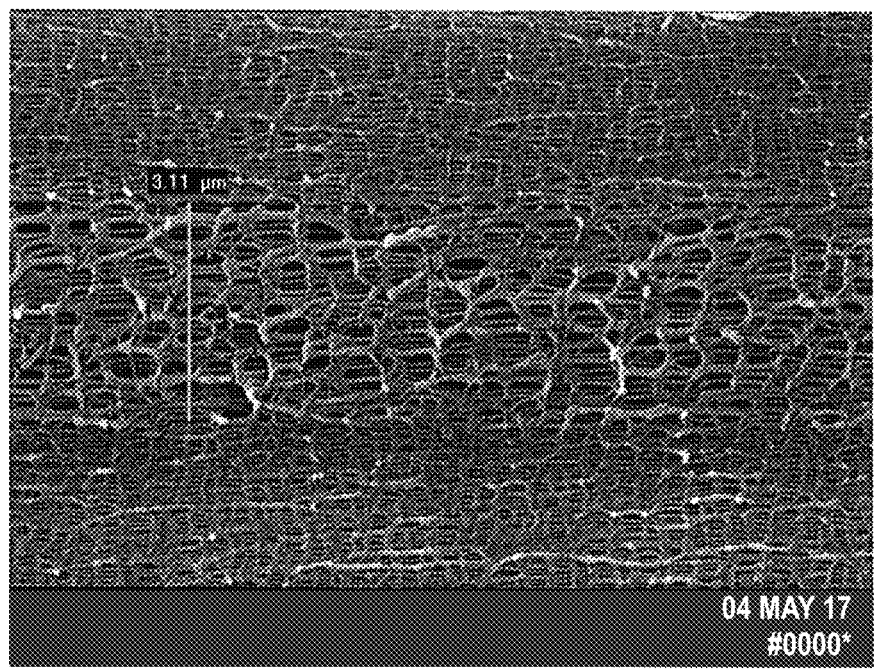
Figure 17:
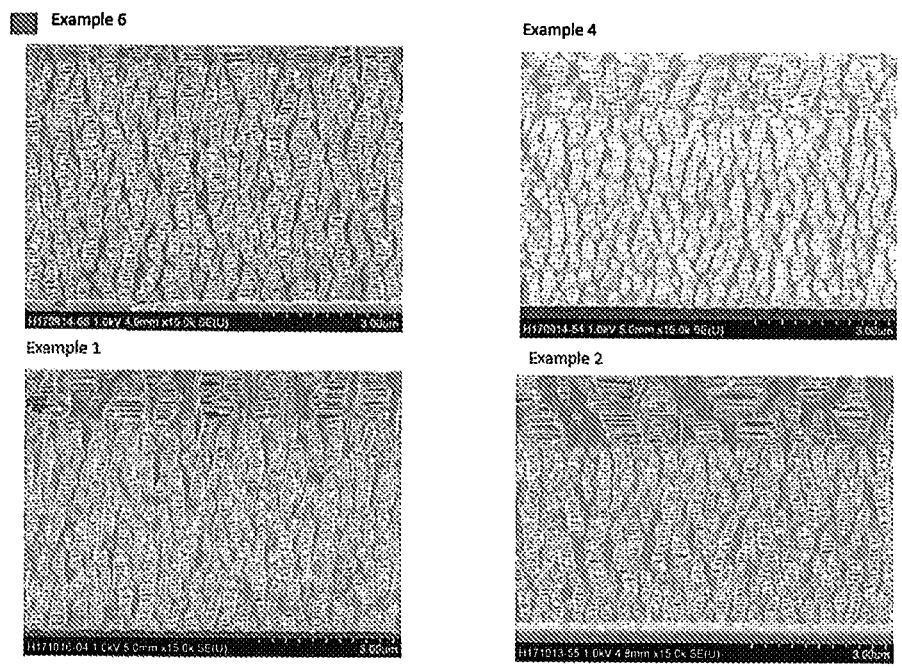
FIG. 17 includes SEM images of polypropylene layers of multilayer products according to some embodiments described herein.

Co-extrusion is not so limited. An exemplary co-extrusion process is shown in FIG. 4 and a co-extrusion die is shown in FIG. 5. In some embodiments, is performed using a co-extrusion die with one or more extruders feeding the die. Typically, there is one extruder for each desired layer or microlayer of the ultimately formed co-extruded film. For example, if the desired co-extruded film has three microlayers, three extruders are used with the co-extrusion die. In at least one embodiment the inventive membrane may be constructed of many microlayers or nanolayers wherein the final product may contain 50 or more layers of individual microlayers or nanolayers. In at least certain embodiments the microlayer or nanolayer technology may be created by in a pre-encapsulation feedblock prior to entering a cast film or blown film die.

In some preferred embodiments, the co-extrusion is an air bubble co-extrusion method and the blow-up ration may be varied between 0.5 to 2.0, preferably, 0.7 to 1.8, most preferably 0.9 to 1.5. Following co-extrusion using this blow-up ratio, the film may be MD stretched, MD stretched and then TD stretched (with or without MD relax) or simultaneously MD and TD stretched. The film may then be optionally calendered to further control porosity.

Co-Extrusion Benefits include but are not limited to increasing the number of layers (interfaces), which without wanting to be bound by any particular theory, is believed to improve puncture strength. Also, co-extrusion, without wishing to be bound by any particular theory, is believed to result in the observed DB improvement. Specifically, DB improvement may be related to the reduced PP pore size observed when a co-extrusion process is used. Also, co-extrusion allows for a wider number of choices of materials by incorporating blends in the microlayers. Co-extrusion also allows formation of thin tri-layer or multi-layer films (coextruded films). For example, a tri-layer co-extruded film having a thickness of 8 or 10 microns or thinner may be formed. Co-extrusion allows for higher MD elongation, different pore structure (smaller PP, larger PE). Co-extrusion can be combined with lamination to create desired inventive multi-layer structures. For, example, structures as formed in the Examples.

Minimum achievable thickness is determined by the extrusion process. In some examples, the thinnest PP microlayer may be about 0.19 mil (sublayer of about 4.83 um), and PE is about 0.17 mil (sublayer is about 4.32 um). 0.19 mil and 0.17 mil for each of the 3 microlayers layers of PP and PE, respectively. For certain 21 layer structure examples, we may have about 1.14 mil of PP (or 0.57 mil on each side) and 0.17 mil of PE for a total extruded thickness of 1.31 mil (33 um). We may be able to make 21-layer products of only 30 um or less with this configuration.

(2)

Laminating is not so limited and involves brining a surface of the co-extruded film together with a surface of the at least one other film and fixing the two surfaces two one other using heat, pressure, and or heat and pressure. Heat may be used, for example, to increase the tack of a surface of either or both of the co-extruded film and the at least one other film to make lamination easier, making the two surfaces stick or adhere together better.

In some preferred embodiments, the laminate formed by laminating the co-extruded film to at least one other film is a precursor for subsequent MD and/or TD stretching steps, with or without relax. In some embodiments, the co-extruded films are stretched before lamination.

(3) Additional Steps

Additional steps may comprise, consist of, or consist essentially of an MD, TD, or sequential or simultaneous MD and TD stretching steps. The stretching steps may occur before or after the lamination step. Stretching may be performed with or without MD and/or TD relax. Co-pending, commonly owned, U.S. Published Patent Application Publication No. US2017/0084898 A1 published Mar. 23, 2017 is hereby fully incorporated by reference herein.

Other additional steps may include calendering. For example, in some embodiments the calendering step may be performed as a means to reduce the thickness, as a means to reduce the pore size and/or porosity, and/or to further improve the transverse direction (TD) tensile strength and/or puncture strength of the porous biaxially stretched membrane precursor. Calendering may also improve strength, wettability, and/or uniformity and reduce surface layer defects that have become incorporated during the manufacturing process e.g., during the MD and TD stretching processes. The calendered film or membrane may have improved coat ability (using a smooth calender roll or rolls). Additionally, using a texturized calendering roll may aid in improved coating adhesion to the film or membrane.

Calendering may be cold (below room temperature), ambient (room temperature), or hot (e.g., 90° C.) and may include the application of pressure or the application of heat and pressure to reduce the thickness of a membrane or film in a controlled manner. Calendering may be in one or more steps, for example, low pressure calendering followed by higher pressure calendering, cold calendering followed by hot calendering, and/or the like. In addition, the calendering process may use at least one of heat, pressure and speed to densify a heat sensitive material. In addition, the calendering process may use uniform or non-uniform heat, pressure, and/or speed to selectively densify a heat sensitive material, to provide a uniform or non-uniform calender condition (such as by use of a smooth roll, rough roll, patterned roll, micro-pattern roll, nano-pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like.

Another additional step may include pore-filling. The pore-filling step is not so limited and can be performed in any manner not inconsistent with the stated goals herein. For example, in some embodiments the pores of the may be partially or fully coated, treated or filled with a pore-filling composition, material, polymer, gel polymer, layer, or deposition (like PVD). Preferably, the pore-filling composition coats 50% or more, 60% or more, 70% or more, 80% or more, 90% or more, 95% or more, etc. of the surface area of the pores. The pore-filling composition may comprise, consist of, or consist essentially of a polymer and a solvent. The solvent may be any suitable solvent useful for forming a composition for coating or filling pores, including organic solvent, e.g., octane, water, or a mixture of an organic solvent and water. The polymer can be any suitable polymer, including an acrylate polymer or a polyolefin, including a low-molecular weight polyolefin. The concentration of the polymer in the pore-filling composition may be between 1 and 30%, between 2 and 25%, between 3 and 20%, between 4 and 15%, between 5 and 10%, etc. but is not so limited, as long as the viscosity of the pore-filling composition is such that the composition can coat the walls of the pores of any porous biaxially-stretched precursor membrane disclosed herein. Pore-filling increases either or both of the machine direction (MD) and the transverse direction (TD) tensile

EXAMPLES

Preparation of Examples

Inventive (multilayer) products were prepared and compared to Comparative (tri-layer) products. The multilayer products were formed by the methods described herein, and comprise the steps of coextruding three separate films comprising three coextruded layers, and laminating the three films together. The tri-layer products were formed by forming three separate extruded monolayer films and laminating the monolayers together.

The compositions of the microlayers of the inventive products prepared are as follows:

Example 1

(EX 1)—(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 2

(EX 2)—(PP1/PP2/PP1)(PE1/PE2/PE3)(PP1/PP2/PP1)—PP1 is a homopolymer PP. PP2 a homopolymer polypropylene having a higher MFR than PP1. PE1 high density polyethylene with melt index between 0.25-0.5 g/10 min at 2.16 kg and 190 deg C. PE2 is an ultrahigh density polyethylene. PE3 is a blend of 95% high density polyethylene with melt index between 0.25-0.5 g/10 min at 2.16 kg and 190 deg C., and density range between 0.955-0.966 g/cm$^3$ and 5% mLLDPE. 13 microns thick. Basis weight of 0.7 mg/cm$^3$. JIS Gurley of 245 s/100 cc. AQ porosity of 41.45%.

Example 3

(EX 3)—(PP/PP/PP)(PE1/PE2/PE1)(PP/PP/PP)—PP layers are made of a homopolymer PP, density=0.90 g/cm$^3$, MFR in the range of 0.5 MFR-2 MFR. PE1 is made of high density polyethylene with melt index between 0.25-0.5 g/10 min at 2.16 kg and 190 deg C. PE2 is made of an ultrahigh molecular weight polyethylene.

Example 4

(EX 4)—(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 5

(EX 5)—PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 6

(EX 6)—(PP/PP/PP)(PE/PE/PE)(PP/PP/PP)—PP is made of a homopolymer PP, density=0.90 g/cm$^3$, MFR in the range of 0.5 MFR-2 MFR. PE is made of high density polyethylene with melt index between 0.25-0.5 g/10 min at 2.16 kg and 190 deg C. Thickness of 16.6 microns. Basis weight of 0.79 mg/cm$^3$. JIS Gurley of 198 s/100 cc. AQ porosity of 45.33%.

Example 7

(EX 7)—(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 8

(EX 8)—(PP1/PP2/PP1)(PE1/PE2/PE1)(PP1/PP2/PP1) PP1 is homopolymer PP, density=0.90 g/cm$^3$, MFR in the range of 0.5 MFR-2 MFR. PP2 is made of a homopolymer PP, 0.25 MFR, 0.9 density. PE1 is high density polyethylene with melt index between 0.25-0.5 g/10 min at 2.16 kg and 190 deg C. PE2 is an ultrahigh molecular weight polyethylene.

Example 9

(EX 9)—(PP1/PP2/PP1)(PE/PE/PE)(PP1/PP2/PP1)—PP1 is made of homopolymer PP, density=0.90 g/cm$^3$, MFR in the range of 0.5 MFR-2 MFR. PP2 is a blend of 95% homopolymer PP, density=0.90 g/cm$^3$, MFR in the range of 0.5 MFR-2 MFR and 5% of a propylene-ethylene copolymer. PE is a blend of 92% high density polyethylene with melt index between 0.25-0.5 g/10 min at 2.16 kg and 190 deg C. and 8% olefin block copolymer.

Example 10

(EX 10)—(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Mainly with reference to FIGS. 27 to 39 and additional multilayer embodiments, here are additional Examples 11 to 38:

Example 11

Each PP and PE layer of the trilayer structure is itself made up of multiple layers, preferably co-extruded and then laminated-(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 12

(PP1/PP2/PP3)—PP1 is a Polypropylene blend, PP2 is a PP block co-polymer, and PP3 is the same as PP1, PP2, or a different blend or block co-polymer.

Example 13

(PP1/PP1) or (PP2/PP2) or (PP1/PP2)—PP1 is a Polypropylene blend, PP2 is a PP block co-polymer.

Example 14

(PP1/PP1/PP1) or (PP2/PP2/PP2)—PP1 is a Polypropylene blend, PP2 is a PP block co-polymer.

Example 15

(PP1/PP2/PP3)—PP1 is a Polypropylene blend, PP2 is a PP block co-polymer, and PP3 is the same or a different PP block copolymer.

Examples 16

(PP3/PP2/PP1)/(PP3/PP2/PP1)—PP1 is a Polypropylene blend, PP2 is a PP block co-polymer, and PP3 is the same or a different PP block copolymer.

Example 17

(PP1/PP2/PP3)/(PP3/PP2/PP1)—PP1 is a Polypropylene blend, PP2 is a PP block co-polymer, and PP3 is the same or a different PP block copolymer.

Example 18

(PP1/PP2)/(PP3/PP1)—PP1 is a Polypropylene blend, PP2 is a PP block co-polymer, and PP3 is the same or a different PP block copolymer.

Example 19

(PP1/PP2/PP3/PP1)—PP1 is a Polypropylene blend, PP2 is a PP block co-polymer, and PP3 is the same or a different PP block copolymer.

Example 20

(PP1/PP2/PP3)—PP1 is a Polypropylene blend, PP2 is a PP block co-polymer, and PP3 includes an adhesion promoter.

Example 21

(P03/PP2/PP1)—PP1 is a Polypropylene blend, PP2 is a PP block co-polymer, and P03 is a Polyolefin blend (such as PP+PE).

Example 22

(PP1/PP2/PP3)—PP1 is a homopolymer PP+additives to modify the coefficient of friction as described herein, which may include any slip or block additives such as siloxane. PP2 is a homopolymer PP that is the same or different from that used in PP1 and includes a copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction (COF) that is the same or different from that used in PP1.

Examples 23

(PP3/PP2/PP1)—PP1 is a homopolymer PP+additives to modify the coefficient of friction (COF) as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 24

(PP3/PP2/PP1) or (PP1/PP2/PP3)—PP1 is a homopolymer PP+ additives to modify the coefficient of friction (COF) as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+copolymer PP, which may be any propylene ethylene or ethylene-propylene random copolymer, block co-polymer or elastomers.

Example 25

A coextruded PP precursor is proposed with the following structure:

Homopolymer *PP* + additives to modify surface *COF*
Homopolymer *PP* + copolymer *PP*
Homopolymer *PP* + additives to modify surface *COF*

The additives for surface modification can include any slip or antiblock additives such as siloxane. The copolymer can be any propylene-ethylene or ethylene-propylene random copolymer, block copolymer or elastomers.

The coextruded PP precursor can be extruded anywhere between 0.9-1.5 blow-up-ratio (BUR) to control the porosity. The coextruded PP precursor is then either sequentially MD- followed by TD-stretching or biaxially stretched simultaneously. The biaxially stretched film can be calendered further to control the porosity.

Example 26

A second proposed structure can be as the following for a battery separator or textile application:

1 — PP Blend
2 — PP Block Co-polym
    PP Block Co-polym

This structure can be designed for a higher tortuosity surface layer for water barrier in high velocity water test.

The types of copolymers that can be incorporated in the structure include but are not limited to propylene-ethylene or ethylene-propylene random copolymer, block copolymer or elastomers.

By extruding PP in the coextrusion format, the surface characteristics of the PP layer can be modified, and at the same time, a lower melting point copolymer resin can be incorporated in the middle layer to decrease the shut-down temperature. A different copolymer resin can also be incorporated anywhere in the structure to control the porosity of the TD-stretched film.

By incorporating a BUR in the precursor film, one can also further control the porosity required for different applications.

Example 27

(PP1/PP2/PP3)(PP1/PP2/PP3)(PP1/PP2/PP3)—PP1 is a Polypropylene blend, PP2 is a PP block co-polymer, and PP3 is the same or a different PP block copolymer.

Examples 28

(PP3/PP2/PP1)/(PP3/PP2/PP1)/(PP3/PP2/PP1)—PP1 is a Polypropylene blend, PP2 is a PP block co-polymer, and PP3 is the same or a different PP block copolymer.

Example 29

(PP3/PP2/PP1)(PP1/PP2/PP3)(PP3/PP2/PP1) PP1 is a Polypropylene blend, PP2 is a PP block co-polymer, and PP3 is the same or a different PP block copolymer.

Example 30

(PP1/PP2/PP3)(PP3/PP2/PP1)(PP1/PP2/PP3) PP1 is a Polypropylene blend, PP2 is a PP block co-polymer, and PP3 is the same or a different PP block copolymer.

Example 31

(PP1/PP2/PP3)(PP3/PP2/PP1)(PP3/PP2/PP1) PP1 is a Polypropylene blend, PP2 is a PP block co-polymer, and PP3 is the same or a different PP block copolymer.

Example 32

(PP3/PP2/PP1)(PP1/PP2/PP3)(PP1/PP2/PP3) PP1 is a Polypropylene blend, PP2 is a PP block co-polymer, and PP3 is the same or a different PP block copolymer.

Example 33

(PP1/PP2/PP3)(PP1/PP2/PP3)(PP1/PP2/PP3)—PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Examples 34

(PP3/PP2/PP1)/(PP3/PP2/PP1)/(PP3/PP2/PP1)—PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 35

(PP3/PP2/PP1)(PP1/PP2/PP3)(PP3/PP2/PP1) PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 36

(PP1/PP2/PP3)(PP3/PP2/PP1)(PP1/PP2/PP3) PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 37

(PP1/PP2/PP3)(PP3/PP2/PP1)(PP3/PP2/PP1) PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 38

(PP3/PP2/PP1)(PP1/PP2/PP3)(PP1/PP2/PP3) PP1 is a homopolymer PP+additives to modify the coefficient of friction as described herein, which may include any slip or block additives such as siloxane. PP2 is a homopolymer PP that is the same or different from that used in PP1 and PP3+copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 39

(RO417) like Example 2 except 7% mLLDPE. Thickness is 12.5 microns. Basis weight is 0.62 mg/cm$^2$, JIS Gurley is 200 s/100 cc. AQ porosity is 44.4%.

Example 40

(RO416) (PP/PP/PP)/(PE/PE/PE)/(PP/PP/PP). All PP layers are made of a homopolymer PP, density=0.90 g/cm$^3$, MFR in the range of 0.5 MFR-2 MFR. All PE layers are made of a high density polyethylene with melt index between 0.25-0.5 g/10 min at 2.16 kg and 190 deg C., and density range between 0.955-0.966 g/cm$^3$. Thickness is 14.9 microns. Basis weight is 0.75 mg/cm$^2$. JIS Gurley is 172 s/100 cc. AQ porosity is 44.2%.

Example 41

Figure 53:
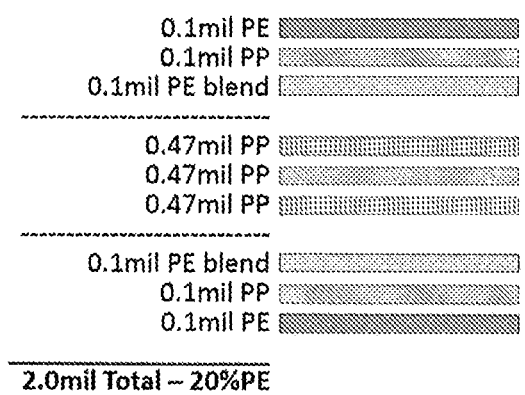
FIG. 53 is a schematic drawing of a multilayer microporous membrane according to some embodiments described herein.

Structure 1 as shown in FIG. 53 was manufactured by forming a first sub-membrane by co-extruding 0.1 mil PE, 0.1 mil PP, and 0.1 mil PE blend. A second sub-membrane was formed by co-extruding 0.47 mil PP, 0.47 mil PP, and 0.47 mil PP. Next, one second sub-membrane was laminated between two first sub-membranes to form the multilayer microporous membrane of FIG. 64.

This structure achieves low pin removal force and more adhesion between the layers. The PE outer layer provides reduced pin removal force. The PE blend (lower melting) at the interface provides improved interplay adhesion. Thin PE layers improve puncture strength. In some embodiments, the PP layers could be PP blends to improve adhesion and other properties.

Example 42

Figure 54:
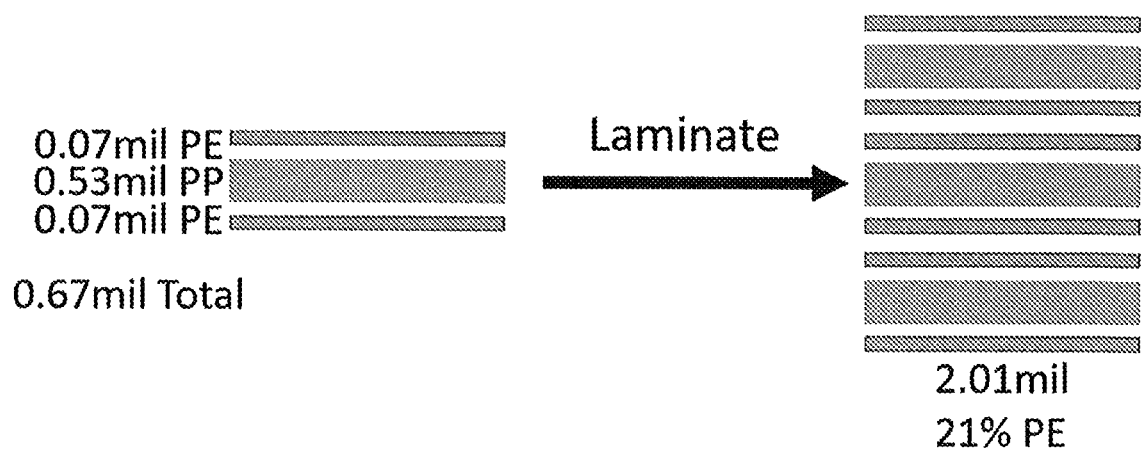
FIG. 54 is a schematic drawing showing the formation of a multilayer microporous membrane according to some embodiments described herein. The formed multilayer microporous membrane is on the right side of the Figure.

Structure 2 as shown in FIG. 54 was manufactured by forming a first sub-membrane by co-extruding 0.07 mil PE, 0.53 mil PP, and 0.07 mil PE. Next, three first-sub-membranes were laminated together to form the microporous membrane of structure 2.

The aim of this structure is to provide many benefits compared to a PE/PP/PE product. The aim of this structure is to provide low pin removal force (outer layer) and compatible interfacial layers. The PE outer layers of the first sub-membrane could provide pin removal force reduction while at the same time solving an intra-ply adhesion problem. Thin PE also improves puncture strength. In some embodiments, the PP resin may be a high molecular weight PP resin.

Example 43

Figure 55:
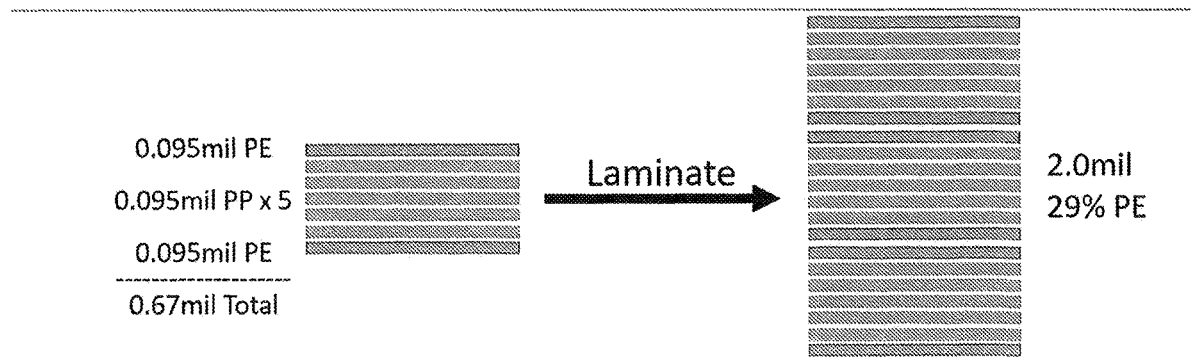
FIG. 55 is a schematic drawing showing the formation of a multilayer microporous membrane according to some embodiments described herein. The formed multilayer microporous membrane is on the right side of the Figure.

Structure 3 as shown in FIG. 55 was manufactured by forming a first sub-membrane by co-extruding 0.095 mil PE, 5×0.095 mil PP, and 0.095 mil PP. Next, three of the first sub-membrane were laminated together.

This structure is similar to structure 2 in FIG. 54 except, for example, that the PP portion of the first sub-membrane includes five separate micro-layers instead of one. This structure has all the benefits of structure 2, including additional benefits due to the increased number of micro-layers in the first sub-membrane.

Example 44

Figure 56:
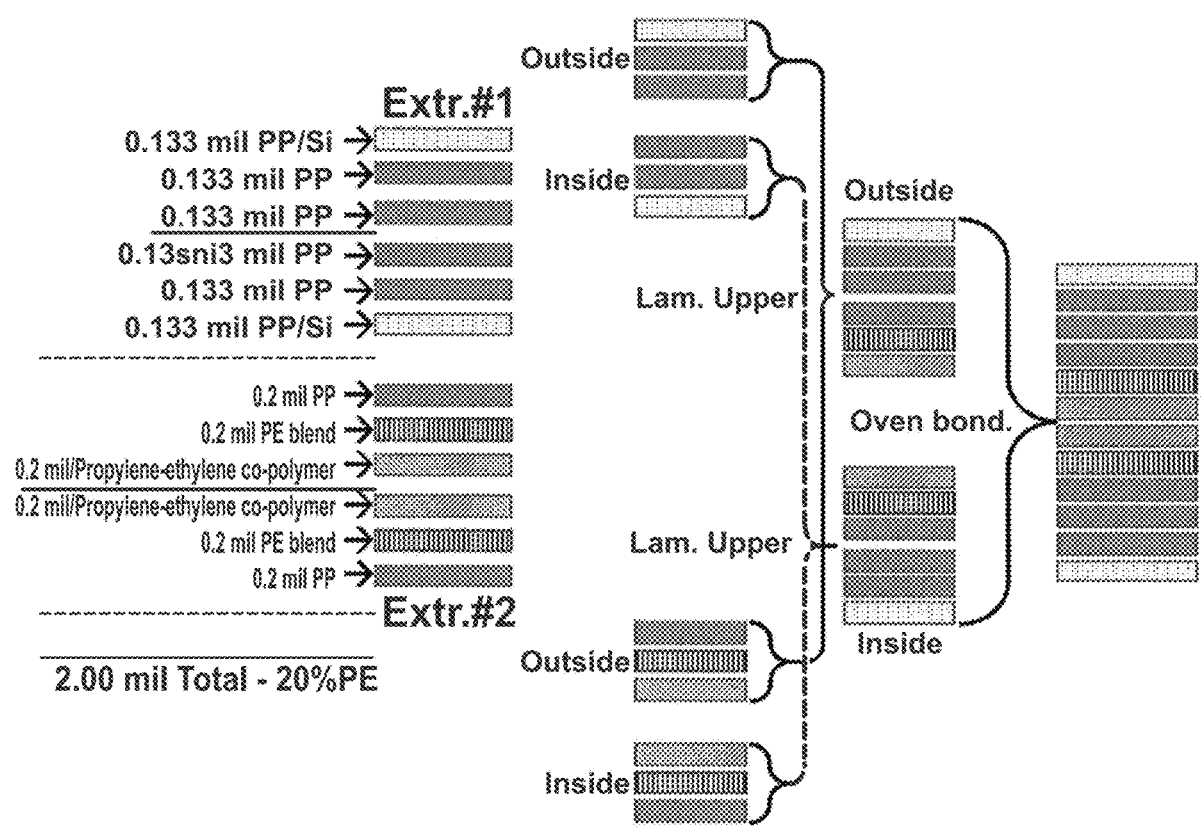
FIG. 56 is a schematic drawing showing the formation of a multilayer microporous membrane according to some embodiments described herein. The formed multilayer microporous membrane is on the right side of the Figure.

Structure 4 as shown in FIG. 56 was manufactured by forming a first sub-membrane by co-extruding 0.133 mil of a mixture of polypropylene and polysiloxane, 0.133 mil polypropylene, and 0.133 mil polypropylene. A second sub-membrane was formed by co-extruding 0.2 mil polypropylene, 0.2 mil of a polyethylene blend, and 0.2 mil of a mixture of polypropylene and a propylene-ethylene elastomer. In a first lamination step, a first sub-membrane and a second sub-membrane were bonded together as shown in FIG. 56, and then the laminates formed in the first lamination step are laminated together so that in the final product the microlayers made of polypropylene and a propylene-ethylene elastomer were touching.

This Example exhibits high DB, passes nail penetration, and favorable compression. The amount of polysiloxane is 3%.

Example 45

Figure 57:
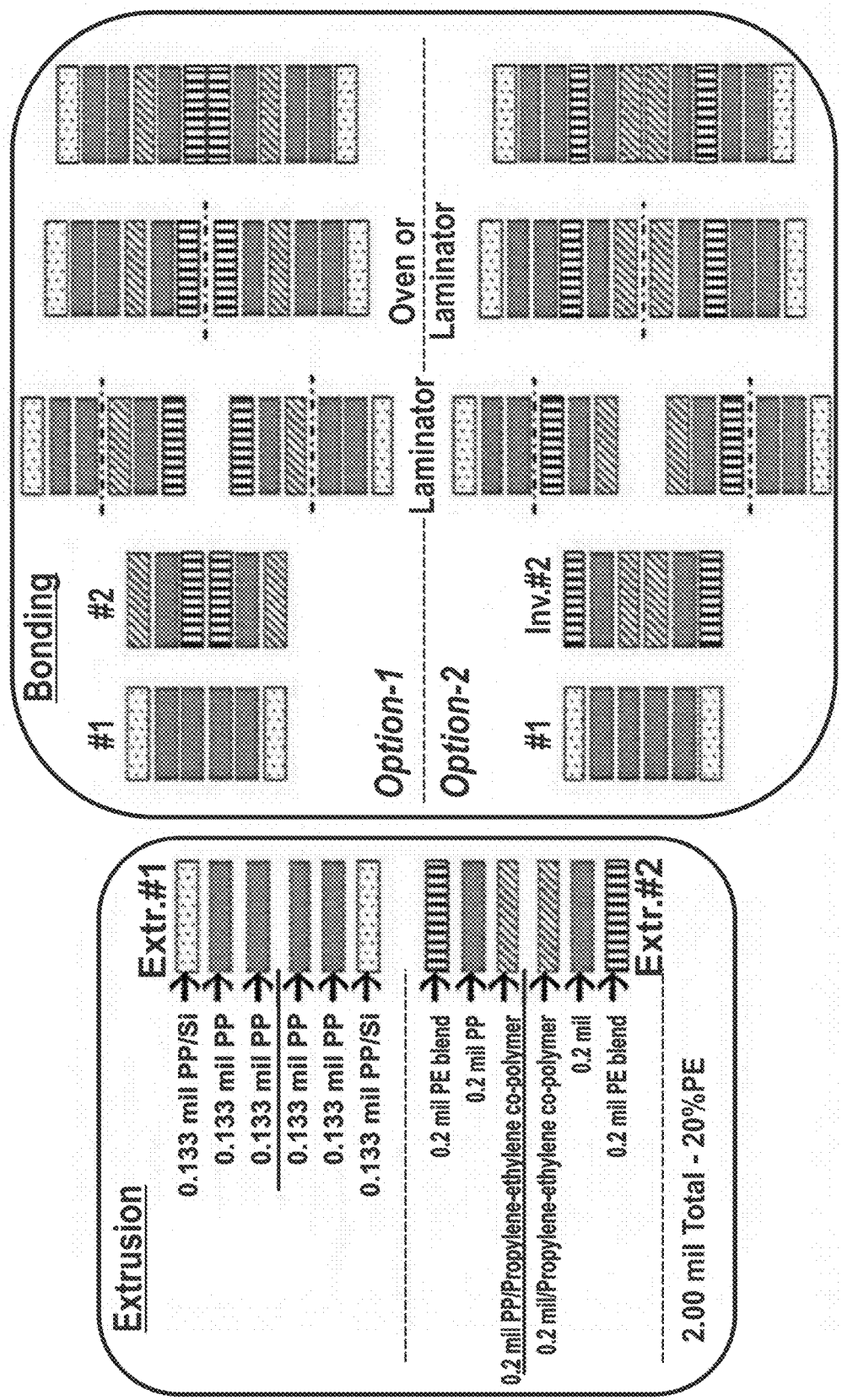
FIG. 57 is a schematic drawing showing the formation of a multilayer microporous membrane according to some embodiments described herein. The formed multilayer microporous membrane is on the right side of the Figure.

Structure 5 as shown in FIG. 57 was manufactured by forming a first sub-membrane by co-extruding 0.133 mil of a mixture of polypropylene and polysiloxane, 0.133 mil polypropylene, and 0.133 mil polypropylene. A second sub-membrane was formed by co-extruding 0.2 mil of a polyethylene blend, 0.2 mil of polypropylene, and 0.2 mil of a blend of polypropylene and a propylene-ethylene elastomer. In a first lamination step, a first sub-membrane was bonded to a second sub-membrane as whosin in FIG. 57, and then the laminates formed in the first lamination step were laminated together so that in the final product the microlayers made of polypropylene and a propylene-ethylene elastomer were touching.

This Example has high DB, passes nail penetration, and has favorable compression. 3% polysiloxane is added.

Example 46

Figure 58:
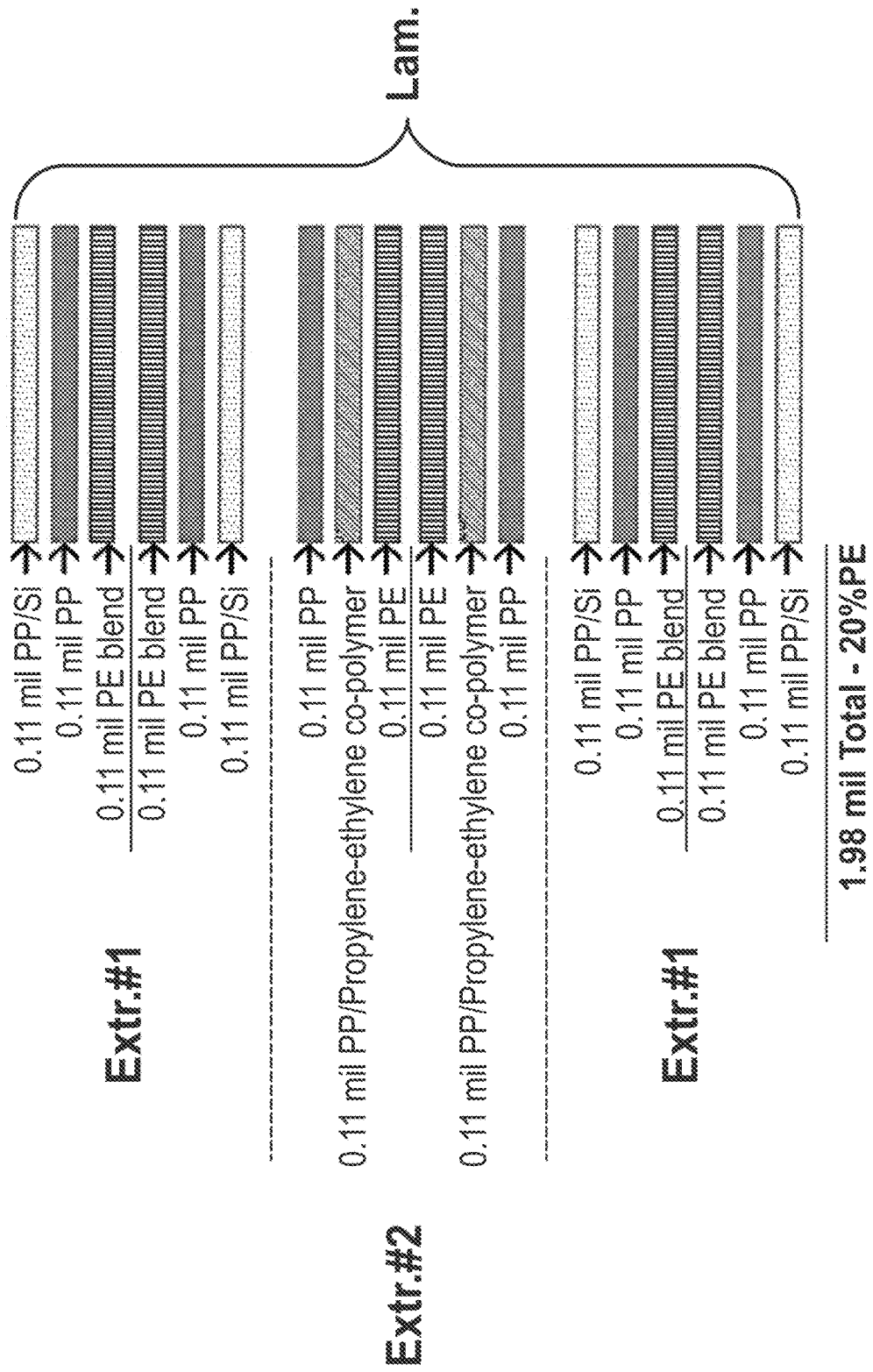
FIG. 58 is a schematic drawing of a multilayer microporous membrane according to some embodiments described herein.

Structure 6 as shown in FIG. 58 was manufactured by forming a first sub-membrane by co-extruding 0.11 mil of a mixture of PP and polysiloxane, 0.11 mil of polypropylene, 0.11 mil of a polyethylene blend, 0.11 mil of a polyethylene blend, 0.11 mil polypropylene, and 0.11 mil of a mixture of polypropylene and polysiloxane. A second sub-membrane was manufactured by co-extruding 0.11 mil PP, 0.11 mil of PP and a propylene-ethylene co-polymer, 0.11 mil of polyethylene, 0.11 mil of polyethylene, 0.11 mil of PP and a propylene-ethylene co-polymer, and 0.11 mil of polypropylene. Two first sub-membranes were then laminated on either side of a single second sub-membrane as shown in FIG. 58 to form the final product.

This product has 18 layers with 17 interfacial layers, high DB, passes nail penetration, and favorable compression. It contains 3% polysiloxane.

Example 47

Figure 59:
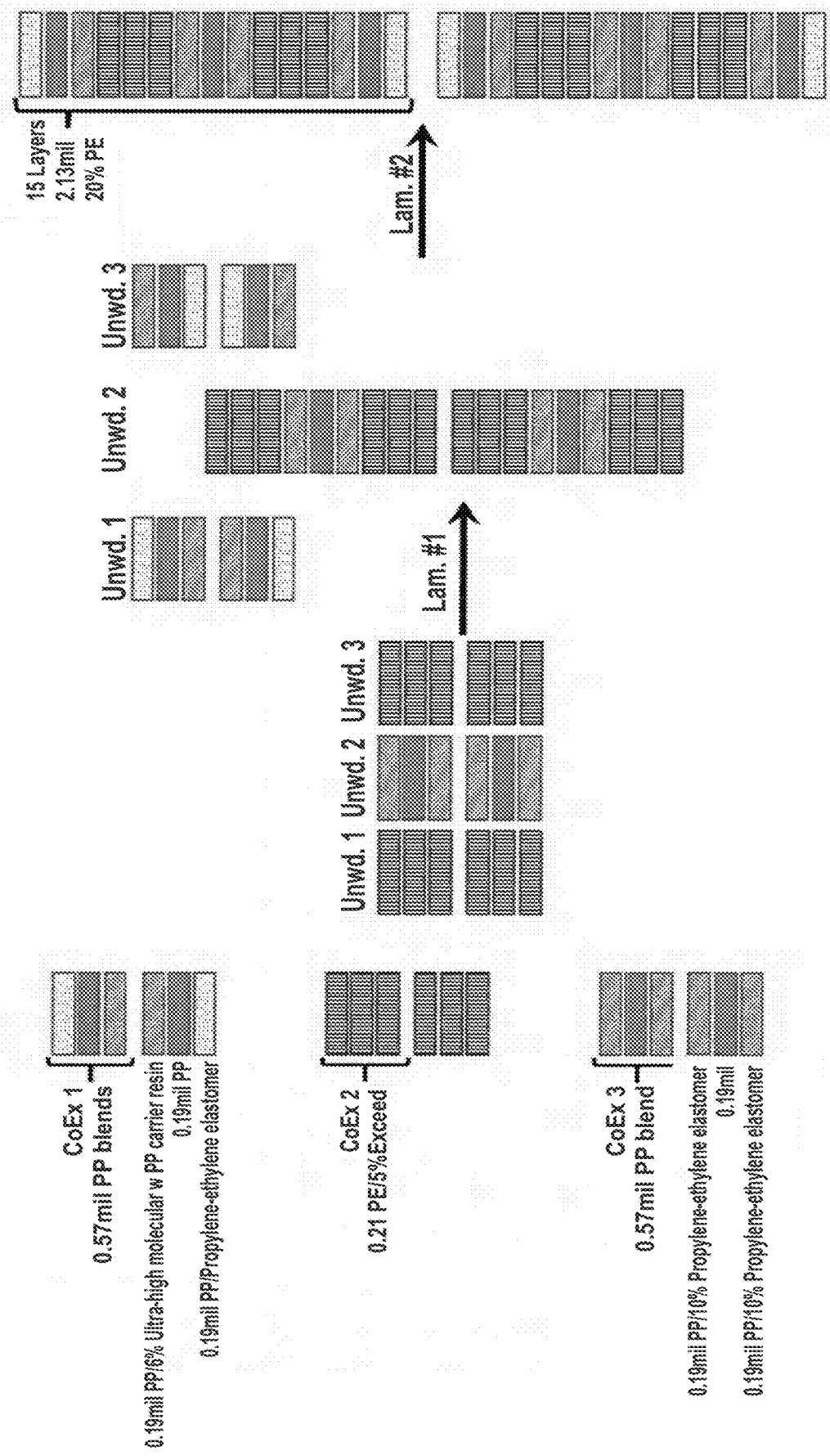
FIG. 59 is a schematic drawing showing the formation of a multilayer microporous membrane according to some embodiments described herein. The formed multilayer microporous membrane is on the right side of the Figure.

Structure 7 as shown in FIG. 59 was manufactured by forming a first sub-membrane by co-extruding 0.19 mil of a mixture of PP with 6% of an ultra-high molecular weight polysiloxane (slip agent or anti-blocking agent), 0.19 mil of PP, and 0.19 mil of PP with 10% propylene-ethylene elastomer. A second sub-membrane was formed by co-extruding 3×0.21 mil of a mixture of polyethylene and 5% metallocene linear low density polyethylene mLLDPE. A third sub-membrane was formed by co-extruding 0.19 mil of a mixture of PP and 10% propylene ethylene co-polymer, 0.19 mil PP, and 0.19 mil of a mixture of PP and 10% propylene ethylene co-polymer. All PPs layers are a homopolymer PP, density=0.90 g/cm$^3$, MFR in the range of 0.5 MFR-2 MFR. All PEs are a high density polyethylene with melt index between 0.25-0.5 g/10 min at 2.16 kg and 190 deg C., and density range between 0.955-0.966 g/cm$^3$.

As shown in FIG. 59, in a first lamination step, two second-sub-membranes were laminated on either side of a single third-sub-membrane. In a second lamination step, two first sub-membranes were laminated on either side of the laminate formed in the first step so that the microlayers comprising PP Example 48

Figure 60:
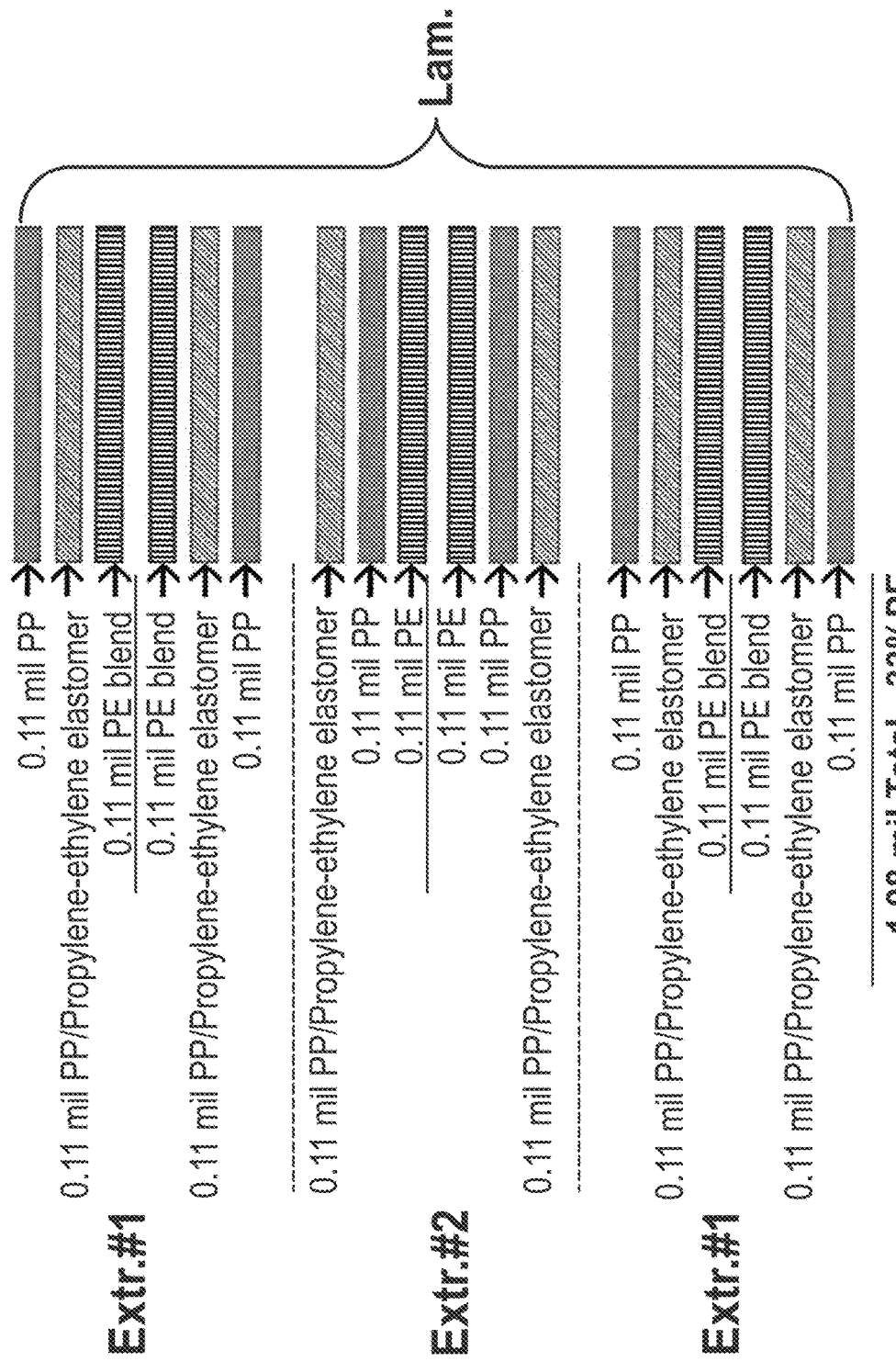
FIG. 60 is a schematic drawing of a multilayer microporous membrane according to some embodiments described herein.

Structure 8 as shown in FIG. 60 was manufactured by forming a first sub-membrane by co-extruding 0.11 mil PP, 0.11 mil PP/propylene-ethylene elastomer blend, 0.11 mil PE blend, 0.11 PE blend, 0.11 mil PP/propylene-ethylene elastomer blend, a 0.11 mil PP. A second sub-membrane was also formed by co-extruding 0.11 mil PP/propylene-ethylene elastomer, 0.11 mil PP, 0.11 mil PE, 0.11 mil PE, 0.11 mil PP, and 0.11 mil PP/propylene-ethylene elastomer. In a lamination step, two first sub-membranes were laminated on either side of a single second sub-membrane. This lamination (lam.) is shown in FIG. 60.

Example 49

A multilayer microporous membrane comprising 5% maleic anhydride modified HDPE and polypropylene in at least one outermost nano or micro-layer was formed. Some properties of this Example are reported in FIG. 61.

Example 50

Multilayer microporous membrane comprising 10% maleic anhydride modified Homo-PP in at least one outermost nano or micro-layer was formed. Some properties of the two multilayer microporous membranes of this Example are reported in FIGS. 61 and 62. An SEM image of Example 52 is in FIGS. 63 and 64.

Example 51

A multilayer microporous membrane comprising 10% maleic anhydride modified co-PP in at least one outermost nano or micro-layer was formed. Some properties of this Example are reported in FIGS. 61 and 62. An SEM image of Example 51 is in FIG. 63.

Example 52

A multilayer microporous membrane comprising 15% maleic anhydride modified homo-PP in at least one outermost nano or micro-layer was formed. Some properties of this Example are reported in FIG. 62. An SEM image of Example 52 is in FIGS. 63 and 64.

Example 53

A multilayer microporous membrane comprising 5% of a styrene-ethylene-propylene-styrene (SEPS) copolymer and a homopolymer PP, density=0.90 g/cm$^3$, MFR in the range of 0.5 MFR-2 MFR in at least one outermost nano or micro-layer was formed. Some properties of this Example are reported in FIG. 76.

In other examples, a styrene-ethylen-butylene-styrene co-polymer could be used in place of SEPS co-polymer.

Example 54

A multilayer microporous membrane comprising 10% maleic anhydride modified homo-PP, 5% of a styrene-ethylene-propylene-styrene (SEPS) copolymer, and a homopolymer PP, density=0.90 g/cm$^3$, MFR in the range of 0.5 MFR-2 MFR. in at least one outermost nano or micro-layer was formed. Some properties of this Example are reported in FIG. 76.

In other examples, a styrene-ethylen-butylene-styrene co-polymer could be used in place of SEPS co-polymer.

Example 55

A multilayer microporous membrane comprising 5% of a propylene-ethylene elastomer, 10% maleic anhydride modified homo-PP, and a homopolymer PP, density=0.90 g/cm$^3$, MFR in the range of 0.5 MFR-2 MFR in at least one_outermost nano or micro-layer was formed. Some properties of this Example are reported in FIG. 76.

Example 56

A multilayer microporous membrane formed using a collapsed bubble method. The membrane has a thickness of 10 microns, and is formed by co-extruding PP1/PP1/PE1 and collapsing the bubble to form a product having the structure PP1/PP1/PE1/PE1/PP1/PP1. PP1 is a homopolymer polypropylene having a melt index of 1.0 to 3.0 g/10 min. PE1 is a high density polyethylene having a melt index of 0.1 to 0.5 g/10 min. An SEM of this embodiment at 5000× is shown in FIG. 67 Data relating to Example 56 is found in the Table in FIG. 68

Example 57

A multilayer microporous membrane formed using a collapsed bubble method. The membrane has a thickness of about 10 microns, and is formed by co-extruding PP1/PP1/PP2 and collapsing the bubble to form a product having the structure PP1/PP1/PP2/PP2/PP1/PP1. PP1 is a homopolymer polypropylene having a melt index of from 1.0 to 2.5 g/10 min. PP2 is a blend of PP1 and a 4.5 to 6 MFR homopolymer PP. An SEM at 5000× of this embodiment is shown in FIG. 66 Data relating to Example 57 is found in the Table in FIG. 68

Example 58

Figure 71:
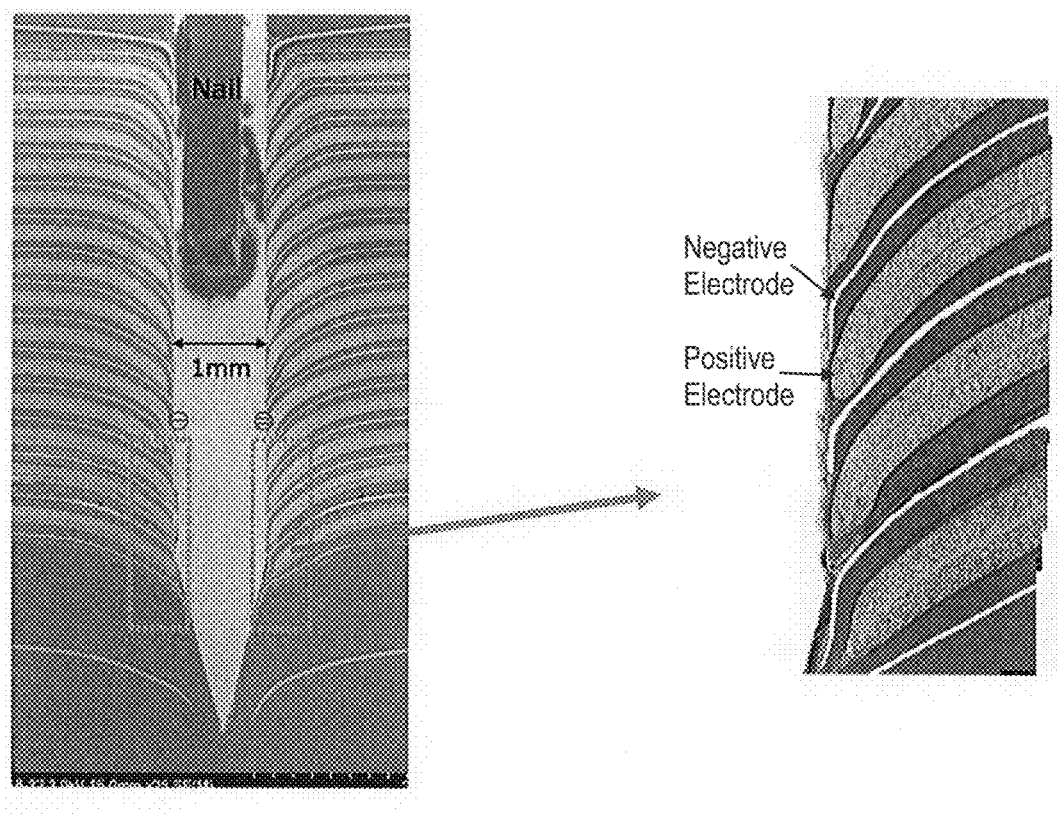
FIG. 71 shows a result of a nail penetration test performed on some embodiments described herein.

A sticky coated multilayer microporous membrane is manufactured and subjected to the nail penetration test. The results are shown in FIG. 71 which shows the layers hugging the nail.

Example 59

A multilayer microporous membrane having the structure (PP1/PP1/PP1/)/(PE1/PE1/PE1)/(PP1/PP1/PP1) and a thickness of 16 microns was manufactured. PP1 is a 0.7-1.0 MFR polypropylene. PE1 is a blend of a 0.2 to 0.4 MI polyethylene homopolymer with 5% mLLDPE.

The composition of the layers of certain comparative products were prepared as follows:

Comparative Example 1

(COM EX 1)—(PP)/(PE)/(PP)— all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and 5% mLLDPE.

Comparative Example 2

(COM EX 2)—(PP)/(PE)/(PP)— all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and 5% mLLDPE.

Comparative Example 3

(COM EX 3)—(PP)/(PE)/(PP)— all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and 5% mLLDPE.

Comparative Example 4

(COM EX 4)—(PP)/(PE)/(PP)— all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and 5% mLLDPE.

Comparative Example 5

(COM EX 5)—(PP)/(PE)/(PP)— all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and 5% mLLDPE.

Comparative Example 6 (H2013)

(PP)/(PE)/(PP)— thickness 20.5 microns, porosity 45%, Gurley 325 sec. All PP layers are a homopolymer PP, density=0.90 g/cm$^3$, MFR in the range of 0.5 MFR-2 MFR. PE layer is a high density polyethylene with melt index between 0.25-0.5 g/10 min at 2.16 kg and 190 deg C., and density range between 0.955-0.966 g/cm$^3$.

Comparative Example 7 (2320)

(PP)/(PE)/(PP) PE layer is a high density polyethylene with melt index between 0.25-0.5 g/10 min at 2.16 kg and 190 deg C., and density range between 0.955-0.966 g/cm$^3$. PP is a homopolymer PP like PP1 in Example 2. Thickness is 20 microns, porosity is 40%, and Gurley 536 seconds.

Comparative Example 8 (C210)

(PP)/(PE)/(PP) All PP layers are a homopolymer PP, density=0.90 g/cm$^3$, MFR in the range of 0.5 MFR-2 MFR. PE layer is a high density polyethylene with melt index between 0.25-0.5 g/10 min at 2.16 kg and 190 deg C., and density range between 0.955-0.966 g/cm$^3$. 16 microns thick. Porosity is 38%. Gurley is 450 seconds.

Comparative Example 9 (RO367)

(PP)/(PE)(PP) All PP layers are a homopolymer PP, density=0.90 g/cm$^3$, MFR in the range of 0.5 MFR-2 MFR. PE layer is a blend of 95% high density polyethylene with melt index between 0.25-0.5 g/10 min at 2.16 kg and 190 deg C., and density range between 0.955-0.966 g/cm$^3$ and 5% mLLDPE. 12 microns thick. Porosity is 39%. Gurley is 264 seconds.

Comparative Example 10 a multilayer microporous membrane with no additive, particularly no maleic anhydride modified polymer, therein. Data for Comparative Example 10 is found in FIGS. 61, 62, and 76. SEMs of Comparative Example 10 are in FIGS. 63 and 64.

Comparative Example 11

Is a coextruded trilayer product formed by coextruding three layers together to form a structure PP1/PE1/PP1, where PE1 is a high density polyethylene having a melt index of 0.2-0.6 g/10 min, and PP1 is a polypropylene having an MFR in the range of 0.7 to 1.0. The total thickness is 10 microns. Data for Comparative Example 11 is found in the Table in FIG. 70.

Characterization of Examples—Properties Related to Separator and Battery Performance Thickness (μm)

Thickness is measured in micrometers, μm, using the Emveco Microgage 210-A micrometer thickness tester and test procedure ASTM D374. The Thickness of Examples 1 and 6 and Comparative Examples 3 and 4 were determined and are reported in the table in FIG. 61. Comparative Examples with corresponding thicknesses to the Examples were prepared so that the separators could be compared meaningfully. All thicknesses disclosed herein were measured using this method.

Basis Weight (mg/cm$^2$)

The basis weight of Examples 1 and 6 and Comparative Examples 3 and 4 were determined and are reported in the table in FIG. 61. All basis weights disclosed herein were measured using this method.

JIS Gurley (s/100 cc)

Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water. The JIS Gurley of Examples 1 and 6 and comparative Examples 3 and 4 were measured and are reported in the table in FIG. 61. All Gurley values disclosed herein were measured using this method. Gurley of coated products is typically higher than that of the corresponding uncoated product.

% MD Shrinkage at 120° C.

Shrinkage is measured by placing a test sample between two sheets of paper which is then clipped together to hold the sample between the papers and suspended in an oven. For the '120° C. for 1 hour' testing, a sample is placed in an oven at 120° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction and is expressed as a % MD shrinkage and % TD shrinkage. The MD shrinkage of Example 1 and SR0367 were measured and are reported in the Table in FIG. 63. As shown in this Figure, the multilayer example exhibited significantly lower MD shrinkage at 120° C. All MD % shrinkage at 120° C. values were measured using this method.

% MD Shrinkage at 150° C.

Shrinkage is measured by placing a test sample between two sheets of paper which is then clipped together to hold the sample between the papers and suspended in an oven. For the '150° C. for 1 hour' testing, a sample is placed in an oven at 150° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction and is expressed as a % MD shrinkage and % TD shrinkage. All MD % shrinkage at 150° C. values were measured using this method.

Elasticity

Elasticity was evaluated using Dynamic Mechanical Analysis under the following conditions:
Apparatus: RSA-G2 (TA instrument)
Temperature −140° C. to 170° C.
Rate 5° C./minute
Strain: 0.2%
Frequency 1 Hz Results are shown in FIGS.
Tan(delta)=Loss Modulus (E')/Storage Modulus (E").
Storage modulus (E"), loss modulus (E') and tan(delta) were measured over a temperature range from −140° C. to 170° C. for Examples 1 and 2 and Example R0417. Values were also measured for 2320 (a comparative example). The results are found in FIGS. 34 to 43.

TD Elongation at Break (%)

% TD elongation at break is the percentage of extension of a test sample along the transverse direction of the test sample measured at the maximum tensile strength needed to break a sample. TD elongation of Examples 1 and 6 and Comparative Examples 3 and 4 were measured and are reported. Data for Examples 1 and 6 and Comparative Examples 3 and 4 is included in FIG. 51.

Compressibility:

Compression or compressibility was measured using a compression recovery or "spring back" method. The testing procedure is as follows:

Probe: A probe having a hemispherical shape is used. It is rounded for minimal contact with the surface.

Pre-load force: 0.020 N

A 1 cm×1 cm sample is compressed at 0.25N/min up to 0.50 N, then the pressure is released at 0.25N/min back to 0.01N. This is done at ambient temperature.

Percent dimensional change during compression and recovery are estimated based on the initial thickness of the sample.

Figure 49:
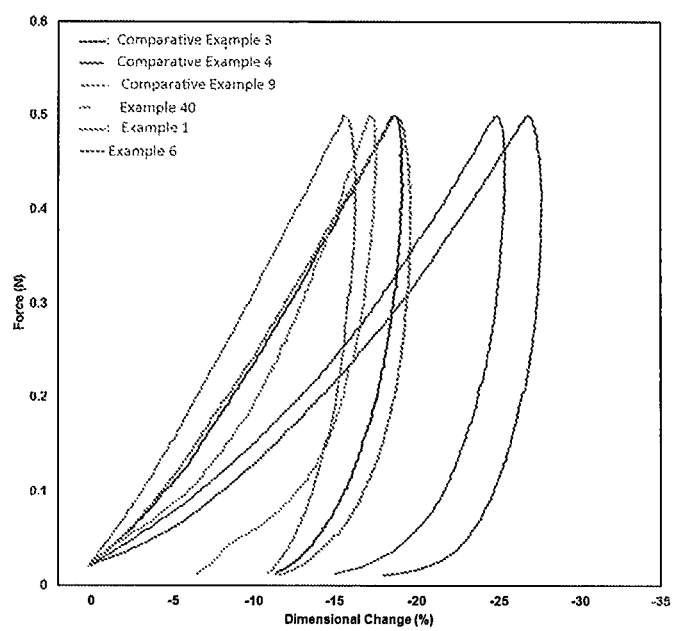
FIG. 49 is a graph showing compressibility data for multi-layer and tri-layer microporous membranes according to some embodiments described herein.

Data is shown for Examples 1 and 6 and Comparative Examples 3 and 4 in FIGS. 49 and 50.

Characterization of Examples—Structural Properties

AQ Porosity (%)

The porosity of a microporous film sample is measured using ASTM method D-2873 and is defined as the percentage void spaces in a microporous membrane measured in both Machine Direction (MD) and Transverse Direction (TD). AQ porosity for Examples 1 and 6 and Comparative Examples 3 and 4 were calculated and are reported in the table in FIG. 61. Some additional porosity data for Example 1 were determined and are reported in Table 1 below:

TABLE 1

| Product Number | Stretch Lot # | Ply No. | PP Pore Size (μm) | PE Pore Size (μm) | Porosity (%) | Surface Area (m$^2$/g) |
|---|---|---|---|---|---|---|
| EX 1 | C3435497 | 2 | 0.0402 | 0.0533 | 39.98 | 76.84 |
| | C3435497 | 5 | 0.0415 | 0.0552 | 40.18 | 74.33 |
| | C3435498 | 2 | 0.0390 | 0.0514 | 38.80 | 74.65 |
| | C3435498 | 5 | 0.0399 | 0.0521 | 39.03 | 73.78 |
| | C3435499 | 2 | 0.0378 | 0.0507 | 38.93 | 76.37 |
| | C3435499 | 5 | 0.0376 | 0.0515 | 39.11 | 77.33 |

Aquapore Porosity (%)

Aquapore (AQ) porosity for Examples 1 and 6 and Comparative Examples 3 and 4 was measured and are reported in the table in FIG. 61.

Calculated Tortuosity.

Tortuosity was calculated by the following Formula (1):

$$N_m = T^2/P \qquad (1),$$

where $N_m$ is the MacMullin Number, T is the tortuosity, and P is the porosity. Without wishing to be bound by any particular theory, it is believed that a battery separator with higher tortuosity will be safer. The reason for this is believed to be that, due to the more tortuous path a growing dendrite will have to follow to go from the anode to the cathode, it will be more difficult for a dendrite to grow between the electrodes. Calculated tortuosity for Examples 1 and 6 and Comparative Examples 3 and 4 are provided in the table in FIG. 61.

SEM Images

1. Preprocessing Conditions

Procedure for cross-sectional observation by Scanning Electron Microscope (SEM).
- a.) Cut samples to the proper size (several mm square).
- b.) ion milling processing to produce a flat cross-section (MD-ND plane).
  - Ion milling instrument: E-3500 (Hitachi High-Technologies Corporation.)
  - Ion source: Ar+
  - accelerating voltage: 3.5 kV
  - discharge voltage: 2.0 kV
  - stage control: 5 (Setting value)
  - processing time: 4 h
  - temperature: 20-25° C.
- c.) Mount the samples on stubs with double sided carbon conductive tapes and carbon paste.
- d.) Osmium plasma coating is applied to give conductivity to samples.

Figure 21:
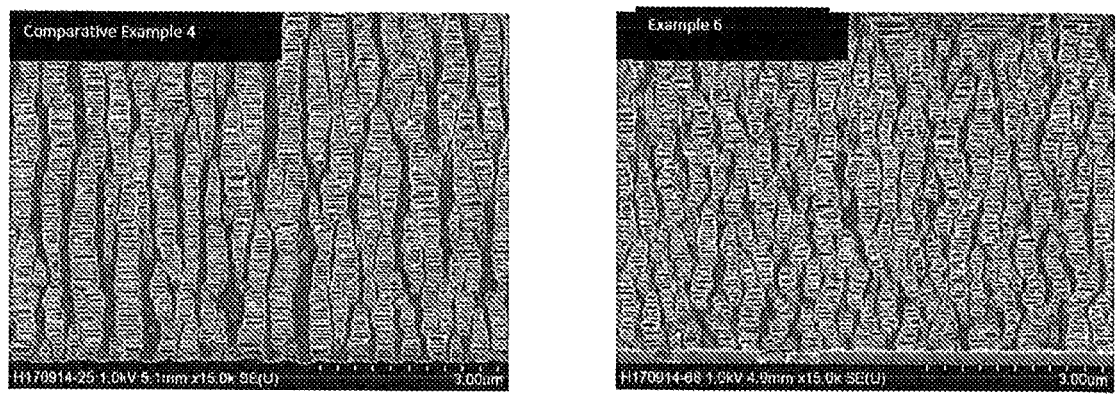
FIG. 21 includes SEM images showing side-by-side comparisons of polypropylene layers of tri-layer and multi-layer products described herein.
Figure 22:
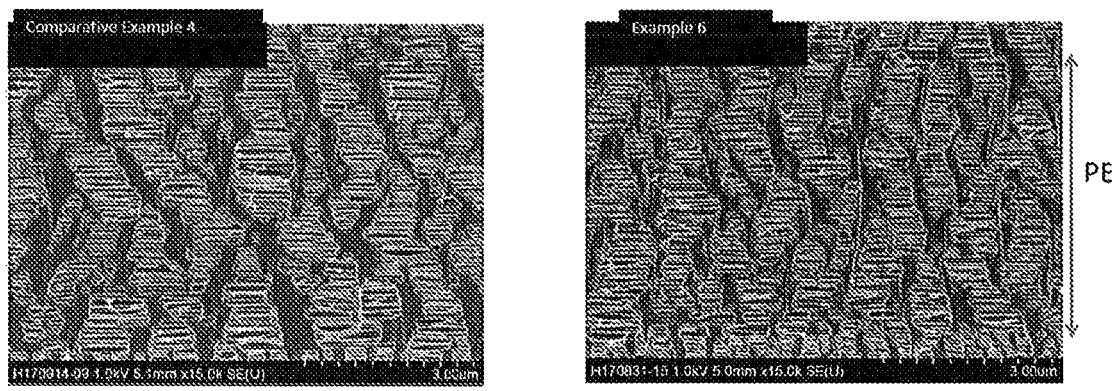
FIG. 22 includes SEM images showing side-by-side comparisons of polyethylene layers of tri-layer and multi-layer products described herein.
Figure 23:
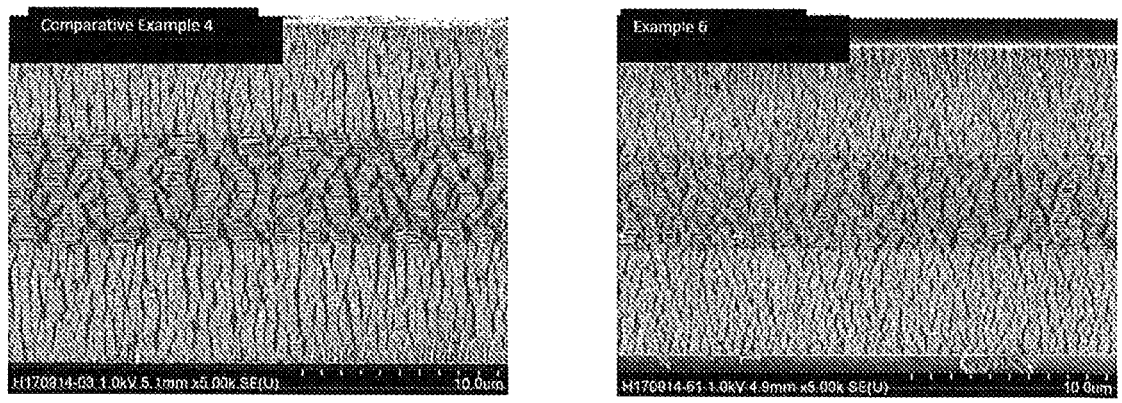
FIG. 23 includes SEM images showing a side-by-side comparison of tri-layer or multi-layer products described herein.
Figure 24:
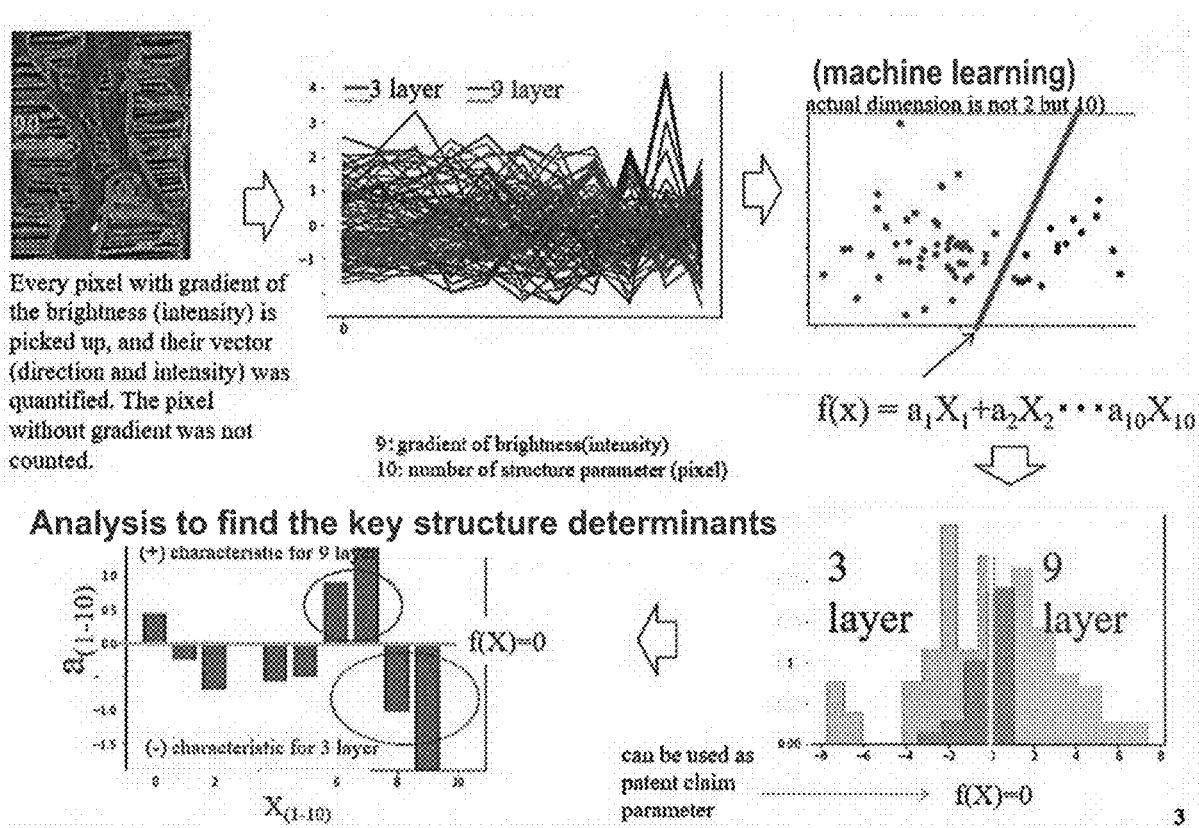
FIG. 24 Is a schematic drawing of the Machine Learning Test.

2. SEM observation conditions
- a.) Instrument: S-4800 (Hitachi High-Technologies Corporation.)
  - accelerating voltage: 1 kV
  - working distance: about 5 mm SEM images were taken of Examples 1, 2, 4, and 6 and of Comparative Examples 1, 4, and 5. Some of these images are shown in FIGS. 17-23. It was noticed that distinct structural differences existed between the multilayer products in the Examples and the tri-layer products of the Comparative Examples. For example, the PP layers of the tri-layer products comprised more columnar or vertically continuous amorphous regions, whereas the amorphous regions of the PP regions (having three layers of PP in the Examples) of the multilayer were mostly discontinuous and non-columnar. Side-by-side comparisons in FIGS. 21 to 23 show these differences between the multilayer and tri-layer products.

Machine Learning Test

Detailed Procedure

1: Image feature extraction to obtain vectors for machine learning
- read image with OpenCV python module cv2
- obtain 50 240×160 pixels^2 partial images at uniformly random positions from the entire PP or PE region and normalize the images by using cv2.normalize with alpha=0, beta=255 and norm_type=cv2.NORM_MIN-MAX.
- for each partial images, use SIFT feature detector cv2.xfeatures2d.SIFT_create with default settings to obtain features having angles and sizes
- transform each angle a of obtained features into a'=90−|a mod 180−90|
- count the number of transformed angles a' in the range [10*(i−1), 10*i] for i from 1 to 9, called bincounts
- concatenate 9 bincounts, average feature sizes (scalar) and the number of features (scalar) to be its feature vector $x_k$ (11 dimensions) (k-th image)
- take median of 11 features from 50 partial images to be the feature vector x of the input image.

Books on OpenCV python module cv2 include Python Machine Learning by Sebastian Raschka (ISBN 1783555130) and OpenCV with Python Blueprints by Michael Beyeler (1785282697). Both of these books are incorporated herein by reference in their entirety. More information on OpenCV is found at https://en.wikipedia.org/wiki/OpenCV.

Example for PP Layer:
- obtain feature vector x from PP layer with the procedure 1 described before standardize each value x in x as x'=(x−m)/s using the following mean vector m=[0.130044, 0.097145, 0.064741, 0.046804, 0.041001, 0.04556, 0.067887, 0.146754, 0.356967, 3.491879, 592.693] and standard deviation vector s=[0.015042, 0.011565, 0.01036, 0.009822, 0.009092, 0.009514, 0.012442, 0.015578, 0.065252, 0.16019, 61.84486]. let w be [−1.93271, −0.11236, 0.881572, 0.610045, 0.108711, −0.19117, −0.23341, −0.25129, 0.316427, −0.85435], and compute the inner product $w^T x'$
- if $w^T x' > 0.474451$, then the image would be classified as 9-layer.

Example for PE Layer:
- obtain feature vector x from PE layer with the procedure 1 described before standardize each value x in x as x'=(x−m)/s using the following mean vector m=[0.060457, 0.055388, 0.047194, 0.04173, 0.041355, 0.047016, 0.068816, 0.145675, 0.485289, 3.485506, 463.3455]. and standard deviation vector s=[[0.016258, 0.012571, 0.006678, 0.005956, 0.006548, 0.007862, 0.011579, 0.01748, 0.050551, 0.149306, 60.23634.] let w be [0.425456, −0.54632, −0.3682, 0.325934, 0.218774, −0.0182, 1.330079, 0.318507, −1.16948, −2.13611, −0.72327], and compute the inner product $w^T x'$
- if $w^T x' > −0.0609$, then the image would be classified as 9-layer.

Figure 25:
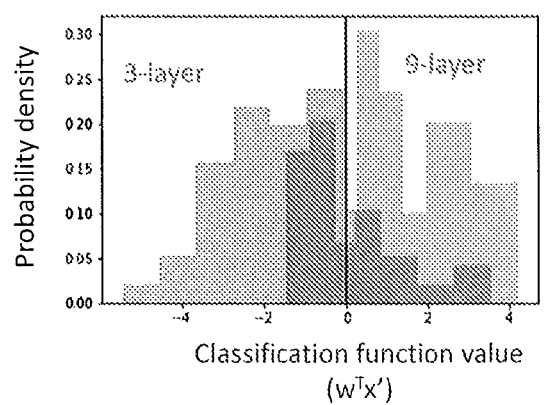
FIG. 25 shows coefficient and boundary parameters (PP) according to the Machine Learning Test described herein.
Figure 26:
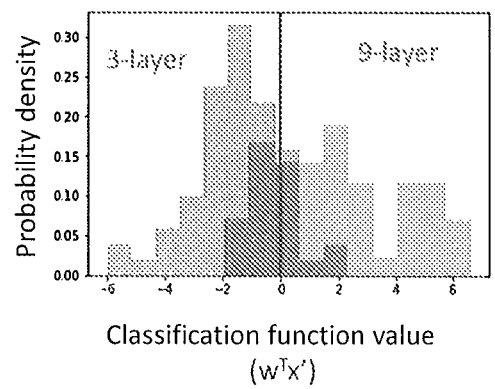
FIG. 26. shows coefficient and boundary parameters (PE) according to the Machine Learning Test described herein.
Figure 27:
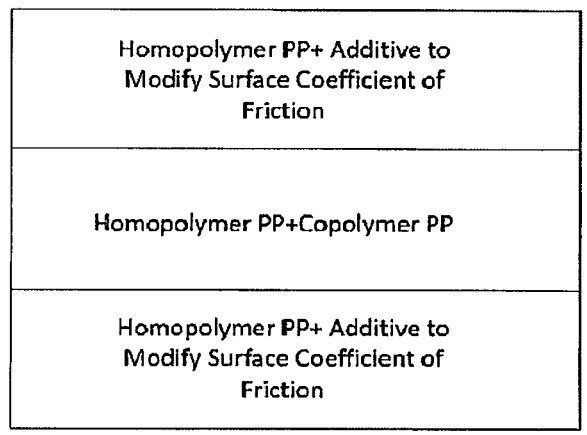
Figure 28:
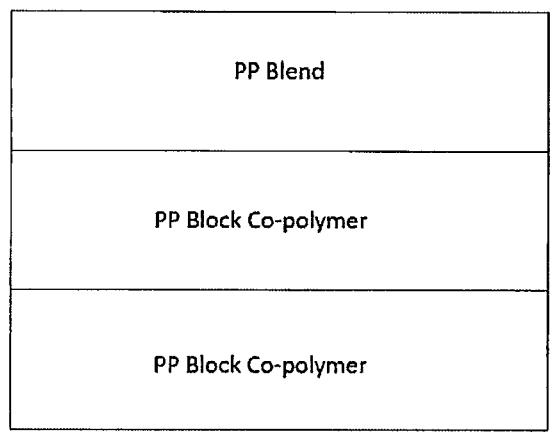
Figures 32, 33:
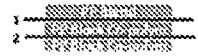
Figure 40:
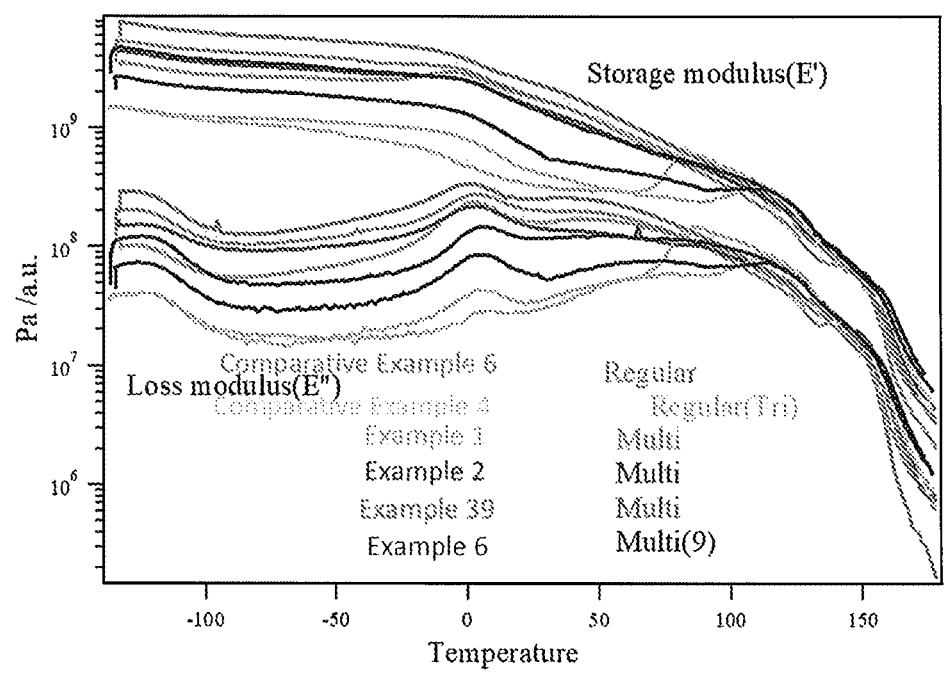
FIG. 40 is a graph showing overlay of storage modulus (E") and loss modulus (E') for multilayer microporous membranes according to some embodiments described herein and for a tri-layer microporous membrane.
Figure 41:
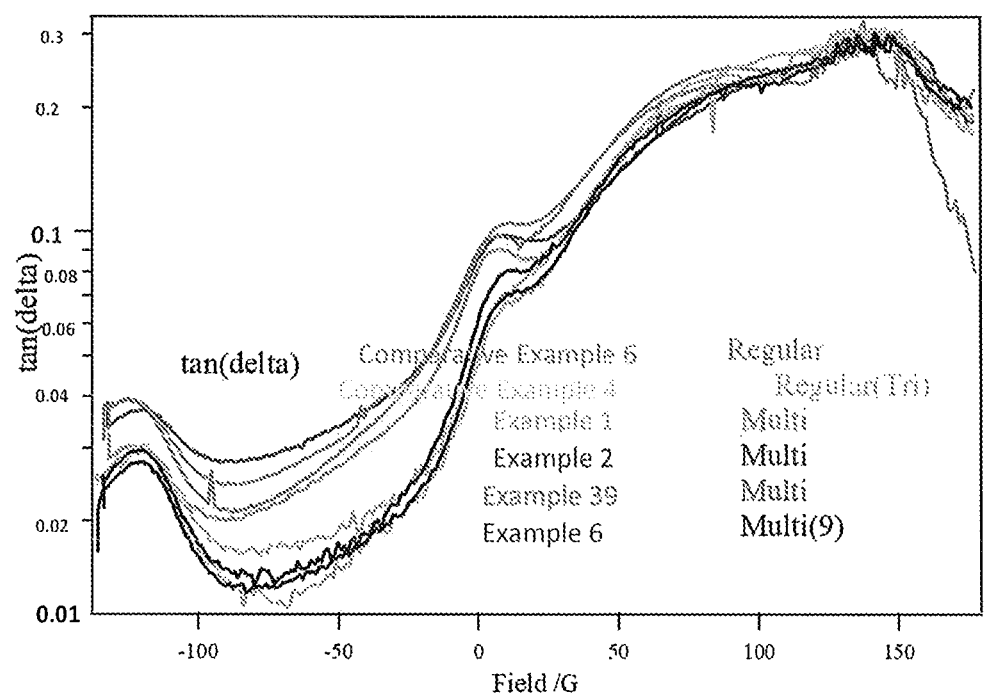
FIG. 41 is a graph showing a, where $\log_{10} a = \tan(\text{delta})$ over a temperature range from −140° C. to 170° C. and 52b is a graph showing tan(delta) over a temperature range from −140° C. to 170° C. for multilayer microporous membranes according to some embodiments described herein and for a tri-layer microporous membrane.
Figure 42:
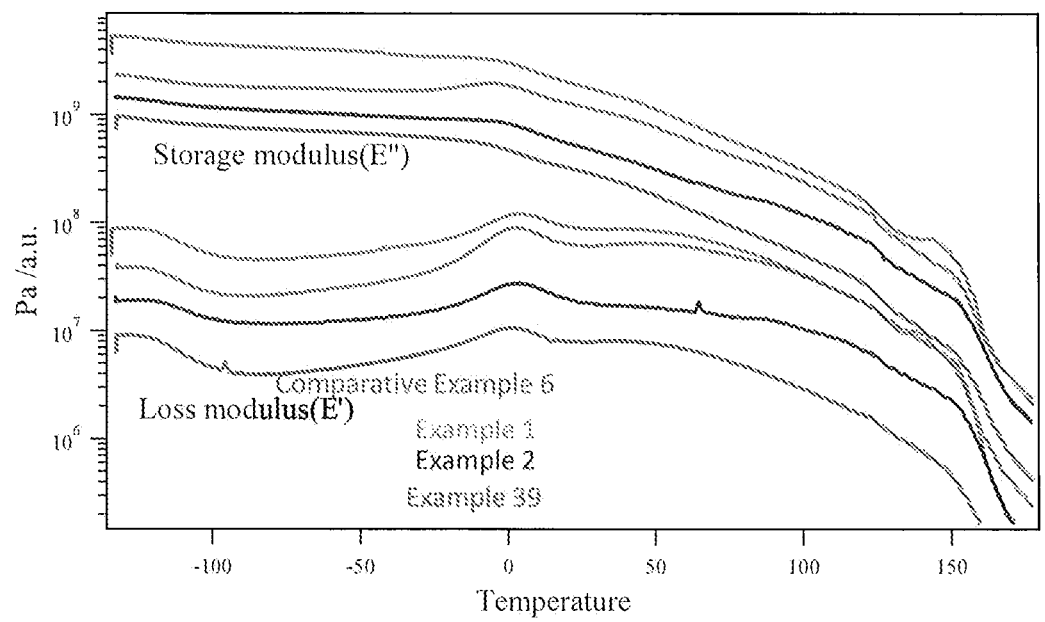
FIG. 42 is a graph showing offset storage modulus (E") and loss modulus (E') for multilayer microporous membranes according to some embodiments described herein and for a tri-layer microporous membrane.
Figure 43:
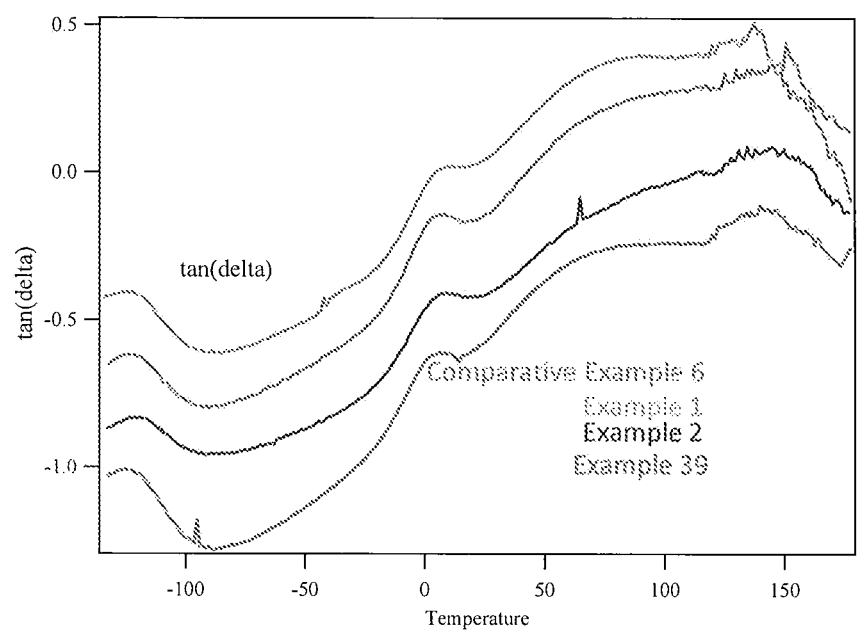
FIG. 43 is a graph showing offset tan(delta) for multilayer microporous membranes according to some embodiments described herein and for a tri-layer microporous membrane.
Figure 45:
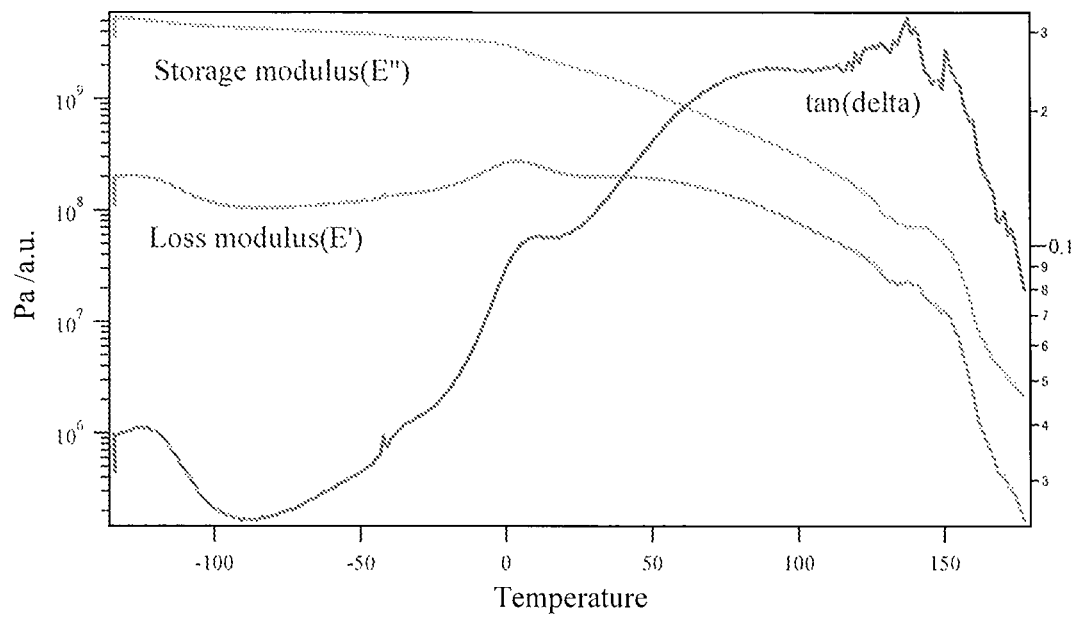
FIG. 45 is a graph showing storage modulus (E"), loss modulus (E'), and tan (delta) at temperatures from −100° C. to 150° C. for a tri-layer microporous membrane.
Figure 46:
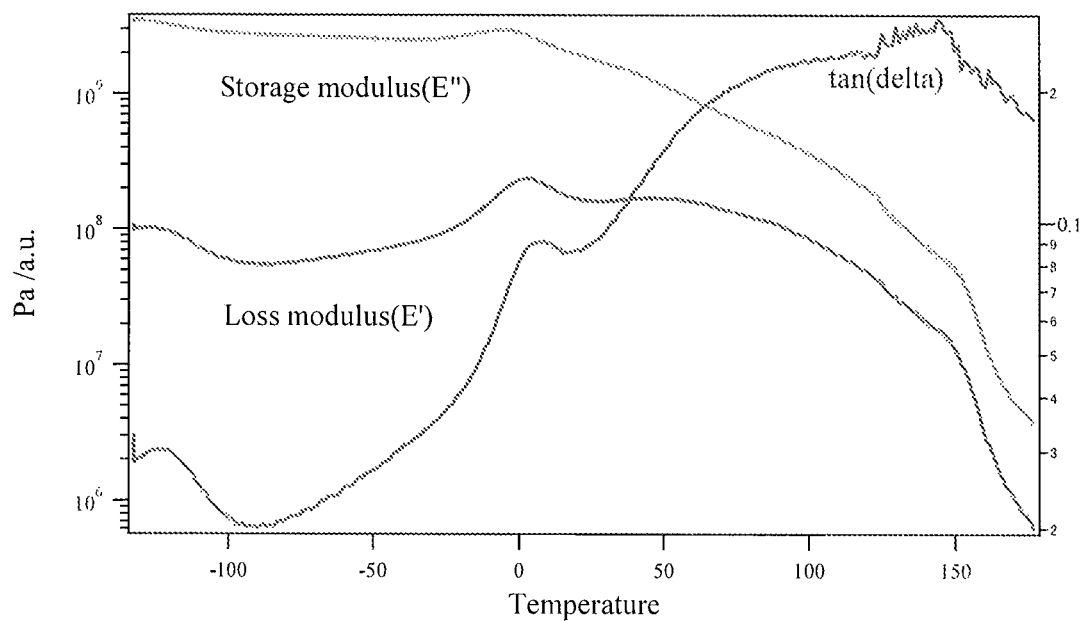
FIG. 46 is a graph showing storage modulus (E"), loss modulus (E'), and tan (delta) at temperatures from −100° C. to 150° C. for a multilayer microporous membrane according to some embodiments described herein.
Figure 47:
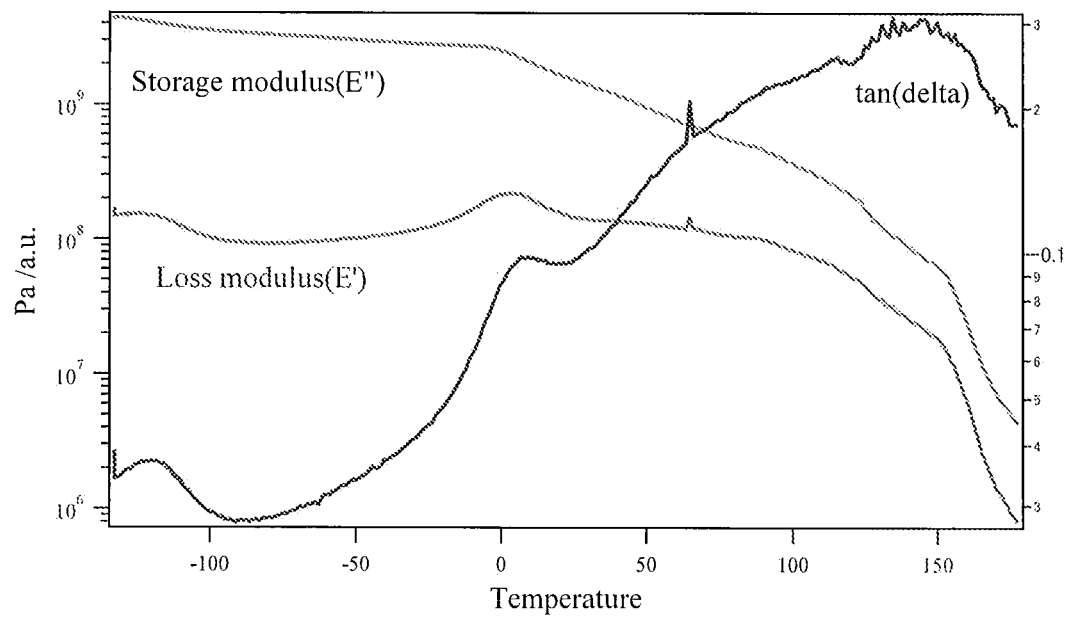
FIG. 47 is a graph showing storage modulus (E"), loss modulus (E'), and tan (delta) at temperatures from −100° C. to 150° C. for a multilayer microporous membrane according to some embodiments described herein.
Figure 48:
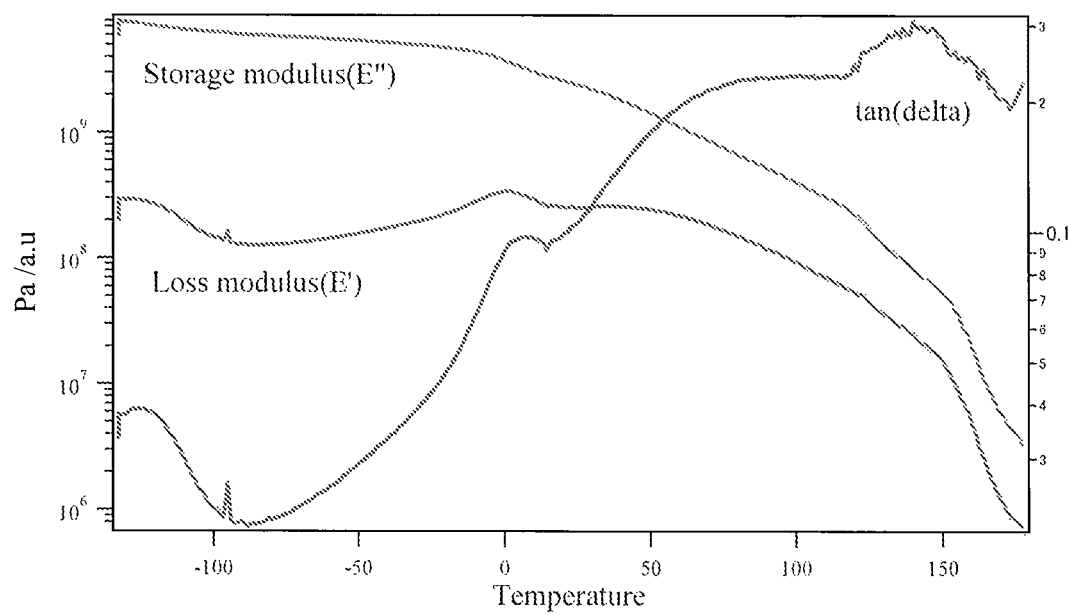
FIG. 48 is a graph showing storage modulus (E"), loss modulus (E'), and tan (delta) at temperatures from −100° C. to 150° C. for a multilayer microporous membrane according to some embodiments described herein.

Examples 1, 2, 4, 6, and 39, and Comparative Examples 1, 3 4, 5, 6, 7, 8, and 9 were subjected to the Machine Learning Test to see if the Comparative (tri-layer) and Inventive (multilayer) Examples could be distinguished by this test, and the results are in FIGS. 25 and 26. The Comparative (tri-layer) and Inventive (multilayer) Examples could be distinguished using the Machine Learning Test.

High Speed Puncture

Figure 69:
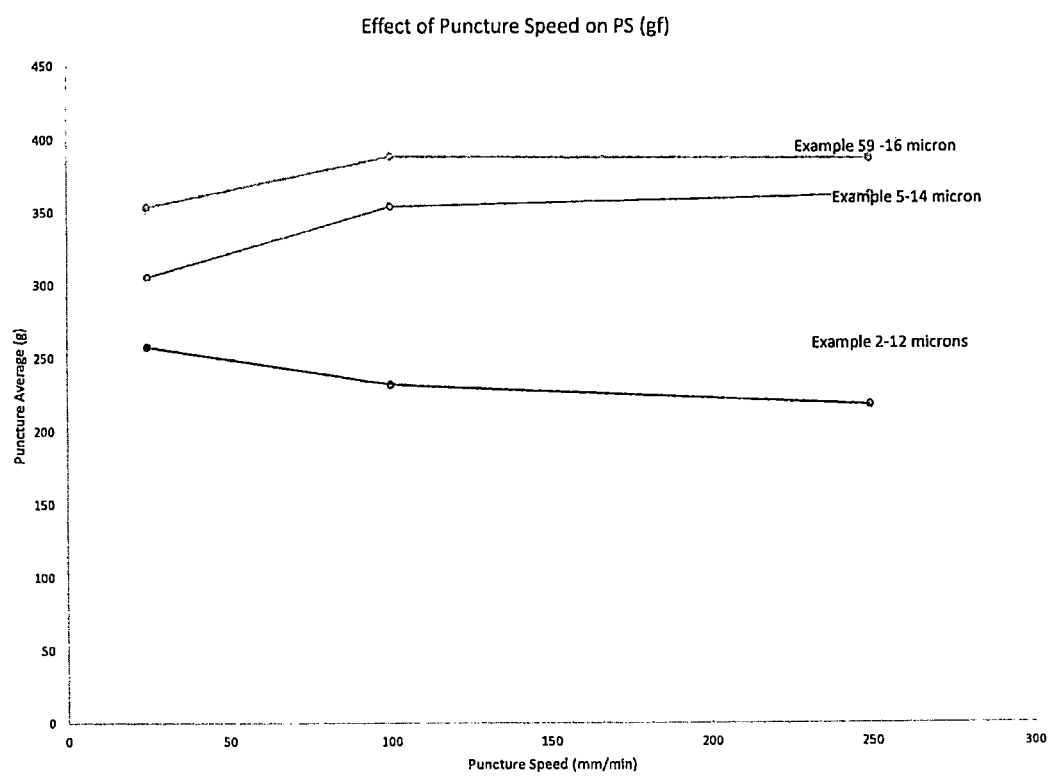
FIG. 69 is a graph including puncture average (g) data for some embodiments described herein.

In this method, a 1.25"×40" sample of the microporous material is allowed to equilibrate in a temperature and humidity controlled environment for 20 minutes. Then the sample is punctured by a round tipped needle made of tungsten carbide. The tip has a radius of 0.5 mm and the test runs at 25 mm/min. The process is repeated every inch until 30 data points have been collected. The average of these data points is reported as puncture. For puncture average, two puncture measurements are averaged. Some puncture data, including high speed puncture data which is obtained using a puncture speed above 25 mm/min, is in FIG. 69.

In accordance with at least selected embodiments, the application, disclosure or invention relates to novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate novel or improved structures, performance, utilization, such as improved shutdown, improved strength, improved dielectric breakdown strength, improved elongation, improved puncture strength, improved high speed puncture strength, lower Gurley, reduced crystallization, and/or reduced tendency to split, and combinations thereof.

In accordance with at least selected embodiments, this application or invention is directed to additives for improved battery performance, improved additive containing membranes, improved battery separators, and/or improved batteries, and/or improved or related methods of manufacture and/or use thereof. In accordance with at least certain embodiments, this application or invention is directed to additive-containing membranes, separator membranes, and/or battery separators, and/or methods for making and/or for using such membranes, separator membranes, and/or battery separators. In accordance with at least particular embodiments, this application or invention is directed to the incorporation of additives into microporous membranes or separator membranes for use in secondary lithium batteries, such as secondary lithium ion batteries, improved battery separators, and/or related methods. In some embodiments, the membrane may contain additives that improve performance in battery chemistries, for example, in lithium ion batteries. In other selected embodiments, the membrane may contain additives that improve pin removal performance such as siloxane or lithium stearate. In other certain embodiments, the invention may also relate to methods for making such a membrane or separator membrane and methods for using such a membrane or separator membrane, for example, as a lithium battery separator. In accordance with at least selected embodiments, the present application or invention is directed to novel or improved porous membranes, separator membranes, separators, dry process separators, composites, electrochemical devices, batteries, methods of making such membranes, separators, composites, devices and/or batteries. In accordance with at least certain embodiments, novel or improved membrane or separator structures, performance, and/or utilization are provided, addressed, or disclosed, such as improved shutdown, improved strength, improved dielectric breakdown strength, improved elongation, improved puncture strength, improved high speed puncture strength, lower gurley, reduced crystallization, and/or reduced tendency to split, and combinations thereof. In accordance with at least certain selected embodiments, the present invention is directed to a novel or improved separator membrane that contains additives or elastomers. The improved membrane may preferably demonstrate improved shutdown, improved strength, improved dielectric breakdown strength, and/or reduced tendency to split. In accordance with at least selected embodiments, this application or invention is directed to battery separators having a microporous polymeric film or membrane and an optional coating layer on at least one side of the microporous polymeric film, wherein at least one of the microporous polymeric film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described films, membranes, coatings, and/or separators. Methods for making the films, membranes, coatings, and/or battery separators are also described. In accordance with at least particular embodiments, this application or invention is directed to improved or novel battery separators having at least one of increased puncture strength, decreased pin removal force, improved electrolyte wettability, and increased pore size, microporous polymeric films with an optional coating layer on at least one side of the microporous polymeric film, battery separators having at least one of an optional coating and an microporous polymeric film including therein and/or thereon an additive selected from the group of a lubricating agent, a surfactant, a nucleating agent, a shrinkage reducing agent, and/or a plasticizing agent, microporous polymeric films having an additive present mainly in at least one surface region of the film or present throughout the film, present in a single surface region of the film, present in a first surface region of the film and in a second surface region of the film that is opposite to the first surface region, a coating applied to a surface of the microporous polymeric film, the coating may be applied to only one surface of the microporous polymeric film, to a first side of the microporous polymeric film and another coating may be applied to a second side of the microporous polymeric film that is opposite to the first side, and/or combinations thereof. In accordance with at least possibly preferred embodiments, the microporous polymeric film or membrane is a microporous polyolefin membrane such as a dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

The microporous multilayer battery separators described herein, in some embodiments, exhibit improved safety, strength, and durability compared to prior bi-layer, tri-layer, or multi-layer battery separators. For example, the separators may exhibit increased average Dielectric Breakdown (DB), increased minimum DB, increased shutdown speed, and increased tortuosity, all of which are indicative of a safer battery separator. The separators may also exhibit increased puncture strength and an increased mixed penetration value, indicative of a stronger more durable battery.

These properties of the microporous multilayer battery separators described herein are a result of, at least in part, the method by which they are made. This method, in some embodiments, comprises at least coextruding two or more polymer mixtures to form a first coextruded bi-layer, tri-layer, or multi-layer film, coextruding two or more other polymer mixtures to form a second coextruded bi-layer, tri-layer, or multi-layer film, and coextruding two or more further polymer mixtures to form a third coextruded bi-layer, tri-layer, or multi-layer film. Co-extrusion typically involves use of a co-extrusion die with one or more extruders feeding the die (typically one extruder per layer of the bi-layer, tri-layer, or multi-layer film). The polymer mixtures used to form each layer of the first, second, and third bi-layer, tri-layer, or multi-layer layer film may be the same or different. The mixtures may only include one polymer, or more than one polymer, e.g., polymer blends. Also, more than three bi-layer, tri-layer, or multi-layer films may be formed. After the first, second, and third bi-layer, tri-layer, or multi-layer film is formed, the films are laminated together with two of the films formed on opposite surfaces of one of the films to form the microporous battery separators described herein.

The microporous multilayer battery separators described herein may be used in lithium ion batteries, including secondary lithium batteries, resulting in batteries with improved safety and durability.

The battery separators herein may be described in several different ways.

In a first aspect, a battery separator for a lithium battery is described herein. In some embodiments, the battery separator comprises at least one microporous separator membrane or sub-membrane comprising a plurality of porous or microporous polymer microlayers or nanolayers, wherein at least one of the individual microlayers or nanolayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer or nanolayer. In some embodiments, a plurality of said separator membranes or sub-membranes of polymer microlayers or nanolayers are laminated to each other or to a microporous polymer membrane. In some embodiments, at least one of said separator membranes or sub-membranes of polymer microlayers or nanolayers has at least three microlayers or nanolayers. Sometimes, at least one of said separator membranes or sub-membranes of polymer microlayers or nanolayers are made of one or more polyolefins. Sometimes, at least one of said separator membranes or sub-membranes of polymer microlayers or nanolayers are made up of coextruded dry process polyolefin microlayers or nanolayers. In some embodiments, at least two said separator membranes or sub-membranes of polymer microlayers or nanolayers. In some embodiments, at least three said separator membranes or sub-membranes of polymer microlayers or nanolayers.

Described herein is a multilayer microporous film or membrane that may exhibit improved properties, including improved dielectric break down and strength, compared to prior monolayer or tri-layer microporous membranes of the same thickness. The preferred multilayer microporous membrane comprises microlayers and one or more lamination interfaces or barriers. Also disclosed is a battery separator or battery comprising one or more of the multilayer microporous films or membranes. The inventive battery and battery separator is preferably safer and more robust than batteries and battery separators using prior monolayer and tri-layer microporous membranes. Also, described herein is a method for making the multilayer microporous separators, membranes or films described herein.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. For example, the present inventions or embodiments may be especially well suited for dry process bubble extrusion and laminated membranes or precursors, but other membranes or precursors are likewise covered and described such as dry process slot die, dry process slot die coextrusion, wet process slot die, wet process slot die coextrusion, BNBOPP cast film, BNBOPP cast film coextrusion, cascaded slot die extrusion, laminated versions, coated products, and/or the like. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A multilayer microporous membrane or film having or exhibiting at least one of following:
   (a) having at least one additive in at least one layer of the multilayer microporous membrane or film;
   (b) having or exhibiting increased or improved compressibility compared to a tri-layer microporous membrane having the same thickness, Gurley, porosity, and/or resin make-up as the multilayer microporous membrane or film;
   (c) having or exhibiting increased or improved elongation at break (TD) compared to a tri-layer microporous membrane having the same thickness, Gurley, porosity, and/or resin make-up as the multilayer microporous membrane or film:
   (d) having or exhibiting reduced high temperature shrinkage at 150° C. compared to a tri-layer microporous membrane having the same thickness, Gurley, porosity, and/or resin make-up as the multilayer microporous membrane or film;
   (e) having or exhibiting reduced high temperature shrinkage at 120° C. compared to a tri-layer microporous membrane having the same thickness, Gurley, porosity, and/or resin make-up as the multilayer microporous membrane or film;
   (f) having at least one layer that comprises a polymer blend; and
   (g) having a non-woven or woven attached to one or both sides of the multilayer microporous membrane or film, wherein the membrane or film has or exhibits increased or improved elasticity at or above 150° C. compared to a tri-layer microporous membrane having the same thickness, Gurley, porosity, and/or resin make-up as the multilayer microporous membrane or film, and optionally wherein:
   tan(delta) of the membrane or film, when measured according to dynamic mechanical analysis, is greater than −0.6 at 150° C.;

tan(delta) of the membrane or film, when measured according to dynamic mechanical analysis, is between −1.0 and −0.6 at a temperature between 175° C. and 200° C.;

tan(delta) of the membrane or film, when measured according to dynamic mechanical analysis, is between −0.9 and −0.6 at a temperature between 175° C. and 200° C.;

tan(delta) of the membrane or film, when measured according to dynamic mechanical analysis is between −0.8 and −0.6 at a temperature between 175° C. and 200° C.;

tan(delta) of the membrane or film, when measured according to dynamic mechanical analysis is between −0.7 and −0.6 at a temperature between 175° C. and 200° C.;

tan(delta) of the membrane or film, when measured according to dynamic mechanical analysis, is above −1.2 at temperatures at or above 200° C.;

tan(delta) of the membrane or film, when measured according to dynamic mechanical analysis is above −1.0 at temperatures at or above 200° C.; or tan(delta) of the membrane or film, when measured according to dynamic mechanical analysis is above is above −0.8 at temperatures at or above 200° C.

2. A multilayer microporous membrane or film having or exhibiting at least one of following:
- (a) having at least one additive in at least one layer of the multilayer microporous membrane or film;
- (b) having or exhibiting increased or improved compressibility compared to a tri-layer microporous membrane having the same thickness, Gurley, porosity, and/or resin make-up as the multilayer microporous membrane or film;
- (c) having or exhibiting increased or improved elongation at break (TD) compared to a tri-layer microporous membrane having the same thickness, Gurley, porosity, and/or resin make-up as the multilayer microporous membrane or film:
- (d) having or exhibiting reduced high temperature shrinkage at 150° C. compared to a tri-layer microporous membrane having the same thickness, Gurley, porosity, and/or resin make-up as the multilayer microporous membrane or film;
- (e) having or exhibiting reduced high temperature shrinkage at 120° C. compared to a tri-layer microporous membrane having the same thickness, Gurley, porosity, and/or resin make-up as the multilayer microporous membrane or film;
- (f) having at least one layer that comprises a polymer blend; and
- (g) having a non-woven or woven attached to one or both sides of the multilayer microporous membrane or film, wherein the membrane or film has or exhibits increased or improved compressibility compared to a tri-layer microporous membrane having the same thickness, Gurley, porosity, and/or resin make-up as the multilayer microporous membrane or film.

3. A multilayer microporous membrane or film having or exhibiting at least one of following:
- (a) having at least one additive in at least one layer of the multilayer microporous membrane or film;
- (b) having or exhibiting increased or improved compressibility compared to a tri-layer microporous membrane having the same thickness, Gurley, porosity, and/or resin make-up as the multilayer microporous membrane or film;
- (c) having or exhibiting increased or improved elongation at break (TD) compared to a tri-layer microporous membrane having the same thickness, Gurley, porosity, and/or resin make-up as the multilayer microporous membrane or film:
- (d) having or exhibiting reduced high temperature shrinkage at 150° C. compared to a tri-layer microporous membrane having the same thickness, Gurley, porosity, and/or resin make-up as the multilayer microporous membrane or film;
- (e) having or exhibiting reduced high temperature shrinkage at 120° C. compared to a tri-layer microporous membrane having the same thickness, Gurley, porosity, and/or resin make-up as the multilayer microporous membrane or film;
- (f) having at least one layer that comprises a polymer blend; and
- (g) having a non-woven or woven attached to one or both sides of the multilayer microporous membrane or film, wherein the membrane or film has or exhibits increased or improved elongation at break (TD) compared to a tri-layer microporous membrane having the same thickness, Gurley, porosity, and/or resin make-up as the multilayer microporous membrane or film, wherein:

the elongation at break (TD) may be more than 30% higher, 35% higher, 40% higher, 41% higher, 42% higher, 43% higher, 44% higher, or 45% higher, compared to a tri-layer microporous membrane having the same thickness, Gurley, porosity, and/or resin make-up as the multilayer microporous membrane or film.

4. A multilayer microporous membrane or film having or exhibiting at least one of following:
- (a) having at least one additive in at least one layer of the multilayer microporous membrane or film;
- (b) having or exhibiting increased or improved compressibility compared to a tri-layer microporous membrane having the same thickness, Gurley, porosity, and/or resin make-up as the multilayer microporous membrane or film;
- (c) having or exhibiting increased or improved elongation at break (TD) compared to a tri-layer microporous membrane having the same thickness, Gurley, porosity, and/or resin make-up as the multilayer microporous membrane or film:
- (d) having or exhibiting reduced high temperature shrinkage at 150° C. compared to a tri-layer microporous membrane having the same thickness, Gurley, porosity, and/or resin make-up as the multilayer microporous membrane or film;
- (e) having or exhibiting reduced high temperature shrinkage at 120° C. compared to a tri-layer microporous membrane having the same thickness, Gurley, porosity, and/or resin make-up as the multilayer microporous membrane or film;
- (f) having at least one layer that comprises a polymer blend; and
- (g) having a non-woven or woven attached to one or both sides of the multilayer microporous membrane or film, wherein the membrane or film has or exhibits reduced high temperature shrinkage at 120° C. compared to a tri-layer microporous membrane having the same thickness, Gurley, porosity, and/or resin make-up as the multilayer microporous membrane or film, wherein:

the membrane or film may have a high temperature shrinkage at 120° C. that is 30 to 75% lower, 35 to 70% lower, 35 to 65% lower, or 40 to 60% lower, compared to a tri-layer microporous membrane having the same thickness, Gurley, porosity, and/or resin make-up as the multilayer microporous membrane or film.

5. A multilayer microporous membrane or film having or exhibiting at least one of following:
(a) having at least one additive in at least one layer of the multilayer microporous membrane or film;
(b) having or exhibiting increased or improved compressibility compared to a tri-layer microporous membrane having the same thickness, Gurley, porosity, and/or resin make-up as the multilayer microporous membrane or film;
(c) having or exhibiting increased or improved elongation at break (TD) compared to a tri-layer microporous membrane having the same thickness, Gurley, porosity, and/or resin make-up as the multilayer microporous membrane or film:
(d) having or exhibiting reduced high temperature shrinkage at 150° C. compared to a tri-layer microporous membrane having the same thickness, Gurley, porosity, and/or resin make-up as the multilayer microporous membrane or film;
(e) having or exhibiting reduced high temperature shrinkage at 120° C. compared to a tri-layer microporous membrane having the same thickness, Gurley, porosity, and/or resin make-up as the multilayer microporous membrane or film;
(f) having at least one layer that comprises a polymer blend; and
(g) having a non-woven or woven attached to one or both sides of the multilayer microporous membrane or film, wherein the total thickness of the membrane or film is less than 30 microns, less than 25 microns, less than 20 microns, less than 15 microns, or less than 10 microns, wherein:
the multilayer microporous film comprises at least three layers that are all micro-layers (thickness of 1-10 microns), all nano-layers (thickness of less than 1 micron), or a combination of nano-layers and micro-layers;
the multilayer microporous film comprises at least four layers that are all micro-layers (thickness of 1-10 microns), all nano-layers (thickness of less than 1 micron), or a combination of nano-layers and micro-layers;
the multilayer microporous film comprises at least five layers that are all micro-layers (thickness of 1-10 microns), all nano-layers (thickness of less than 1 micron), or a combination of nano-layers and micro-layers; or
the multilayer microporous film comprises at least six layers that are all micro-layers (thickness of 1-10 microns), all nano-layers (thickness of less than 1 micron), or a combination of nano-layers and micro-layers.

6. A multilayer microporous film, the multilayer microporous film comprising a region, which comprises two or more layers and polyethylene in one or more of the layers, wherein when this region is tested according Machine Learning Test described herein, the following is satisfied:

$W^T x' \geq -2.0$ or $W^T x' \geq -1.0$ or $W^T x' \geq 0.0$ or $W^T x' \geq 2.0$.

7. A multilayer microporous membrane, the multilayer microporous film, the multilayer microporous film comprising a region, which comprises two or more layers and polypropylene in one or more of the layers, wherein when this region is tested according to the Machine Learning Test described herein, the following is satisfied:

$W^T x' \geq -1.5$ or $W^T x' \geq -1.0$ or $W^T x' \geq 0.5$ or $W^T x' \geq 1.5$.

8. A multilayer microporous membrane or film comprising:
two outermost sub-membranes comprising three or more nano-layers (thickness less than 1 micron) or micro-layers (thickness between 1 and 10 microns); and
at least one inner sub-membrane comprising three or more nano-layers (thickness less than 1 micron) or micro-layers (thickness between 1 and 10 microns) that comprise, consist of, or consist essentially of polypropylene,
wherein in at least one of the outermost sub-membranes, the outermost micro-layer or nano-layer comprises, consists of, or consists essentially of polyethylene.

9. The multilayer microporous membrane or film of claim 8, wherein:
in the at least one outermost sub-membrane, the innermost micro-layer or nano-layer comprises, consists of, or consists essentially of a polyethylene blend;
the at least one outermost sub-membrane, whose outermost micro-layer or nano-layer comprises, consists of, or consists essentially of polyethylene, has an innermost micro-layer or nano-layer that comprises, consists of, or consists essentially of a polyethylene blend;
in both of the outermost sub-membranes, the outermost micro-layer or nano-layer comprises, consists of, or consists essentially of polyethylene;
in both of the outermost sub-membranes, the innermost micro-layer or nano-layer comprises, consists of, or consists essentially of a polyethylene blend;
the at least one inner sub-membrane is in direct contact with at least one of the outermost sub-membranes whose innermost micro-layer or nano-layer comprises, consists of, or consists essentially of a polyethylene blend;
the membrane or film comprises another inner sub-membrane comprising at least three nano-layers or micro-layers, wherein at least one outermost micro-layers or nano-layers of the another inner sub-membrane comprises, consists of, or consists essentially of a polyethylene blend;
the membrane or film comprises another inner sub-membrane comprising at least three nano-layers or micro-layers, wherein both outermost micro-layers or nano-layers of the another inner sub-membrane comprises, consists of, or consists essentially of a polyethylene blend;
the nano-layers or micro-layers of the outermost sub-membranes are thinner than the nano-layers or micro-layers of the innermost sub-membrane;
the nano-layers or micro-layers of the outermost sub-membranes are 2 to 5 times thinner than the nano-layers or micro-layers of the innermost sub-membrane;
the nano-layers or micro-layers of the outermost sub-membranes are 3 to 5 times thinner than the nano-layers or micro-layers of the innermost sub-membrane;
the nano-layers or micro-layers of the outermost sub-membranes are 4 to 5 times thinner than the nano-layers or micro-layers of the innermost sub-membrane;
the membrane or film comprises 10 to 35% polyethylene based on the total weight of the membrane or film; or
the membrane or film comprises 15 to 25% polyethylene based on the total weight of the membrane or film.

10. A multilayer microporous membrane or film comprising:
- two outermost sub-membranes comprising at least three nano-layers (less than 1 micron thick) or micro-layers (1 to 10 microns thick) (or two outermost nano-layers or micro-layers and at least on inner nano-layer or micro-layer), wherein the two outermost nano-layers or micro-layers of the outermost sub-membranes are thinner than at least one inner nano-layer or micro-layer of the outermost sub-membranes; and
- at least one inner sub-membrane comprising at least three nano-layers or micro-layers (or two outermost nano-layers or micro-layers and at least one inner nano-layer or micro-layer), wherein the two outermost nano-layers or micro-layers of the at least one inner sub-membrane are thinner than at least one inner nano-layer or micro-layer of the at least one inner sub-membrane.

11. The multilayer microporous membrane or film of claim 10, wherein the two outermost nano-layers or micro-layers of the outermost sub-membranes are 10 to 95% thinner, 50 to 90% thinner, 60 to 90% thinner, 70 to 90% thinner, or 80 to 90% thinner than the at least one inner nano-layer or micro-layer of the outermost sub-membranes.

12. The multilayer microporous membrane or film of claim 10, wherein the two outermost nano-layers or micro-layers of the at least one inner sub-membrane are 10 to 95% thinner, 50 to 90% thinner, 60 to 90% thinner, 70 to 90% thinner, or 80 to 90% thinner than the at least one inner nano-layer or micro-layer of the at least one inner sub-membrane.

13. The multilayer microporous membrane or film of claim 10, wherein;
- the outermost nano-layers or micro-layers of the outermost sub-membranes comprise, consist of, or consist essentially of polyethylene;
- the outermost nano-layers or micro-layers of the at least one inner sub-membrane comprise, consist of, or consist essentially of polyethylene;
- the outermost nano-layers or micro-layers of the outermost sub-membranes comprise, consist of, or consist essentially of polyethylene, and the outermost nano-layers or micro-layers of the at least one inner sub-membrane comprise, consist of, or consist essentially of polyethylene;
- the at least one inner nano-layer or micro-layer of the outermost sub-membranes comprise, consist of, or consist essentially of polypropylene, which may be a high molecular weight polypropylene;
- the outermost nano-layers or micro-layers of the outermost sub-membranes comprise, consist of, or consist essentially of polyethylene, and the at least one inner nano-layer or micro-layer of the outermost sub-membranes comprise, consist of, or consist essentially of polypropylene, which may be a high molecular weight polypropylene;
- the outermost nano-layers or micro-layers of the outermost sub-membranes comprise, consist of, or consist essentially of polyethylene, and the outermost nano-layers or micro-layers of the at least one inner sub-membrane comprise, consist of, or consist essentially of polyethylene, wherein the at least one inner nano-layer or micro-layer of the outermost sub-membranes comprise, consist of, or consist essentially of polypropylene, which may be a high molecular weight polypropylene.

14. The multilayer microporous membrane or film of claim 10, comprising 10 to 35 wt. % polyethylene based on the total weight of the multilayer microporous membrane.

15. The multilayer microporous membrane or film of claim 10, wherein:
- the outer sub-membranes and the at least one inner sub-membrane are each separately formed by co-extrusion;
- the outer sub-membranes and the at least one inner sub-membrane are each separately formed by co-extrusion, and wherein each of the sub-membranes formed by co-extrusion are laminated to at least one other sub-membrane formed by co-extrusion to form the multilayer microporous membrane or film; or
- the thickness of the membrane or film is from 1 to 30 microns.

16. A multilayer microporous membrane comprising:
- two outermost sub-membranes comprising two outermost nano-layers (less than 1 micron thickness) or micro-layers (between 1 and 10 micron thickness) and at least one inner nano-layer or micro-layer, wherein the outermost nano-layers or micro-layers of the two outermost sub-membranes comprise, consist of, or consist essentially of polyethylene and the at least one inner nano-layer or micro-layer of the two outermost sub-membranes comprises, consists of, or consists essentially of polypropylene, including a high molecular weight polypropylene; and
- at least one inner sub-membrane comprising two outermost nano-layers or micro-layers and at least one inner nano-layer or micro-layer, wherein the two outermost nano-layers or micro-layers of the at least one inner sub-membrane comprise, consist of, or consist essentially of polyethylene, and the at least one inner nano-layer or micro-layer of the at least one inner sub-membrane comprises, consists of, or consists essentially of polypropylene, including a high molecular weight polypropylene.

17. The multilayer microporous membrane or film of claim 16, wherein:
- the outermost sub-membranes comprise two or more inner nano-layers or micro-layers and the at least one inner sub-membrane comprises two or more inner nano-layers or micro-layers;
- the outermost sub-membranes comprise three or more inner nano-layers or micro-layers and the at least one inner sub-membrane comprises three or more inner nano-layers or micro-layers;
- the outermost sub-membranes comprise four or more inner nano-layers or micro-layers and the at least one inner sub-membrane comprises four or more inner nano-layers or micro-layers; or
- the outermost sub-membranes comprise five or more inner nano-layers or micro-layers and the at least one inner sub-membrane comprises five or more inner nano-layers or micro-layers.

18. The multilayer microporous membrane or film of claim 17, wherein all of the inner nano-layers or micro-layers comprise, consist of, or consist essentially of polypropylene, including a high molecular weight polypropylene.

19. The multilayer microporous membrane or film of claim 16, wherein:
- the membrane or film comprises 10 to 35 wt. % or 15 to 25 wt. % polyethylene based on the total weight of the membrane or film;
- the sub-membranes are formed by co-extrusion; or
- the sub-membranes are formed by co-extrusion, wherein each of the co-extruded sub-membranes are laminated to at least one other of the co-extruded sub-membranes to form the multilayer microporous membrane or film.

20. A multilayer microporous membrane or film comprising:
two outermost sub-membranes comprising two or more nano-layers (less than 1 micron thick) or micro-layers (1 to 10 microns thick), wherein an outermost nano-layer or micro-layer of the outermost sub-membranes that is also an outermost nano-layer or micro-layer of the multilayer microporous membrane or film comprises siloxane or polysiloxane; and
at least one inner sub-membrane comprising two or more nano-layers or micro-layers.

21. The multilayer microporous membrane or film of claim 20, wherein:
the polysiloxane is present in an amount from 1 to 10 wt. % or 1 to 30% based on the total weight of the nano-layer or micro-layer of the outermost sub-membranes that comprises the siloxane or polysiloxane;
there are two inner sub-membranes, and the inner sub-membranes and outermost sub-membranes each have three or more micro-layers or nano-layers;
there are two inner sub-membranes, and the inner sub-membranes and outermost sub-membranes each have three or more micro-layers or nano-layers, wherein an outermost nano-layer or micro-layer of each of the inner sub-membranes are in contact with one another in the multilayer microporous membrane or film and comprise, consist of, or consist essentially of the same resin;
there are two inner sub-membranes, and the inner sub-membranes and outermost sub-membranes each have three or more micro-layers or nano-layers, wherein an outermost nano-layer or micro-layer of each of the inner sub-membranes are in contact with one another in the multilayer microporous membrane or film and have identical compositions;
there are two inner sub-membranes, and the inner sub-membranes and outermost sub-membranes each have three or more micro-layers or nano-layers, wherein an outermost nano-layer or micro-layer of each inner sub-membrane is in contact with an outermost nano-layer or micro-layer of an outermost sub-membrane, and the outer most nano-layer or micro-layer of each inner sub-membrane comprises, consists of, or consists essentially of the same resin as the outermost nano-layer or micro-layer of an outermost sub-membrane that it is in contact with; or
there are two inner sub-membranes, and the inner sub-membranes and outermost sub-membranes each have three or more micro-layers or nano-layers, wherein an outermost nano-layer or micro-layer of each inner sub-membrane is in contact with an outermost nano-layer or micro-layer of an outermost sub-membrane, and the outer most nano-layer or micro-layer of each inner sub-membrane comprises, consists of, or consists essentially of the same resin as the outermost nano-layer or micro-layer of an outermost sub-membrane that it is in contact with, the outer most nano-layer or micro-layer of each inner sub-membrane has an identical composition to the outermost nano-layer or micro-layer of an outermost sub-membrane that it is in contact with.

22. The multilayer microporous membrane or film of claim 20, wherein there is one inner sub-membrane and the inner sub-membrane and the outermost sub-membranes each have six or more micro-layers or nano-layers.

23. The multilayer microporous membrane or film of claim 22, wherein:
both outermost micro-layers or nano-layers of the outermost sub-membranes comprise polysiloxane or siloxane;
both outermost micro-layers or nano-layers of the outermost sub-membranes comprise polysiloxane or siloxane, wherein polysiloxane is present in an amount from 1 to 10 wt. % based on the total weight of the micro-layers or nano-layers;
both outermost micro-layers or nano-layers of the outermost sub-membranes comprise polysiloxane or siloxane, and the outermost micro-layers or nano-layers of the outermost sub-membranes also comprise, consist of, or consist essentially of polypropylene;
both outermost micro-layers or nano-layers of the outermost sub-membranes comprise polysiloxane or siloxane, wherein polysiloxane is present in an amount from 1 to 10 wt. % based on the total weight of the micro-layers or nano-layers, and the outermost micro-layers or nano-layers of the outermost sub-membranes also comprise, consist of, or consist essentially of polypropylene;
both outermost micro-layers or nano-layers of the outermost sub-membranes comprise polysiloxane or siloxane, and inner micro-layers or nano-layers of the inner sub-membrane comprise, consist of, or consist essentially of at least one of polypropylene, a polypropylene blend, polyethylene, or a polyethylene blend;
both outermost micro-layers or nano-layers of the outermost sub-membranes comprise polysiloxane or siloxane, wherein polysiloxane is present in an amount from 1 to 10 wt. % based on the total weight of the micro-layers or nano-layers, and wherein inner micro-layers or nano-layers of the inner sub-membrane comprise, consist of, or consist essentially of at least one of polypropylene, a polypropylene blend, polyethylene, or a polyethylene blend;
both outermost micro-layers or nano-layers of the outermost sub-membranes comprise polysiloxane or siloxane, and the outermost micro-layers or nano-layers of the outermost sub-membranes also comprise, consist of, or consist essentially of polypropylene, and wherein inner micro-layers or nano-layers of the inner sub-membrane comprise, consist of, or consist essentially of at least one of polypropylene, a polypropylene blend, polyethylene, or a polyethylene blend; or
both outermost micro-layers or nano-layers of the outermost sub-membranes comprise polysiloxane or siloxane, wherein polysiloxane is present in an amount from 1 to 10 wt. % based on the total weight of the micro-layers or nano-layers, and the outermost micro-layers or nano-layers of the outermost sub-membranes also comprise, consist of, or consist essentially of polypropylene, and wherein inner micro-layers or nano-layers of the inner sub-membrane comprise, consist of, or consist essentially of at least one of polypropylene, a polypropylene blend, polyethylene, or a polyethylene blend.

24. The multilayer microporous membrane or film of claim 23, wherein the inner micro-layers or nano-layers of the outermost sub-membranes include a micro-layer or nano-layer of PP, a micro-layer or nano-layer of a PE blend, a micro-layer or nano-layer of a PE blend, and a micro-layer or nano-layer of PP in that order.

25. The multilayer microporous membrane or film of claim 20, wherein there are three or more inner sub-membranes and each of the inner and outermost sub-membranes comprise three or more micro-layers or nano-layers, and wherein:
- there are three inner sub-membranes and each of the inner and outermost sub-membranes comprise three micro-layers or nano-layers;
- there are three inner sub-membranes and each of the inner and outermost sub-membranes comprise three micro-layers or nano-layers, wherein the micro-layers or nano-layers of two of the inner sub-membranes each comprise, consist of, or consist essentially of polyethylene;
- there are three inner sub-membranes and each of the inner and outermost sub-membranes comprise three micro-layers or nano-layers, wherein the micro-layers or nano-layers of two of the inner sub-membranes each comprise, consist of, or consist essentially of polyethylene, and wherein the nano-layers or micro-layers of one of the inner sub-membranes each comprise, consist of, or consist essentially of polypropylene;
- there are three inner sub-membranes and each of the inner and outermost sub-membranes comprise three micro-layers or nano-layers, wherein the micro-layers or nano-layers of two of the inner sub-membranes each comprise, consist of, or consist essentially of polyethylene, and wherein the nano-layers or micro-layers of one of the inner sub-membranes each comprise, consist of, or consist essentially of polypropylene, and further wherein the one inner sub-membranes with nano-layers or micro-layers comprising, consisting of, or consisting essentially of polypropylene comprises a nano-layer or micro-layer comprising, consisting of, or consisting essentially of a polypropylene blend, a nano-layer or micro-layer comprising, consisting of, or consisting essentially of a polypropylene, and a nano-layer or micro-layer comprising, consisting of, or consisting essentially of a polypropylene blend, in that order;
- there are three inner sub-membranes and each of the inner and outermost sub-membranes comprise three micro-layers or nano-layers, wherein the micro-layers or nano-layers of two of the inner sub-membranes each comprise, consist of, or consist essentially of polyethylene, and wherein the nano-layers or micro-layers of one of the inner sub-membranes each comprise, consist of, or consist essentially of polypropylene, and further wherein the two inner sub-membranes with nano-layers or micro-layers comprising, consisting of, or consisting essentially of polyethylene and the one inner sub-membrane with nano-layers or micro-layers comprising, consisting of, or consisting essentially of polypropylene are provided in the following order: sub-membrane with nano-layers or micro-layers comprising, consisting of, or consisting essentially of polyethylene; sub-membrane with nano-layers or micro-layers comprising, consisting of, or consisting essentially of polypropylene; sub-membrane with nano-layers or micro-layers comprising, consisting of, or consisting essentially of polyethylene;
- the nano-layers or micro-layers of the outermost sub-membranes each individually comprise, consist of, or consist essentially of polypropylene only, a blend of polypropylene and another resin, or a blend of polypropylene and polysiloxane;
- the nano-layers or micro-layers of the outermost sub-membranes each individually comprise, consist of, or consist essentially of polypropylene only, a blend of polypropylene and another resin, or a blend of polypropylene and polysiloxane, wherein the outermost sub-membranes comprise, consist or consist essentially of a nano-layer or micro-layer consisting of a blend of polypropylene and polysiloxane, a nano-layer or micro-layer consisting or polypropylene, and a nano-layer or micro-layer consisting of a blend of polypropylene and another resin in that order; or
- the membrane or film comprises 10 to 30 wt. % polyethylene based on the total weight of the membrane or film.

26. The multilayer microporous membrane or film of claim 20, wherein:
- the micro-layers or nano-layers all have the same thickness;
- the micro-layers or nano-layers do not all have the same thickness;
- each of the sub-membranes is formed by co-extrusion;
- each of the sub-membranes is formed by co-extrusion, wherein each of the co-extruded sub-membranes are laminated to at least one other co-extruded sub-membrane to form the multi-layer microporous membrane; or
- the membrane or film comprises 10 to 35 wt. % or 15 to 25 wt. % polyethylene based on the total weight of the membrane or film.

27. A multilayer microporous membrane or film comprising:
- two outermost sub-membranes comprising six or more nano-layers (having a thickness less than 1 micron) or micro-layers (having a thickness between 1 and 10 microns); and
- at least one inner sub-membrane comprising six or more nano-layers or micro-layers.

28. The multilayer microporous membrane of claim 27, wherein:
- there is one inner sub-membrane and the inner sub-membrane and the two outermost sub-membranes comprise six micro-layers or nano-layers;
- there is one inner sub-membrane and the inner sub-membrane and the two outermost sub-membranes comprise six micro-layers or nano-layers, wherein outermost micro-layers or nano-layers of the outermost sub-membranes comprise, consist of, or consist essentially of polypropylene or a blend of polypropylene and another resin; or
- there is one inner sub-membrane and the inner sub-membrane and the two outermost sub-membranes comprise six micro-layers or nano-layers, wherein outermost micro-layers or nano-layers of the outermost sub-membranes comprise, consist of, or consist essentially of polypropylene or a blend of polypropylene and another resin, and wherein middle two micro-layers or nano-layers of the two outermost sub-membranes and the inner sub-membrane comprise, consist of, or consist essentially of polyethylene.

29. The multilayer microporous membrane of claim 28, wherein:
- the middle two micro-layers or nano-layers of the two outermost sub-membranes are in direct contact with each other and on either side of the two middle micro-layers or nano-layers of the two outermost sub-membranes is one micro-layer or nano-layer comprising, consisting of, or consisting essentially of a blend comprising polypropylene and another resin; or
- the middle two micro-layers or nano-layers of the inner sub-membrane are in direct contact with each other and on either side of the two middle micro-layers or nanolayers of the inner sub-membrane is one micro-layer or nano-layer comprising, consisting of, or consisting essentially of a polypropylene.

30. The multilayer microporous membrane or film of claim 27, wherein:
   the micro-layers or nano-layers all have the same thickness;
   the micro-layers or nano-layers do not all have the same thickness;
   each of the sub-membranes is formed by co-extrusion;
   each of the sub-membranes is formed by co-extrusion, wherein each of the co-extruded sub-membranes are laminated to at least one other co-extruded sub-membrane to form the multi-layer microporous membrane; or
   the membrane or film comprises 10 to 35 wt. % or 15 to 25 wt. % polyethylene based on the total weight of the membrane or film.

31. A method for manufacturing a multilayer microporous membrane comprising an additive in at least one layer thereof, the method comprising:
   co-extruding a polymer mixture comprising an additive with at least one other polymer mixture to form a co-extruded precursor film; or
   extruding a polymer mixture comprising an additive to form a mono-extruded precursor film and laminating the mono-extruded precursor film to at least one other film.

32. The method of claim 31, wherein:
   the method comprises co-extruding a polymer mixture comprising polymer mixture to form a co-extruded precursor film;
   the method comprises extruding a polymer mixture comprising an additive to form a mono-extruded precursor film and laminating the mono-extruded precursor film to at least one other film; or
   the method comprises extruding a polymer mixture comprising an additive to form a mono-extruded precursor film and laminating the mono-extruded precursor film to at least one other film, wherein lamination involves the application of at least one of heat, pressure, or a combination thereof.

33. A Machine Learning Test described herein for characterizing a multilayer microporous film comprises two or more layers and polyethylene and/or polypropylene in one or more of the layers, wherein in some embodiments, the following is satisfied:

$W^T x' \geq -0.0$ or $W^T x' \geq -1.0$.

PP: $w^T x' \leq -1.5$ $w^T x' \geq 0.5$ $w^T x' \geq 1.5$
PE: $w^T x' \geq -2.0$ $w^T x' \geq 0.0$ $w^T x' \geq 2.0$.

34. A multilayer microporous membrane exhibiting an increase in puncture average (g) when tested at a high puncture speed over 25 mm/min compared to a puncture average (g) tested at 25 mm/min, wherein:
   the puncture average is at least about 20 g higher at a puncture speed of 100 mm/min that at 25 mm/m in;
   the puncture average is at least about 30 g higher at a puncture speed of 100 mm/min that at 25 mm/min;
   the puncture average is at least about 40 g higher at a puncture speed of 100 mm/min that at 25 mm/min;
   the puncture average at a puncture speed of 25 mm/min is above 250 g;
   the puncture average at a puncture speed of 25 mm/min is above 250 g, and a thickness of the membrane is between 14 and 30 microns;
   the puncture average at a puncture speed of 25 mm/min is above 275 g;
   the puncture average at a puncture speed of 25 mm/min is above 275 g, and a thickness of the membrane is between 14 and 30 microns;
   the puncture average at a puncture speed of 25 mm/min is above 300 g;
   the puncture average at a puncture speed of 25 mm/min is above 300 g, and a thickness of the membrane is between 14 and 30 microns;
   the puncture average at a puncture speed of 25 mm/min is above 325 g;
   the puncture average at a puncture speed of 25 mm/min is above 325 g, and a thickness of the membrane is between 14 and 30 microns;
   the puncture average at a puncture speed of 25 mm/min is above 350 g; and/or
   the puncture average at a puncture speed of 25 mm/min is above 350 g, and a thickness of the membrane is between 14 and 30 microns.

35. A microporous membrane formed by a collapsed bubble method, wherein the microporous membrane has a thickness less than 14 microns, from 6 to 12 microns, or of about 10 microns and a puncture strength greater than 200 g, greater than 210 g, greater than 220 g, greater than 230 g, or greater than 240 g.

36. The membrane of claim 35, wherein:
   the microporous membrane comprises a structure PP/PP/PE/PE/PP/PP, wherein the structure is formed by collapsing a bubble comprising co-extruded PP/PP/PE;
   the microporous membrane comprises a structure PP/PE/PE/PE/PE/PP, wherein the structure is formed by collapsing a bubble comprising co-extruded PP/PE/PE;
   the microporous membrane comprises a structure PP/PP/PP/PP, wherein the structure is formed by collapsing a bubble comprising co-extruded PP/PP;
   the microporous membrane comprises a structure PE/PE/PE/PE, wherein the structure is formed by collapsing a bubble comprising co-extruded PE/PE;
   the microporous membrane comprise a structure PP/PE/PE/PP, wherein the structure is formed by collapsing a bubble comprising co-extruded PP/PE;
   the microporous membrane comprises a structure PE/PP/PP/PE, wherein the structure is formed by collapsing a bubble comprising co-extruded PE/PP;
   the microporous membrane comprises a structure PE/PP/PP/PP/PP/PE, wherein the structure is formed by collapsing a bubble comprising co-extruded PE/PP/PP; or
   the microporous membrane has a structure PP/PE/PP/PE/PE/PP/PE/PP, wherein the structure is formed by collapsing a bubble comprising co-extruded PP/PE/PP/PE.

37. The microporous membrane of claim 35, wherein the microporous membrane has a Gurley of less than 250, has a Gurley of less than 225, has a Gurley of less than 200, has a Gurley of less than 190, has a Gurley of less than 180, or has a Gurley of less than 175.

38. The microporous membrane of claim 35, wherein:
   the microporous membrane comprises polyethylene having a melt flow rate from 0.1 to 10 g/min;
   at least one layer of the membrane comprises polyethylene and has a thickness of at least 1.75 microns;
   at least one layer of the membrane comprises polyethylene and has a thickness of at least 2 microns;
   at least one layer of the membrane comprises polyethylene and has a thickness of less than 2 microns;

the membrane comprises polypropylene having a melt flow rate from 0.01 to 10 g/10 min when measured according to ASTM D1238-13 and/or ISO 1133-1:2011;

the membrane comprises polypropylene having a melt flow rate from 0.1 to 5 g/10 min when measured according to ASTM D1238-13 and/or ISO 1133-1:2011; or the membrane comprises polypropylene having a melt flow rate from 0.01 to 2.5 g/10 min when measured according to ASTM D1238-13 and/or ISO 1133-1:2011.

* * * * *